United States Patent
Bullock

(10) Patent No.: US 12,212,058 B1
(45) Date of Patent: Jan. 28, 2025

(54) ATOMIC RESONANCE COMMUNICATION DEVICE

(71) Applicant: Vortexon Inc., Dover, DE (US)

(72) Inventor: Eric Stephen Rees Bullock, Austin, TX (US)

(73) Assignee: Vortexon Inc., Dover, DE (US)

( * ) Notice: Subject to any disclaimer, the term of this patent is extended or adjusted under 35 U.S.C. 154(b) by 0 days.

(21) Appl. No.: 18/744,122

(22) Filed: Jun. 14, 2024

(51) Int. Cl.
| | |
|---|---|
| *H01Q 1/36* | (2006.01) |
| *H01Q 7/00* | (2006.01) |
| *H01Q 11/08* | (2006.01) |

(52) U.S. Cl.
CPC ............ *H01Q 11/08* (2013.01); *H01Q 1/362* (2013.01)

(58) Field of Classification Search
CPC .......... H01Q 1/36; H01Q 1/362; H01Q 11/08; H01Q 7/00; H01Q 7/06; H04B 3/52; H04B 3/54; H04B 5/00
See application file for complete search history.

(56) References Cited

U.S. PATENT DOCUMENTS

| | | | | |
|---|---|---|---|---|
| 6,822,614 | B2* | 11/2004 | Chiu | H01Q 7/08 |
| | | | | 343/866 |
| 9,450,306 | B1* | 9/2016 | Ebnabbasi | H01Q 7/00 |
| 9,608,327 | B1* | 3/2017 | Tai | H01Q 7/06 |
| 9,742,058 | B1* | 8/2017 | O'Neill, Jr. | H01Q 1/08 |
| 9,812,788 | B2* | 11/2017 | Gommé | H01Q 7/005 |
| 10,014,578 | B2* | 7/2018 | Kerselaers | H04B 1/40 |
| 11,824,263 | B2* | 11/2023 | Hyman | H01Q 1/52 |

* cited by examiner

*Primary Examiner* — Tho G Phan
(74) *Attorney, Agent, or Firm* — Fish & Richardson P.C.

(57) ABSTRACT

A communication system is disclosed that features a computing device, a radiating element coupled to the computing device and including a primary helical coil, a secondary helical coil positioned within the primary helical coil, one or more inductor coils that are free to rotate positioned within the secondary helical coil, an optohelical antenna, a central core positioned within the one or more inductor coils, one or more central core coils positioned within the central core, and a central core cavity positioned within the one or more central core coils, in which the central core cavity includes a plasma and/or a gain medium which exhibits magnetic resonance, spontaneous emission, stimulated emission, and/or absorption. The communication system includes a signal injection circuit, a signal detection circuit communicatively coupled to the computing device, and a control module communicatively coupled to the computing device to determine a mode of a transceiver module.

30 Claims, 62 Drawing Sheets

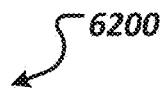

```
                    ┌─────────────────────────────────────┐
                    │ Select, by a control module, a      │
                    │ transmit mode of a transceiver      │
                    │ module.                             │
                    │ 6202                                │
                    └─────────────────────────────────────┘
                                     │
                                     ▼
                    ┌─────────────────────────────────────┐
                    │ Generate, by a host computing       │
                    │ device, a signal indicative of a    │
                    │ message to be transmitted by the    │
                    │ transceiver module.                 │
                    │ 6204                                │
                    └─────────────────────────────────────┘
                                     │
                                     ▼
                    ┌─────────────────────────────────────┐
                    │ Transmit the signal from the host   │
                    │ computing device to the transceiver │
                    │ module.                             │
                    │ 6206                                │
                    └─────────────────────────────────────┘
                                     │
                                     ▼
                    ┌─────────────────────────────────────┐
                    │ Transmit the signal from the        │
                    │ transceiver module to a signal      │
                    │ injection circuit.                  │
                    │ 6208                                │
                    └─────────────────────────────────────┘
```

FIG. 62

ATOMIC RESONANCE COMMUNICATION DEVICE

BACKGROUND

The present disclosure relates to communication devices.

As demands for speed, security, and reliability continue to increase for communication networks, communication devices have become more complex. Communication devices have transitioned to employ technology like fiber optics and radio frequency transmission, and areas like quantum communication and quantum key distribution. For example, fiber optics and free-space optical communication provide improved bandwidth in some implementations. Likewise, radio frequency transmission can provide high transmission speed over long ranges, and favorable reliability in communication networks.

Quantum communication includes the possibility of theoretically unbreakable encryption mechanisms. The use of quantum bits or qubits provides security advantages over traditional information processing. The field, leveraging the principles of quantum entanglement to transmit information in ways that are fundamentally different from classical information transfer, can use both free-space optical channels and fiber optic channels in existing networks.

SUMMARY

The systems and techniques described here relate to a communication device that leverages optical signals, radio frequency (RF) signals, a variety of antenna designs, and quantum communication techniques that enable a secure and scalable network of communication devices.

In one aspect, a communication system includes a computing device, a signal injection circuit communicatively coupled to the computing device, a signal detection circuit communicatively coupled to the computing device, a radiating element, in which the radiating element is electromagnetically or directly coupled to the signal injection circuit and the signal detection circuit. The radiating element includes a primary coil, a secondary coil positioned within the primary coil, one or more inductor coils being rotatable or fixed within the secondary coil, a rotatable or fixed central core positioned within the one or more inductor coils, one or more central core coils positioned within the rotatable or fixed central core, and a central core cavity positioned within the one or more central core coils. The central core cavity includes a plasma and/or a gain medium, in which the plasma and/or the gain medium exhibits magnetic resonance, spontaneous emission, stimulated emission, and/or absorption and in some cases is considered a quantum plasma or a quantum sensor. The system includes a control module communicatively coupled to the computing device, in which the control module determines a mode of a transceiver module. The mode of the transceiver module includes a transmit mode and a receive mode.

In some implementations, the central core cavity contains an x-ray tube filament, in which the material inside the central core cavity comprises one or more of water, coolant, oil, noble gases, biologics, glass, graphite, metal, ceramic, ferromagnetic, paramagnetic atoms, diamagnetic atoms, alkali metals, hydrogen, one or more isotopes, or one or more magnetic materials. In some implementations, the one or more inductor coils are configured to receive and/or transmit a radio frequency signal and/or magnetic fields.

In some implementations, the one or more inductor coils include rotatable or fixed toroidal single wound antennas or rotatable or fixed toroidal contrawound antennas.

In some implementations, the signal injection circuit includes one or more antennae, in which the one or more antennae include a helical antenna, a spherical antenna, a toroidal antenna, gyroscopic radiating antenna, or a cylindrical antenna, in which the control module determines one or more active antennae.

In some implementations, the transceiver in transmit mode converts electrical signals from the computing device into electromagnetic signals for transmission and the transceiver in receive mode converts received electromagnetic signals into electrical signals for processing by the computing device. In some implementations, in receive mode, the transceiver converts incoming electromagnetic signals into electrical signals processed by the computing device.

In some implementations, the radiating element includes multiple optical emitters, in which each optical emitter includes a light source, and each optical emitter is coupled to one or more optical lenses, and/or multiple optical detectors. In some implementations, each optical emitter emits an optical signal having a wavelength and each optical detector of the plurality of optical detectors detects an optical signal having a wavelength. In some implementations, one or more optical emitters is a laser. In some implementations, the optical signal from each optical emitter is modified by one or more lenses, mirrors, modulators, etc. In some other implementations, the system transmits the optical signal without modification, e.g., without geometric optical transformation or amplitude modulation.

In some implementations, the signal injection circuit is communicatively coupled to the computing device by a link that includes a direct electrical connection, a direct fiber optic connection, a free-space optical link, a radio frequency link, a laser, or a particle accelerator. In some implementations, the computing device is communicatively coupled to a security hub, in which the security hub collects and stores information about a user. In some implementations, the security hub includes a modem, a gateway, and/or a security system. In some implementations, the security hub includes an operating system with an associated user interface. In some implementations, the security hub is a standalone device and may be connected to one or more networks.

In some implementations, the radiating element includes a nonlinear optical device. The nonlinear optical device includes a laser that optically couples the nonlinear optical device to the computing device, in which the nonlinear optical device converts one or more photons of the laser into one or more pairs of entangled photons. In some implementations, the nonlinear optical device includes a non-linear crystal, the non-linear crystal exhibiting spontaneous parametric down conversion, in which the non-linear crystal is phase matched to generate entangled photon pairs from one or more input photons of the input laser, the input laser controlled by the computing device. In some implementations, the radiating element includes one or more linear optical devices including mirrors, lenses, gratings, prisms, beam splitters, cavities, optical fibers, and polarizers.

In some implementations, the rotatable or fixed central core rotates about one or more axes, the one or more axes extending through the center of the communication system.

In some implementations, the control module determines (i) one or more active electromagnetic, acoustic, or optical communication channels, (ii) a power distribution to one or more components of the communication system, and (iii)

functionality of one or more load devices, the load devices including one or more motors.

In some implementations, the communication system includes a power system. The power system includes a power supply and a power storage system. The power is supplied to the power system by one or more of a battery, a solar panel, a nuclear power source, an electrodynamic tether, a mechanical power generation system, and an electrical main, e.g., a utility power system. In some implementations, the control module distributes power from the power system to one or more components of the system.

In some implementations, the computing device accesses one or more external resources through an application programming interface. In some implementations, the computing device includes one or more processors, in which the one or more processors perform computations related to data communication, data storage, machine learning, network operations, security protocols, analog signal processing, and digital signal processing.

In some implementations, the radiating element includes one or more antennas, in which the one or more antennas are simple antennas or composite antennas. In some implementations, the radiating element includes one or more optical emitters and one or more optical detectors.

In another aspect, a method for transmitting a message with a communication system, in which the method includes (i) selecting, by a control module, a transmit mode of a transceiver module, (ii) generating, by a computing device, a signal indicative of a message to be transmitted by the transceiver module in transmit mode to a signal injection circuits, (iii) providing the signal from the computing device to the transceiver module, and (iv) providing the signal from the transceiver module to the signal injection circuit. The signal injection circuit is electromagnetically or directly coupled to a radiating element. The radiating element includes a primary coil, a secondary coil positioned within the primary coil, one or more inductor coils that are free to rotate positioned within the secondary coil, a rotatable or fixed central core positioned within the one or more inductor coils, one or more central core coils positioned within the rotatable or fixed central core, and a central core cavity positioned within the one or more central core coils. The central core cavity includes a plasma and/or gain medium, in which the plasma and/or the gain medium exhibits magnetic resonance, spontaneous emission, stimulated emission, and/or absorption and in some cases is considered a quantum plasma or a quantum sensor.

In some implementations, the radiating element includes one or more of a simple antenna, dipole antenna, monopole antenna, loop antenna, array antenna, aperture antenna, traveling wave antenna, a helical antenna, an optohelical antenna, an optical emitter, and plasma antenna and/or gain medium.

In some implementations, the one or more inductor coils are configured to receive and/or transmit a signal from the computing device or another device, in which the one or more inductor coils are configured to tune the reception and transmission of the radio frequency signal.

In some implementations, the computing device is communicatively coupled to a security hub that collects and stores user information.

In some implementations, the control module determines active electromagnetic, acoustic, or optical communication channels.

Particular embodiments of the subject matter described in this specification can be implemented so as to realize one or more of the following advantages. An atomic resonance communication system produces wireless transmission patterns in complex spatial distributions and complex polarization states, leading to more secure data transfer and a reduced probability of transmission interception. In addition, techniques such as point-to-point optical communication and the exploitation of quantum optical states and quantum teleportation reduce the probability of a successful transmission interception. By connecting more than one atomic resonance communication systems in a network along with traditional compute nodes (e.g., host computer that have access to traditional networks like the internet), secure channels can be established between nodes of the network with layers of security beyond what is provided in current network implementations. In addition, one or more atomic resonance communication systems can be networked together by sending signals between respective antennas, through satellite communication, and/or optical free-space communication. In some implementations, the atomic resonance communication system can be coupled to a space craft and transmit messages to other systems from space. In some implementations, one or more atomic resonance communication systems are directly connected with cable/wire. The direct connection is facilitated by communication ports of respective computing devices of each communication system. In some implementations, the respective computing devices are communicatively coupled by a wireless channel, a wired channel, and/or a fiber optic channel.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 62 is a flow chart that represents operations of an example communication system.

Like reference numbers and designations in the various drawings indicate like elements.

DETAILED DESCRIPTION

An atomic resonance communication system is configured to emit electromagnetic signals across multiple channels that include optical, radio frequency, and others. By combining complex transmission patterns, multiple communication channels, and quantum optical phenomena, a network including multiple atomic resonance communication systems can be arranged.

Figure 1:
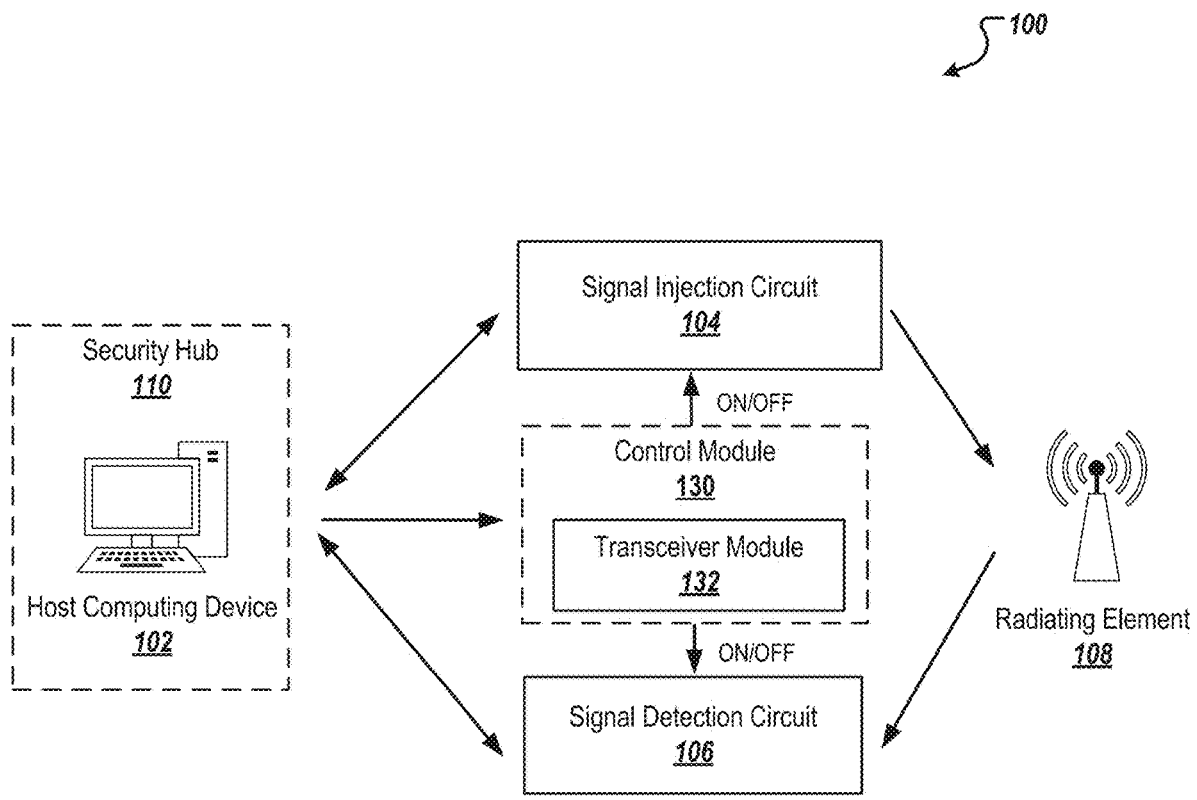
FIG. 1 illustrates an example system that includes a computing device sending data to a radiating element and receiving data from the radiating element.

FIG. 1 illustrates an example system 100 that includes a computing device 102 that sends data to a radiating element 108 and receives data from the radiating element 108. In some implementations, the computing device 102 is a desktop computer, a laptop, a mobile device, or any other computing device. In some implementations, the computing device 102 is connected to one or more networks, including a network of atomic resonance communication systems. The computing device 102 can access external resources (e.g., external software resources) by employing one or more techniques, for example, through application programming interfaces (APIs) like machine learning models, security handshakes, encryption key distribution resources, databases, video communications services, text message services, speech message services, chatbots, and other digital resources that can be accessed through private or public networks. The computing device 102 includes one or more processors, where the processors perform computations related to data communication, data storage, radio frequency machine learning, artificial intelligence models, and network operations including security protocols. In addition, the computing device 102 includes one or more circuits to send and receive analog and digital signals. In some other implementations, the computing device 102 is communicatively coupled to the one or more circuits through fiber optic links, electrical links, wireless communication channels, free-space optical channels, radio frequency channels (or other type of electromagnetic (EM) channel), or any other means of communicative coupling. In some implementations the one or more processors includes one or more graphical processing units (GPU), one or more central processing units (CPU), one or more tensor processing units (TPU), one or more data acquisition systems (DAS), one or more data storage medium, one or more network cards, one or more software-defined radios. In some implementations, a software-defined radio includes a radio frequency interface (e.g., an RF front end), an analog to digital converter (ADC), a digital to analog converter (DAC), a field-programmable gated array (FPGA), a processor, and associated software. In some implementations, one or more processors includes an operating system that incorporates an event-driven architecture, in which the architecture includes software that incorporates one or more machine learning models for radio frequency machine learning.

In some implementations, the computing device 102 includes one or more of a graphical user interface, input peripherals, input sensors (e.g., cameras, photodetectors, antennas), output power controller, output laser controller, central processing unit (CPU), network card, data acquisition system, data acquisition card, graphics processing unit (GPU), tensor processing unit (TPU), software-defined radio, data storage medium, time-domain reflectometer, oscilloscope, mixed signal oscilloscope, optical spectrum analyzer, vector spectrum analyzer, real-time spectrum analyzer, vector network analyzer, and an operating system. In some implementations, the computing device 102 includes one or more interfaces for electrical, RF, microwave, and/or optical communication, e.g., interfaces for generating output signals and interfaces for receiving input signals. In some implementations, the event-driven architecture of the computing device 102 executes one or more machine learning models for radio frequency machine learning and wavelength division multiplexing machine learning for spectral analysis and tracking of objects. Other optical communication machine learning models and/or quantum machine learning models can be implemented by the computing device 102 as well. In some implementations, the computing device 102 includes one or more fiber optic cables and optical components for free-space communication.

In some implementations, the system 100 includes one or more interactive computer systems that facilitates human-computer interaction via a human-computer interface, e.g., a graphical user interface.

In some implementations, the computing device 102 implements one or more operations related to digital signal acquisition and/or a software-defined radio. The software-defined radio can include a transmission of signals using standard modulation schemes like amplitude modulation (AM), frequency modulation (FM), etc. In addition, the software-defined radio can transmit signals using higher-order wireless transmission methods like quadrature amplitude modulation (QAM), quadrature frequency modulation (QFM), orthogonal frequency division multiplexing (OFDM), OFDM with subcarrier power modulation (OFDMSPM), phase-shift keying (SPK), and binary phase shift keying (BPSK). In some cases, higher-order wireless transmission methods are used for spectral efficient data transfer by taking advantage of more channels in the wireless spectrum and reducing transmission power and transmission time.

The computing device 102 is communicatively coupled to a signal injection circuit 104. The signal injection circuit 104 receives a data transmission pattern, e.g., a stream of data, from the computing device 102. The signal injection circuit 104 is electromagnetically or directly coupled to the radiating element 108, which is capable of emitting the corresponding data transmission pattern. For example, the computing device 102 can be wirelessly, directly, or optically coupled to a particle accelerator, where the particle accelerator is an example the signal injection circuit 104 and emits a pattern of electromagnetic energy that matches the data transmission pattern. In some cases, the signal injection circuit 104 is communicatively coupled to the computing device by a link that includes a direct electrical connection, a direct fiber optic connection, a free-space optical link, a radio frequency link, a laser, or a particle accelerator.

In some implementations, the radiating element 108 includes one or more antennas, in which the antennas are simple antennas, composite antennas, a combination or antennas, etc. For example, the radiating element 108 can include one or more dipole antennas, monopole antennas, loop antennas, array antennas, aperture antennas, traveling wave antennas, microwave antennas, and plasma antennas and/or a gain medium. The radiating element 108 can include any antenna structure, e.g., a simple antenna, composite antenna, traveling wave antenna, etc.

In some implementations, the signal injection circuit 104 is an open system with no magnetic confinement. In some implementations, the signal injection circuit 104 employs one or more antenna structures or techniques such as a gyroscopic radiating antenna, a plasma antenna, or other types of antenna technology. In addition, the signal injection circuit 104 can include other circuit elements like Helmholtz coils, photon sources, additional antennas, and any other device that can be used to transmit data transmission patterns in corresponding free-space or guided communication channels. For example, the signal injection circuit 104 employs one or more antennas to send wireless signals (e.g., created using data from the computing device 102) to the radiating element to initiate one or more transmission (e.g., electromagnetic transmissions).

The computing device 102 is communicatively coupled to a signal detection circuit 106. The signal detection circuit 106 receives a data transmission pattern, e.g., a waveform, from the radiating element 108, where the signal detection circuit 106 and the radiating element 108 are electromagnetically, optically, or directly coupled. The signal detection circuit 106 transmits the corresponding data transmission pattern to the computing device 102. For example, the radiating element 108 can detect a free-space optical signal, convert the optical signal to an electrical signal with a photodiode, and transmit the measured data transmission pattern through an optical channel to the signal detection circuit 106. The signal detection circuit 106 can wirelessly or directly transmit the data transmission pattern to the computing device 102.

In some implementations, the radiating element 108 includes optical emitters and optical detectors. Optical emitters include light emitting diodes (LEDs), lasers, and fiber-based optical sources, etc. Optical detectors include photodiodes, scintillators, etc. In some cases, each optical emitter emits an optical signal corresponding to a wavelength and each optical detector of the plurality of optical detectors detects an optical signal corresponding to a wavelength, e.g., the optical detectors and emitters send and receive data according to a wavelength division multiplexing (WDM) strategy.

In some implementations, the optical system does not use a WDM strategy, e.g., the optical system employs a single wavelength source for optical communication. In some implementations, the optical system does not include a spontaneous parametric down conversion source. In some implementations, the optical system includes optical sources like a laser transceiver, e.g., lasers, laser diodes, or laser diode arrays. In some implementations, the optical system is coupled to a photodetector and/or a thermal, multispectral, and/or hyperspectral imaging system, camera, and/or detection circuit.

In some implementations, the signal detection circuit 106 is an open system with no magnetic confinement. The signal detection circuit 106 can detect signals transmitted across multiple communication channels. The signal detection circuit 106 includes one or more components including Helmholtz coils, scintillators, gas-filled detectors, photodiodes, photodetectors, photomultipliers, vidicon tubes, silicon based detectors, CMOS devices, charged couple devices (CCDs), pickup coils, microwave antennas, antennas with various geometric profiles, and plasma antennas. In some implementations, the signal detection circuit 106 includes thermal, hyperspectral, or multispectral imaging systems, e.g., a NIR sensor photodiode array for thermal imaging/detecting, a SWIR sensor photodiode array for hyperspectral imaging/detecting, and a multispectral camera for multispectral imaging/detecting.

A control module 130 controls load devices like motors, electrical components like drive coils, capacitor banks, capacitive plates, electrodes, laser modules, and x-ray filaments, and controls power supplied to injection and detection circuits, detectors, and determines a communication mode of the system 100. For example, the control module 130 can determine which communication channel (e.g., RF, optical, acoustic, etc.) to use for detection and/or transmission. As another example, the control module 130 can determine if the mode of the system 100 is transmission or reception. The control module 130 can determine the mode of communication based on an output of one or more machine learning models, including radio frequency machine learning models, optical communication machine learning models, quantum machine learning models, and/or other algorithms.

In some implementations, the control module 130 configures a transceiver module 132 to transmit a signal in a transmit mode or a receive mode. The transmit mode includes converting electrical signals from the computing device 102 into a form that can be transmitted with electromagnetic signals by one or more radiating components of the radiating element 108. For example, the transceiver module 132 can convert an electrical signal from the computing device 102 into a signal to be received by a signal injection circuit. Similarly, the receive mode includes converting incoming electromagnetic signals from one or more signal detection circuits (e.g., antenna, photodetector, etc.) into electrical signals to be processed by the computing device 102. In some implementations, the signals transmitted or received are amplified by an amplifier and/or an optical amplifier, or by any other means of increasing signal strength, gain, power, voltage, and/or current such as a transistor, an operational amplifier, capacitors, diodes, voltage multiplier circuits, step-up transformers, resonant coils, vacuum tubes, traveling wave tubes and/or adjusting the current and/or resistance or a combination of amplifying techniques.

In some implementations, the control module 130 determines a number of active channels, wherein the active channels include electromagnetic, acoustic, and/or optical communication channels. In some implementations, an active acoustic channel includes transmission of acoustic signals with one or more speakers, e.g., electrostatic speakers and/or transducers.

In some cases, the computing device 102 determines a pattern of light emitted from one or more light sources of the radiating element 108, e.g., lasers. In addition, the computing device 102 determines a pattern of radiation emitted from a helical antenna. The computing device 102 can implement one or more machine learning models to determine and/or detect patterns of radiation in the optical and radio frequency domains. In some cases, the computing device 102 configures the transceiver module 132 to communicate appropriate drive signals to each signal injection circuit, e.g., a helical antenna and/or a light source like a laser. The computing device 102 can determine a mode of the transceiver module 132, e.g., transmit or receive, and which communication channel is to be implemented, based on an output of the one or more machine learning models and/or rules-based algorithms. In general, operations of an optical system, which includes one or more of a light source like a laser, a photodetector, a spectrometer, an optical lens, linear and nonlinear devices, and associated electrical and computational resources.

In some implementations, the transceiver module 132 includes a radio frequency transceiver and/or a laser transceiver communicatively coupled to the computing device 102.

In some implementations, the control module 130 is coupled to the computing device 102. In some other implementations, the control module 130 is integrated with the computing device 102. In some implementations, the computing device 102 and associated power supply are connected to a software defined radio, a central processing unit (CPU), a graphics processing unit (GPU), a tensor processing unit (TPU), a data acquisition system, a data storage medium, and input peripherals. In some implementations, the computing device 102 implements an operating system. In some implementations, the software-defined radio includes a radio frequency interface (e.g., an RF front end), an analog-to-digital converter (ADC), a digital-to analog-converter (DAC), a field-programmable gated array (FPGA), a processor, and associated software.

In some implementations, the computing device 102 displays a graphical user interface. The graphical user interface can display a digital twin of the system 100. A digital twin is a digital representation of the system and a network that the system is connected to that allows a user to locate and interact with the system. For example, the graphical user interface can allow a user to interact with a digital copy of the Earth to locate a communication node in space or on the ground. In some implementations, the graphical user interface displays digital twin nodes as icons. The graphical user interface displays a digital representation of system information, network information, and signal transmission associated with a current state of one or more nodes. Each communication system (e.g., the system 100) is associated with a digital twin that is displayed, through a graphical interface on a computing device (e.g., the computing device 102), as a digital representation of all the components of the system including the system orientation, the system geolocation, and an exact rotation of coils of a radiating element (e.g., the radiating element 108).

In some implementations, the computing device 102 is connected to a security hub 110. The security hub 110 defines a security protocol that controls access to the computing device 102 and related hardware and software systems. The security hub 110 includes one or more databases to store user data and data related to transmission of data over a network, in which the system 100 is connected. In some implementations, the security hub 110 monitors data transmitted by the system 100 and data received by the system 100 and stores data in the one or more databases. In some implementations, the security hub 110 stores user data and monitors the digital and physical environment of the user with one or more sensors, cameras, detectors, or other monitoring devices. In some cases, the security hub 110 collects and stores user data locally. In some cases, the security hub 110 is connected to a network. The security hub 110 can connect to mobile devices, desktop computers, remote and/or local servers, internet of things (IoT) devices. In some cases, the security hub 110 can store user data on remote servers.

In some implementations, the example system 100 is (or included in) a space-based system, in which the system is coupled to a spacecraft or a satellite flight system. The spacecraft includes one or more of protective shielding, landing gear, emergency landing systems, a cargo bay, a cockpit, flight controls, an interactive computer system, a robotic attachment for cargo management, a cargo deployment system for deployment of cargo, a propulsion system, a stability system, and a navigational system. The interactive computer system facilitates human-computer interaction and is communicatively coupled to the spacecraft and its subsystems including flight controls, navigational systems, communication channels, e.g., the system 100 and other means of communication. In some implementations, the navigational system includes one or more flight correction systems using machine learning models and/or manual control to transport the example system 100 to a desired destination and to help keep the example system 100 in a desired orbit.

Figure 2:
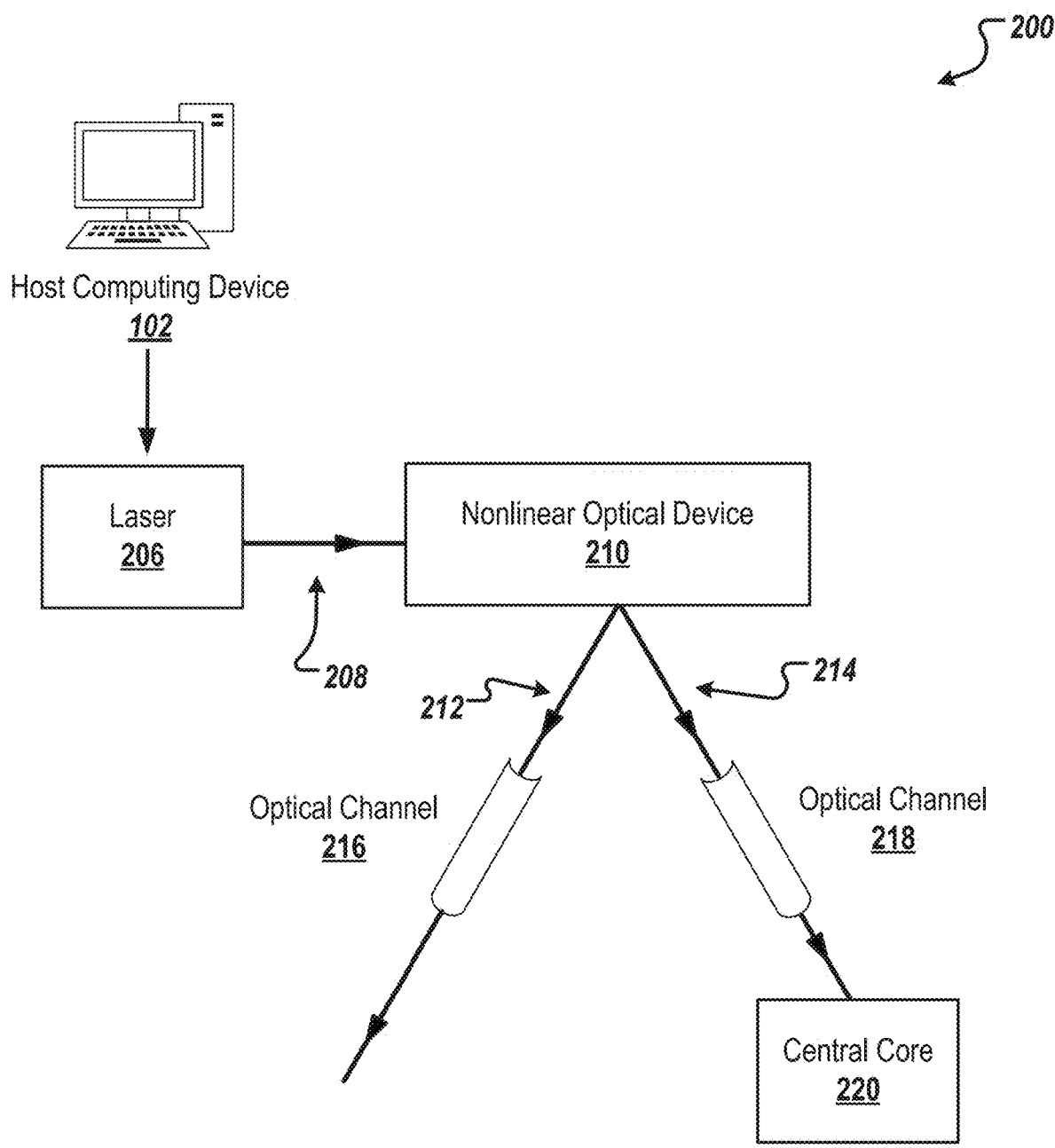
FIG. 2 illustrates an example communication system that includes a source of entangled photons.

FIG. 2 illustrates an example component of a communication system 200 that includes a source of entangled photons. The system 200 is a component of a radiating device, e.g., the radiating element 108, that can securely transmit data from a first location to a second location. A nonlinear optical device 210 is optically coupled to the computing device 102 by a laser 206, wherein the nonlinear optical device 210 converts one or more photons 208 from the laser 206 into one or more pairs of entangled photons. Each pair of entangled photons include a signal photon 212 and an idler photon 214, following the standard physics nomenclature. An entangled state includes two (or more) photons that exist in a correlated optical superposition. For example, an entangled state can include the signal photon 212 and the idler photon 214, in which each photon is in a superposition state of horizontal and vertical polarization, e.g., each photon has a ½ probability of being vertically polarized and a ½ probability of being horizontally polarized. Although both photons have an equal probability of being vertically and horizontally polarized, the relative polarization between the two photons is correlated, such that if the signal photon 212 is vertically polarized, then the idler photon 214 is always horizontally polarized, and vice versa.

The signal photon 212 propagates along an optical channel 216 that can include an optical waveguide, a free-space optical communication system, or a combination thereof. The idler photon 214 propagates along an optical channel 218 that can include an optical waveguide, a free-space optical communication system, or a combination thereof. The optical channel 218 is coupled to a central core 220 of the communication system.

In some implementations, the central core 220 of the communication system includes a plasma and/or a gain medium. An interaction between an idler photon 214 and the plasma and/or the gain medium or other material within the central core 220 of the communication system can be observed through the mechanical orientation of the central core 220 or other characteristics of the system. In some implementations, the signal photon 212 is transmitted by a long-range communication system. A receiving communication system receives and measures the signal photon 212 and can implement one or more quantum communication protocols with the transmitting communication system that observes the idler photon 214 locally.

In some implementations, the state of the entangled photon pair is observed through an observation of the mechanical orientation of the system or any other mode of evaluating correlations between optical signals in one or more spatially distinct optical channels. For example, the measurement of a degree of correlation between electrical signals generated by a signal photodiode and an idler photodiode can reveal the presence of quantum effects in an optical state propagating in the system.

In some implementations, the nonlinear optical device 210 generates the signal photon 212 and the idler photon 214 using a second order nonlinear effect such as spontaneous parametric down conversion. In some other implementations, the nonlinear optical device 210 generates the signal photon 212 and the idler photon 214 using a third order nonlinear effect. Other techniques including plasmon interactions, atomic nonlinearities, or other sources of high-order or low-order optical nonlinearity can be used to generate a down-converted entangled photon pair, where the sum of the energies corresponding to the signal photon 212 and the idler photon 214 is equal to the input photon associated with the laser 206.

In some implementations, a plasma and/or a gain medium inside the central core 220 generates photons. In some implementations, components of the system that emit RF and acoustic signals are configured to emit photons as well. In some implementations, the plasma and/or the gain medium emits photons which are received by a signal detection circuit.

Figure 3:
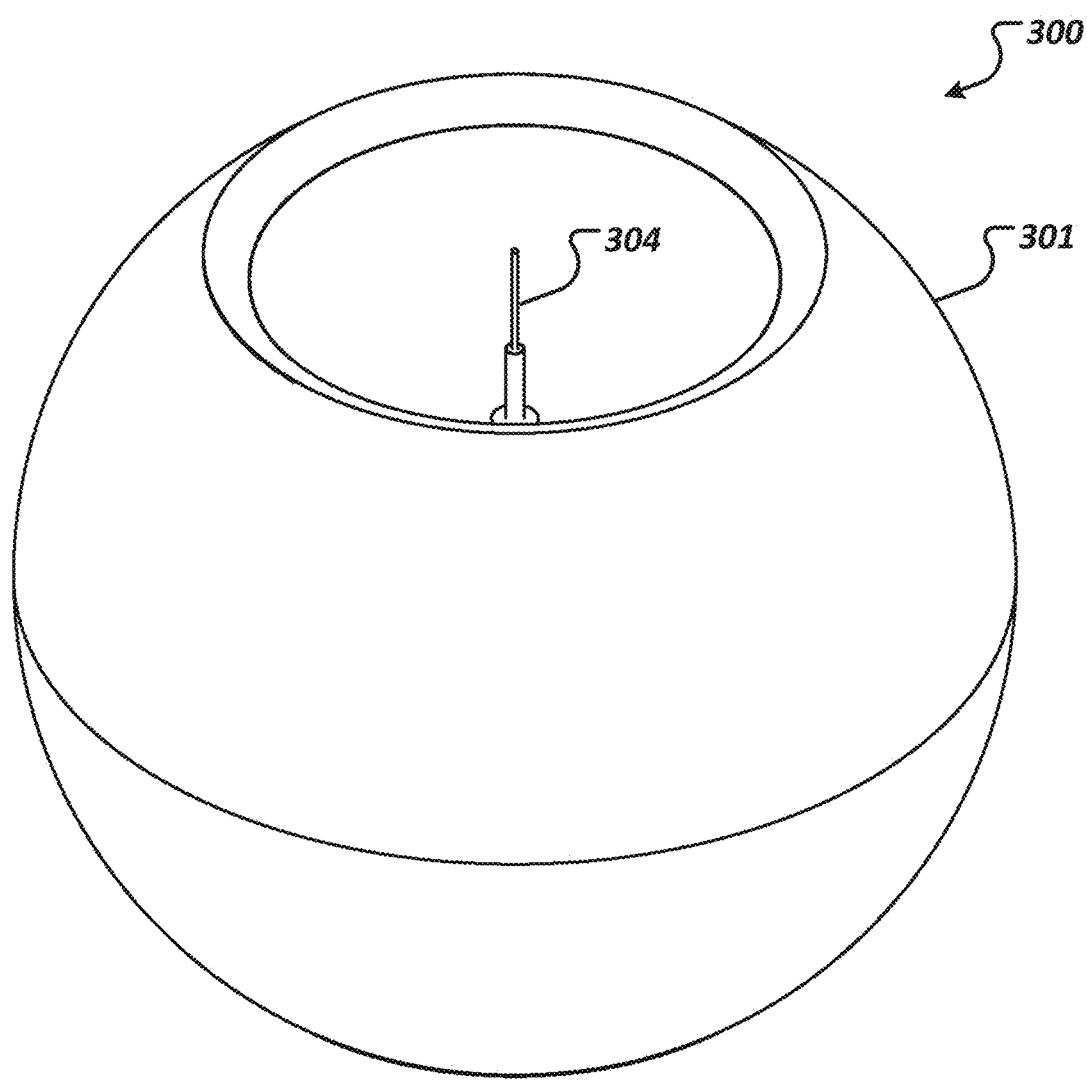
FIG. 3 illustrates components of an example communication system.
Figure 60:
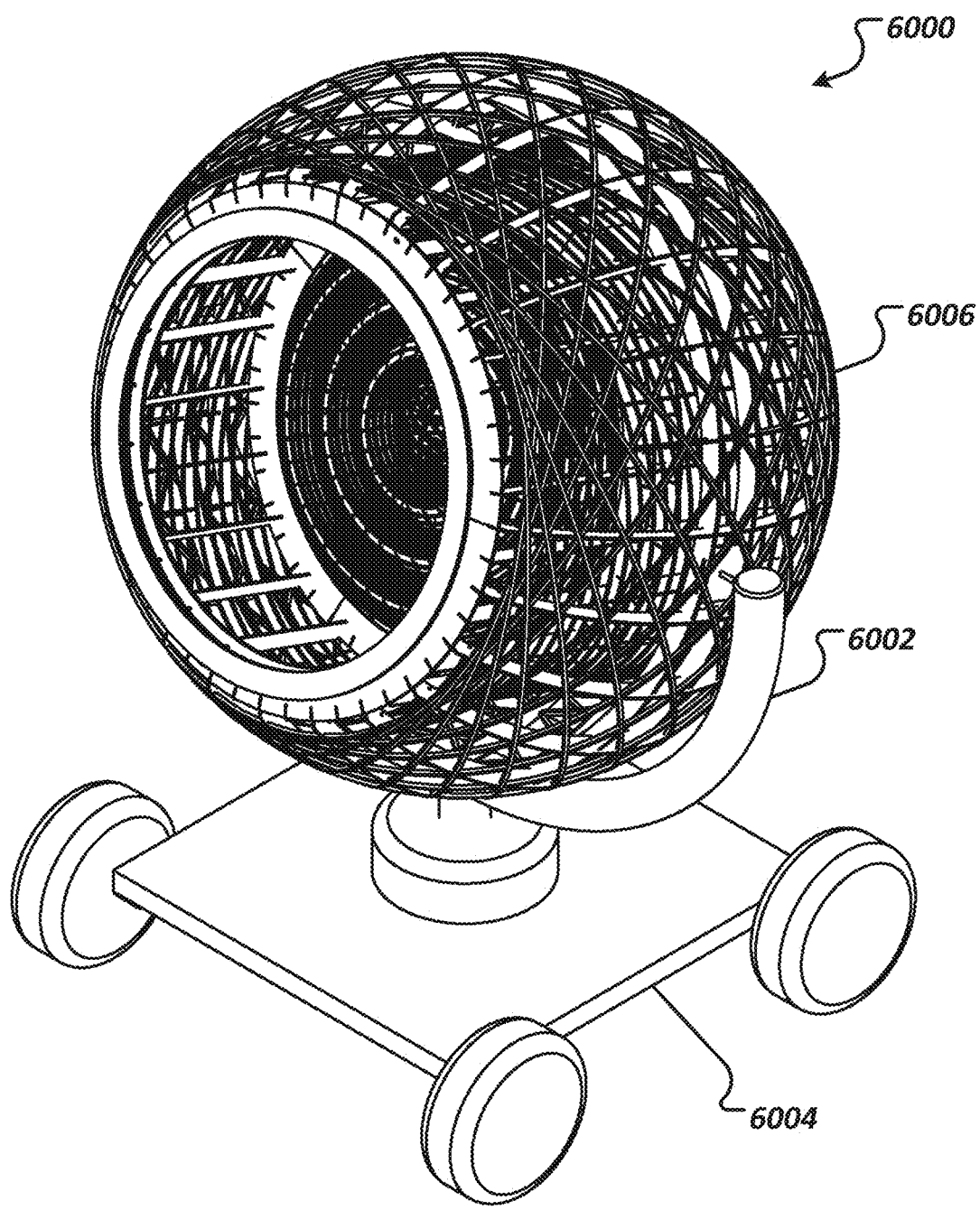
FIG. 60 illustrates components of an example communication system.

Figures FIGS. 3-60 illustrate components of example atomic resonance communication systems. In some cases, the examples include components of signal injection and detection circuits (e.g., antennae, lasers, parabolic reflectors, Helmholtz coils, and particle accelerators). In some cases, the examples include components of radiating elements that include multiple coils, resonant cavities, and resonant coils.

FIG. 3 is an isometric view of an example configuration of components of an example atomic resonance communication system 300, in which the system 300 includes radiating elements encased in a vacuum chamber/fusion reactor shell 301. A signal injection circuit 304 includes a parabolic reflector that receives an electrical signal from a host computer or other computing device that encodes data in an electrical signal. In addition, the signal injection circuit 304 can act as a receiving antenna to detect an RF signal from another communication system. The circuit 304 can detect an RF signal and transmit the signal to the host computer, e.g., the computing device 102 of FIG. 1.

In some implementations the signal injection circuit 304 is communicatively coupled to a computing device, e.g., the computing device 102 of FIG. 1.

Figure 4:
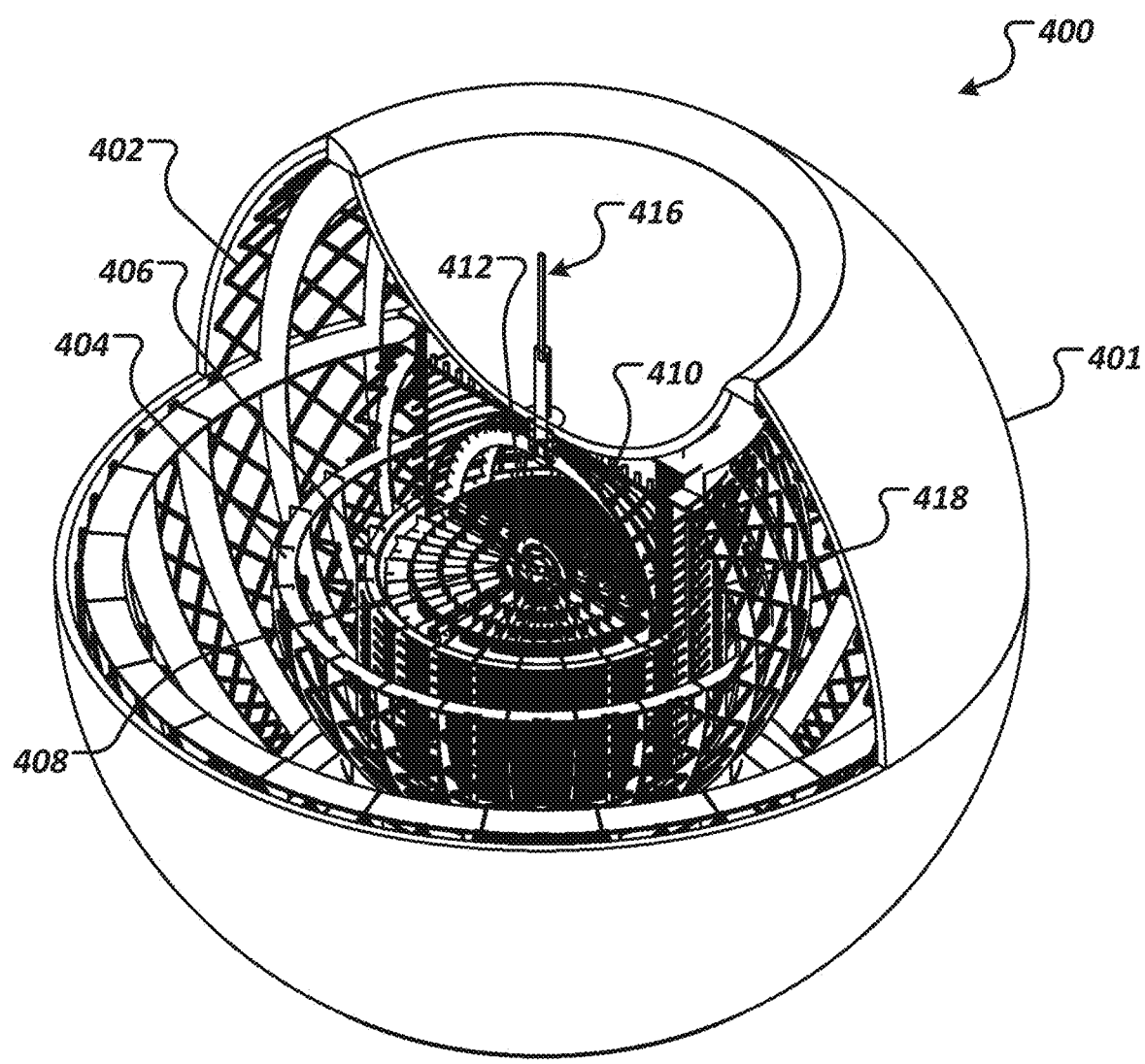
FIG. 4 illustrates a partial cutaway view of components of an example communication system.

FIG. 4 is an isometric view of a partial cutaway of example components of an example toroidal configuration of an atomic resonance communication system 400, in which the system 400 includes radiating elements encased in a vacuum chamber/fusion reactor shell 401. This example illustrates a toroidal configuration of an atomic resonance communication system encased in a vacuum chamber/fusion reactor shell 401 with an iron rotatable or fixed central core 408. In some implementations, the rotatable or fixed central core 408 includes air, glass, ceramic, and/or a composite material. A primary coil 402 is disposed on the outside edge of the system 400, located inside the vacuum chamber/fusion reactor shell 401. A concentric secondary coil 404 is disposed inside the primary coil 402. In this example, the primary coil 402 and secondary coil 404 are configured in a toroidal geometry. Multiple inductor coils 406 are positioned inside the toroidal structure defined by the secondary coil 404.

As described throughout the specification in relation to the following figures, the inductor coils 406 are also referred to as rotary coils, tuning coils, and/or variable inductor coils. The inductor coils 406 may be a rotatable or fixed structure, a helical structure, or a structure of multiple axis orthogonal coils. The multiple inductor coils 406 may be considered inductor or inductive coil sensors and may sense one or more magnetic fields. The inductor coils 406 are configured to have an axis of a first inductor coil rotated relative to an axis of a second inductor coil, a third inductor coil, and additional inductor coils of the system, in which the multiple inductor coils can operate as a gyroscopic device and/or a gimbal device. In some implementations, electrical connections are made between the axis of each coil with one or more of rotary joints, rotary transformers, slip rings, commutators, carbon brushes, and/or other conductive elements of the system. In some implementations, the coils of the multiple inductor coils 406 are electrically connected in series, in which rotating the first coil relative to the other coils changes a mutual inductance between the coils. In some cases, a relative orientation between the coils cause inductance cancellation and a negative mutual inductance. The mutual inductance between the coils is zero if the axes of the coils are perpendicular. In some implementations, each coil of the multiple inductor coils 406 are wound with a particular geometry including a spiral, spherical single layer, basket pattern, slab pattern, pile winding, lattice pattern, or honeycomb pattern. In some implementations, the coils of the multiple inductor coils 406 are connected in series. In some other implementations, the coils of the multiple inductor coils 406 are connected in parallel or wired independently for variable coupling.

In some implementations, the inductor coils 406 are configured to be a fluxgate magnetometer by using multiple windings of magnetic wire or a similar conductor around a material or air core. In some implementations, the inductor coils 406 are single or dual rings within a common set of multiple concentric coil structures of the multiple inductor coils 406. In some implementations, the coils 406 are a fixed structure, a helical structure, or a structure of multiple axis orthogonal coils. The multiple inductor coils 406 may be considered inductor or inductive coil sensors and may sense one or more magnetic fields. In some implementations, multiple inductor coils are wrapped around a cylindrical or spherical vessel, or other type of structure, and are stacked/positioned linearly instead of in a concentric arrangement. The linear configuration realizes a set of electromagnets that control and/or collect magnetic energy stored in the plasma and/or the gain medium. In some implementations, the vessel contains a vacuum. In some other implementations, the vessel contains one or more plasma discharges and associated gases. In some implementations, the pressure of the associated gases contained in the vessel is at a low pressure.

In some implementations the vacuum chamber/fusion reactor shell 401 is external to the central rotatable components of the communication system 400, that includes an open-air cylindrical structure that supports the inductor coils 406, the secondary coil 404, and the rotatable or fixed central core 408.

The rotatable or fixed central core 408 is positioned inside the structure defined by the inductor coils 406. The rotatable or fixed central core 408 contains one or more central core coils 410. A central core cavity 412 is defined inside the one or more central core coils 410.

In some implementations, the inductor coils 406 are configured to receive and/or transmit a signal, e.g., a data signal through an electromagnetic channel and/or a direct electrical channel, from a computing device or another device. In response, inductor coils 406 tune the reception and transmission of the radio frequency signal.

In some implementations, the rotatable or fixed central core 408 rotates along one or more axes that extend through the center of the communication system 400. In some cases, the rotatable or fixed central core 408 rotates in response to an electromagnetic field induced by one or more components of the system 400, e.g., the inductor coils 406. In some implementations, an orientation of the rotatable or fixed central core 408 represents a variable that is indicative of a property of an electromagnetic field received or transmitted by one or more element of the system 400.

In some implementations, plasma antennas 418 are positioned inside the secondary coil 404 and outside the central core 408.

In some implementations, the central core 408 contains one or more materials such as water, coolant, oil, noble gases, biologics, glass, graphite, metal, ceramic, hydrogen, one or more isotopes, and/or magnetic materials. In some cases, the central core 408 includes water, oil, and/or coolant to prolong the life of an x-ray tube filament within the central core 408. In some cases, the central core 408 includes noble gases to create conditions for various types of plasma discharge within the central core 408. The various types of plasma discharge include plasma ring discharge, electrodeless ring discharge, and any other type of plasma discharge. Noble gases, when ionized, create conditions for plasma discharge. Ionization of noble gases in the central core 408 can be achieved by high frequency discharge and/or impulse excitation using high voltage coils, resonant frequency coils, high frequency switching circuits, high frequency oscillator circuits, LC circuits, RLC circuits, and/or continuous wave excitation using vacuum tubes and/or x-ray sources. High frequency electric fields induced by high frequency magnetic fields can also induce plasma discharge. In addition, the plasma can be inductively and/or capacitively coupled to one or more components of the system.

In some implementations the central core 408 includes one or more magnetrons, microwave cavities, or microwave emitters for microwave injection into the plasma of the central core 408. In some implementations, the x-ray tube and/or one or more magnetrons operate as a component of a signal injection circuit. In some implementations, the system includes an x-ray tube and does not include one or more magnetrons. In some other implementations, the system includes one or more magnetrons and does not include an x-ray tube. In some other implementations, the system includes both an x-ray tube and one or more magnetrons.

In some cases, glass vessels house the noble gas and the associated plasma and/or gain medium. In some cases, the central core 408 includes biologics, hydrogen, one or more isotopes, gain medium, laser diodes, gas lasers, electrons, positrons, ions, neutrons, neutrinos, atomic species, crystal rods, mirrors, reflectors, lenses, beam splitters, and/or magnetic materials that interact with the plasma and/or gain medium. In some implementations, graphite, metal, composites, plastics/polymers, wood, and/or ceramics are used to hold the elements of the core and the entire system together such as frameworks and electrical sockets. In some cases, the central core 408 includes magnetic materials such as ferrite, permanent magnets, rare earth magnets, and/or electromagnets to increase the magnetic flux density within the central core 408. In some cases, metal films and/or metal layers are used on the outside of the glass vessels to act as a reflective surface or to reduce stray radiation from the x-ray tube within the central core 408. In some cases, a liquid helium or a liquid nitrogen bath cools the coils of the system. In some implementations, the coils of the central core 408, in addition to all coils described throughout this specification, are made of a superconducting material.

In this example, a signal injection circuit 416 (e.g., an antenna) is coupled to the central core 408 and can receive RF signals and transmit the signal to the central core 408. The received RF signal is subsequently transmitted to a computing device (e.g., the computing device 102). In addition, the signal injection circuit 416 can be configured to emit a signal that is transmitted from the computing device.

In some implementations, the signal injection circuit 416 includes one or more antennae, which can include one or more optical emitters and/or optical detectors. The one or more antennae can include a helical antenna, an optohelical antenna, a spherical antenna, a toroidal antenna, and a cylindrical antenna, in which a control module determines one or more active antennae to transmit or receive a radio frequency signal or optical signal. In some implementations the signal injection circuit 416 is communicatively coupled to a computing device, e.g., the computing device 102 of FIG. 1.

In the overall structure of the system 400, various components can be included to assist operations. For example, the core 408 (also presented from a better viewing perspective as system 900 in FIG. 9) contributes considerably to operations.

Figure 5:
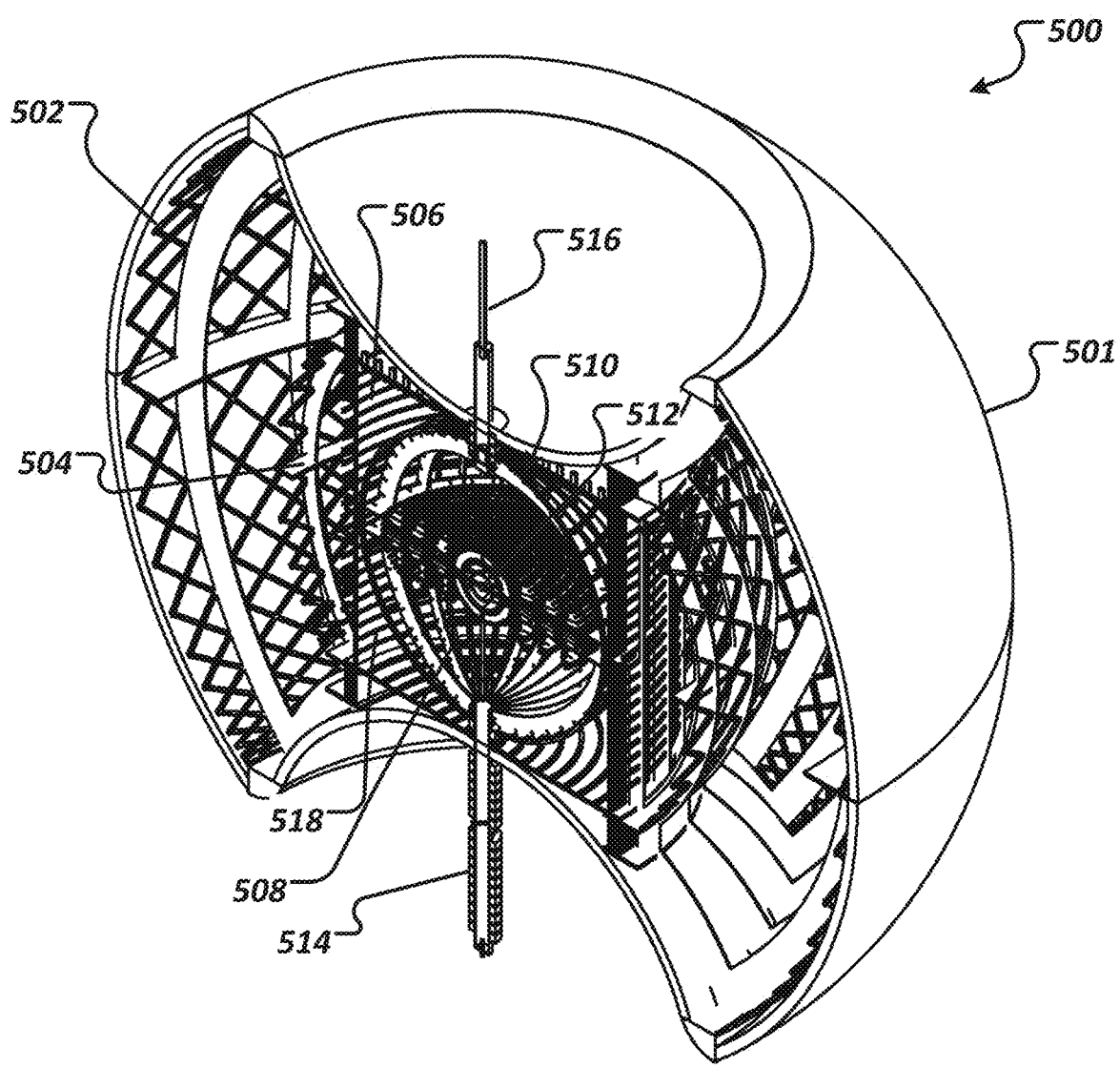
FIG. 5 illustrates a cutaway view of components of an example communication system.

The following descriptions of FIGS. 5-60 are related to multiple configurations and views of atomic resonance communication systems. Components described in relation to FIGS. 5-60 (e.g., central core, signal injection circuit, inductor coils, etc.) operate as described in relation to previous figures (e.g., a signal injection circuit described in relation to one of the FIGS. 5-60 operates like the signal injection circuit 416 as described in relation to FIG. 4). In some cases, a particular component (e.g., a signal injection circuit) may be implemented using a different geometry of coupling mechanism, but the functional role of the particular component is the same as described in previous figures. For example, in some implementations, a signal injection circuit is implemented with a Helmholtz coil. In some other implementations, a signal injection circuit is implemented with an RF antenna. In some other implementations, a signal injection circuit is implemented as an optical emitter. Although the geometry and structure of each signal injection circuit is different, the functionality of the circuit is the same in relation to other components of the system.

FIG. 5 is an isometric view full length cutaway of components of an example toroidal configuration of an atomic resonance communication system 500, in which radiating elements are encased in a vacuum chamber/fusion reactor 501. The configuration illustrated in FIG. 5 is the full length cutaway view of the configuration illustrated in FIG. 4. In addition to the vacuum chamber/fusion reactor 501, the system 500 includes primary coils 502, concentric secondary coils 404, multiple inductor coils 506 of a rotatable or fixed central core 508, central core coils 510, central core cavity 512, and a signal detection circuit 516 implemented as an antenna. The system 500 also includes an injection circuit 514 implemented as a particle accelerator, laser, or a combination of multiple electromagnetic devices. In some implementations, the multiple inductor coils 506 are free to rotate and are toroidal single wound antennas or toroidal contrawound antennas. In some implementations, the multiple inductor coils 506 are a fixed structure, a helical structure, or a structure of multiple axis orthogonal coils. The multiple inductor coils 506 may be considered inductor or inductive coil sensors and may sense one or more magnetic fields. In some implementations, the multiple inductor coils 506 can be positioned to tune and/or phase shift the electromagnetic signals received by the inductor coils 506 and/or transmitted by the inductor coils 506.

In some implementations, the inductor coils 506 are positioned linearly instead of concentric to create a magnetic field confinement. In some implementations, the inductor coils 506 are configured to receive electrical power and/or electrical signals from one or more other components of the system.

In some implementations, plasma antennas 518 are positioned inside the secondary coil 504 and outside the rotatable or fixed central core 508.

In this example, the signal injection circuit 514 is a particle accelerator and the signal detection circuit 516 is an antenna. In some implementations, the signal injection circuit 514 is communicatively coupled to a computing device (e.g., the computing device 102). The computing device transmits a data transmission pattern to the one or more elements of the signal injection circuit. In some implementations, a control module determines how many communication channels are active, and which signals are transmitted on each channel. In some cases, a signal is transmitted on multiple channels (e.g., the antenna of the signal detection circuit 514 and the particle accelerator of the signal injection circuit 514). In some cases, the electromagnetic field induced by the signal of the particle accelerator interacts with plasma and/or gain medium in the central core cavity 512 to induce a secondary electromagnetic signal.

Figure 6:
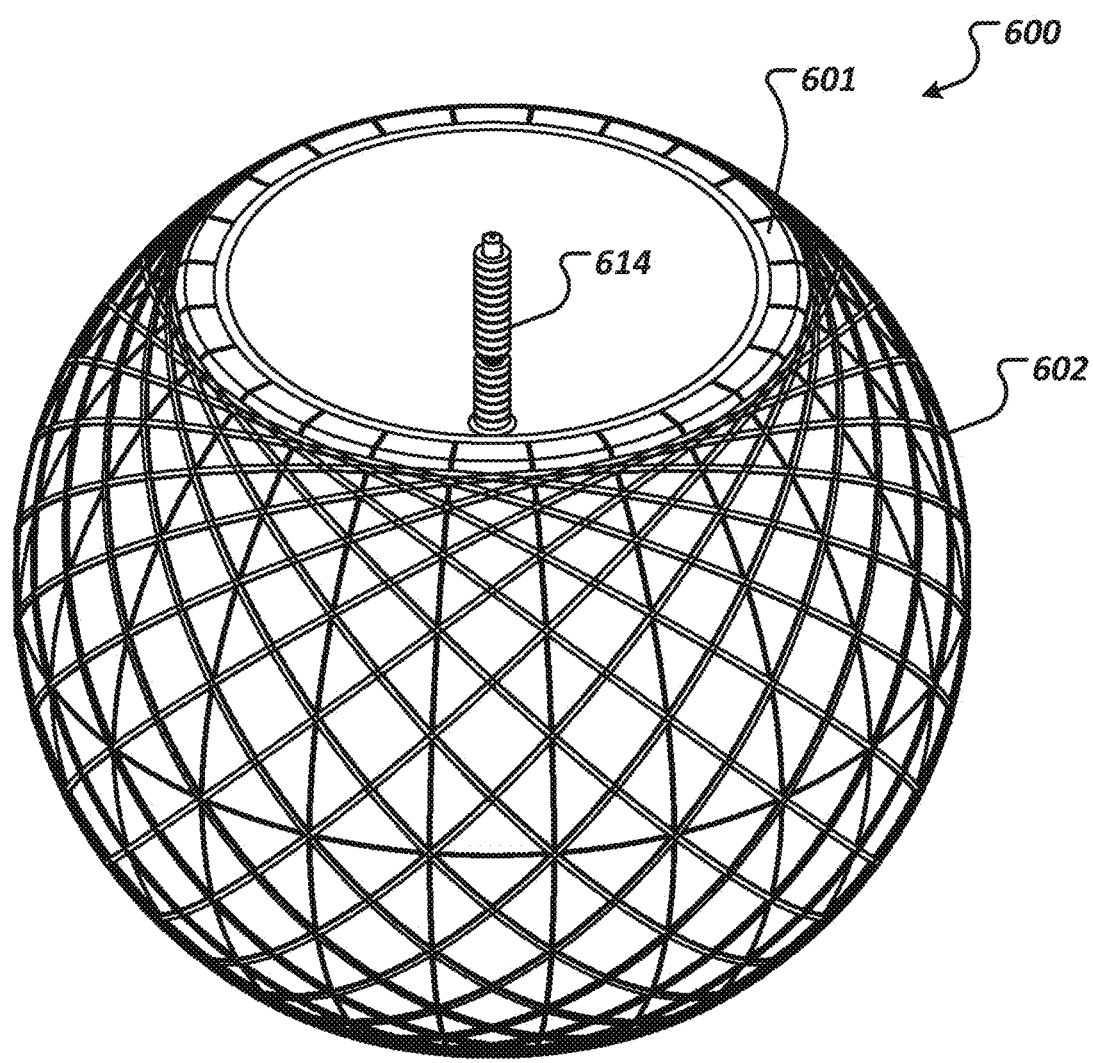
FIG. 6 illustrates components of an example communication system.

FIG. 6 is an isometric view of components of an example toroidal configuration of an atomic resonance communication system 600, in which the system 600 includes radiating elements encased in a vacuum chamber/fusion reactor shell 601 with external primary coils 602. A signal injection circuit 614 implemented as a particle accelerator is communicatively coupled to a computing device and a central core of the communication system. The functionality of the signal injection circuit 614 is the same as the functionality described in relation to the signal injection circuit 514. In some implementations, external coils of the vacuum chamber/fusion reactor shell with external primary coils 602 are used to transmit and receive electromagnetic signals.

In the atomic resonance communication systems described here, various components can be included to assist operations. For example, a core component 708 (presented in FIG. 7) coupled to the particle accelerator contributes considerably to operations.

Figure 7:
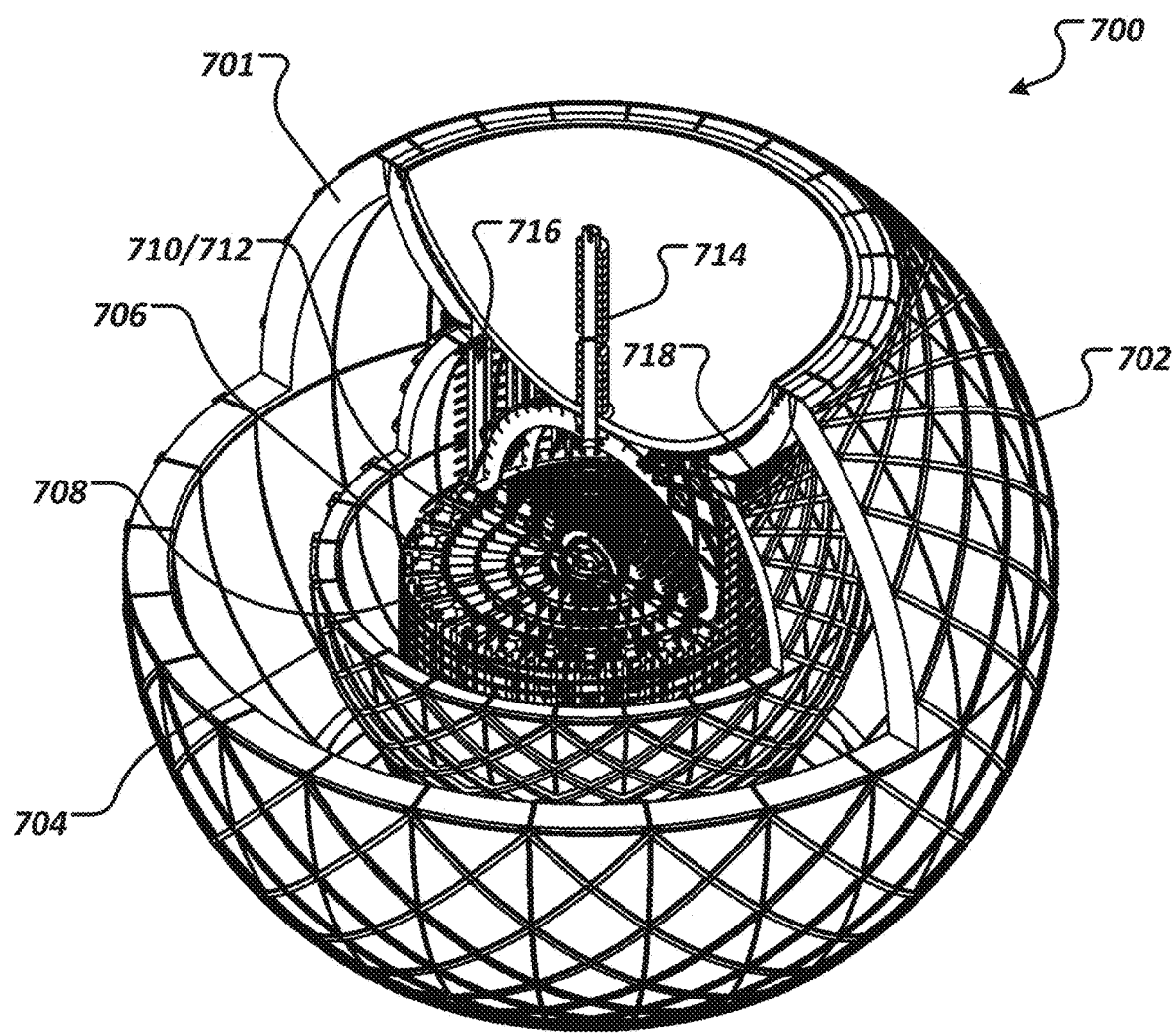
FIG. 7 illustrates a partial cutaway view of components of an example communication system.

FIG. 7 is an isometric view partial cutaway of components of an example toroidal configuration of an atomic resonance communication system 700, in which radiating elements are encased in a vacuum chamber/fusion reactor shell 701 with external primary coils 702. Primary coils 702 are disposed on the outside edge of the system 700. A concentric secondary coil 704 is disposed inside the primary coil 702. In this example, the primary coils 702 and secondary coil 704 are configured in a toroidal geometry. Multiple inductor coils 706 are positioned inside the toroidal structure defined by the secondary coil 704.

A rotatable or fixed central core 708 is positioned inside the structure defined by the inductor coils 706. The rotatable or fixed central core 708 contains one or more central core coils 710. A central core cavity 712 is defined inside the one or more central core coils 710.

In this example, a signal injection circuit is implemented as a particle accelerator 714, one or more plasma antennas 716, and one or more Helmholtz coils 718. The particle accelerator, plasma antennas 716, and Helmholtz coils 718 are communicatively coupled to a computing device (e.g., the computing device 102). The computing device transmits a data transmission pattern to the one or more elements of the signal injection circuit.

In this example, a signal detection circuit includes one or more plasma antennas 716 and one or more Helmholtz coils 718. Similar to the signal injection circuit elements, each signal detection circuit element is communicatively coupled to the computing device (e.g., the computing device 102). The signal detection circuit elements detect data transmission patterns and transmit the corresponding data transmission pattern to the computing device.

In the overall structure of the system 700, various components can be included to assist operations. For example, the core component 708 (also presented from a different viewing perspective as system 900 in FIG. 9) contributes considerably to operations.

Figure 8:
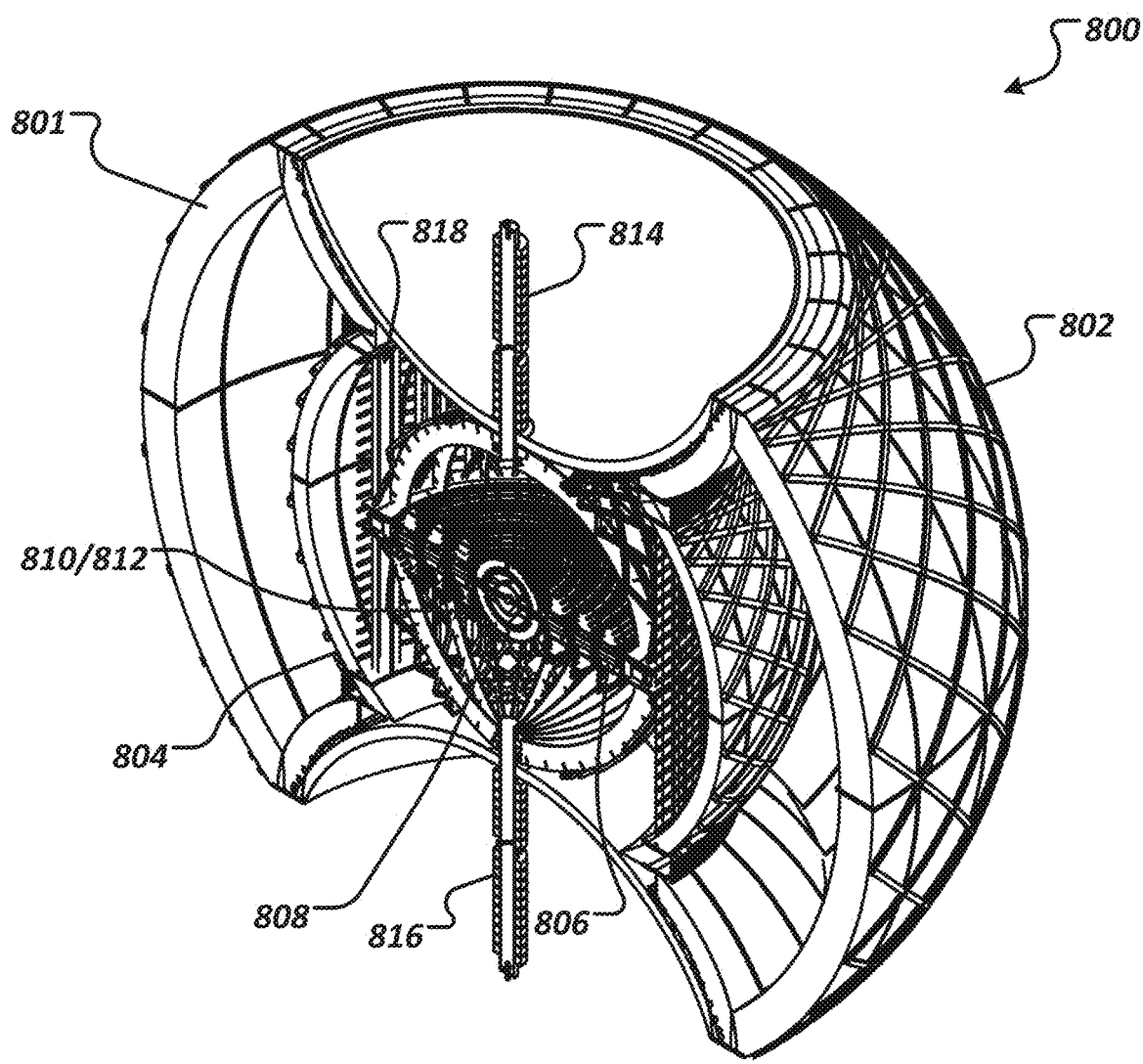
FIG. 8 illustrates a cutaway view of components of an example communication system.

FIG. 8 is an isometric view full length cutaway of components of an example toroidal configuration of an atomic resonance communication system 800, in which radiating elements are encased in a vacuum chamber/fusion reactor 801 with external primary coils 802. The configuration illustrated in FIG. 8 is the full length cutaway view of the configuration illustrated in FIG. 7. In addition to the vacuum chamber/fusion reactor 801, the primary coils 802, concentric secondary coil 804, multiple inductor coils 806 of the rotatable or fixed central core 808, central core coils 810, central core cavity 812, plasma antennas 818, and signal injection circuit 814 implemented as a particle accelerator, FIG. 8 illustrates an additional signal detection circuit 816 implemented as a particle accelerator.

In some implementations, the multiple inductor coils 806, also referred to as rotary coils, tuning coils, and/or variable inductor coils, are free to rotate and are toroidal single wound antennas or toroidal contrawound antennas. In some implementations, the multiple inductor coils 806 can be positioned to tune and/or phase shift the electromagnetic signals received by the inductor coils 806 and/or transmitted by the inductor coils 806. In some implementations, the multiple inductor coils 806 are a fixed structure, a helical structure, or a structure of multiple axis orthogonal coils. The multiple inductor coils 806 may be considered inductor or inductive coil sensors and may sense one or more magnetic fields.

In the overall structure of the system 800, various components can be included to assist operations. For example, the core component 808 (also presented from a better viewing perspective as system 900 in FIG. 9) contributes considerably to operations.

Figure 9:
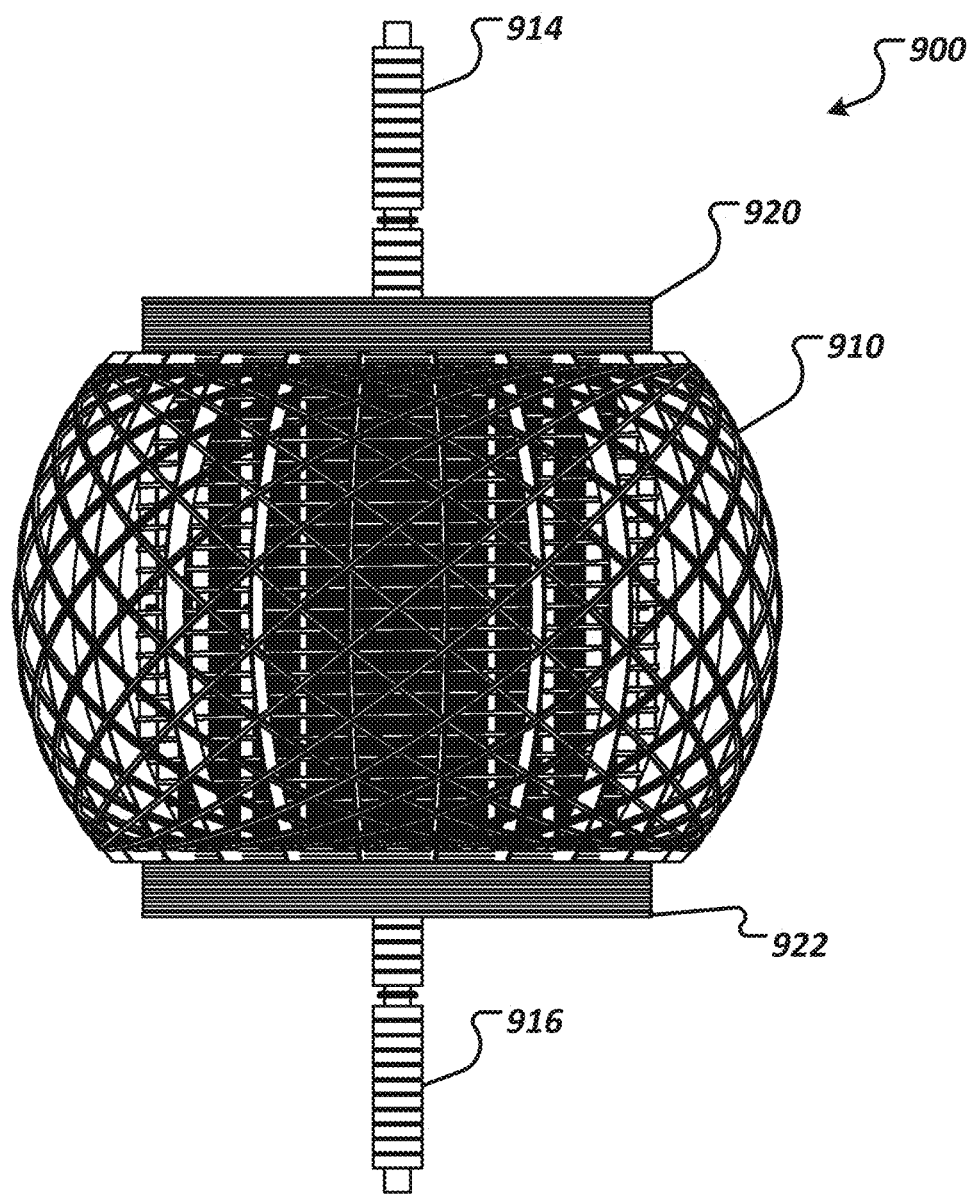
FIG. 9 illustrates a side view of components of an example communication system.

FIG. 9 is a side profile view of components of an example toroidal configuration of an atomic resonance communication system 900. The system 900 includes a secondary coil 910, a signal injection circuit 914 implemented as a particle accelerator, a signal detection circuit 916 implemented as a particle accelerator, an additional signal injection circuit 920 implemented as Helmholtz coils, and an additional signal detection circuit 922 implemented as Helmholtz coils.

In the overall structure of the system 900, various components can be included to assist operations. For example, a central core component and inductor coils disposed within the secondary coil 910 (also presented from a better viewing perspective as a central core 1008 and inductor coils 1012 in FIG. 10) contributes considerably to operations and are positioned within the secondary coil 910.

Figure 10:
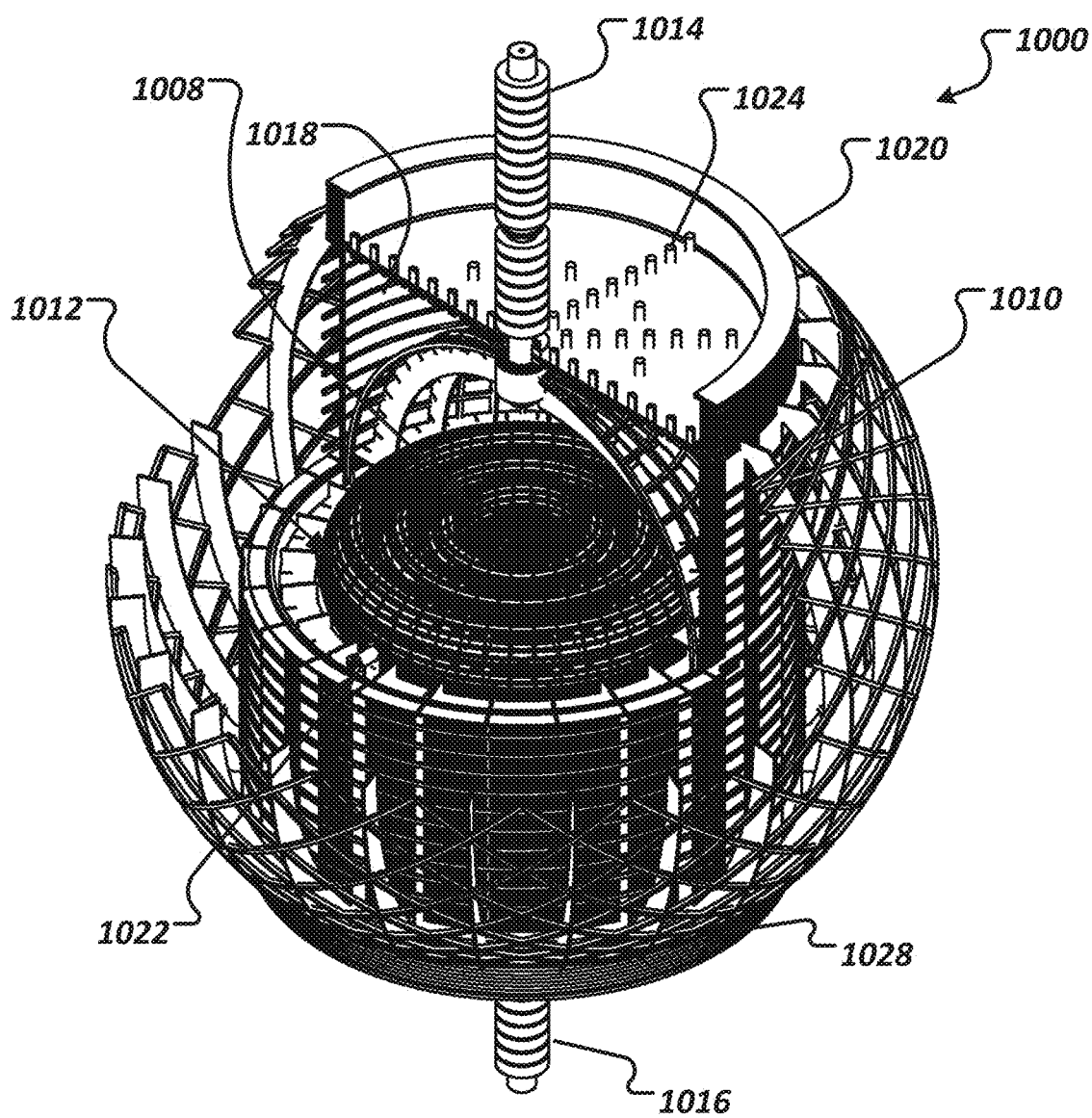
FIG. 10 illustrates a partial cutaway view of components of an example communication system.

FIG. 10 is an isometric view partial cutaway of components of an example toroidal configuration of an atomic resonance communication system 1000. The system 1000 illustrated in FIG. 10 is the same system 900 as depicted in FIG. 9. The system 1000 includes a secondary coil 1010, a first signal injection circuit 1014 implemented as a particle accelerator, a first signal detection circuit 1016 implemented as a particle accelerator, an second signal injection circuit 1020 implemented as Helmholtz coils, an second signal detection circuit 1028 implemented as Helmholtz coils, a third signal injection circuit 1024 implemented as photodiodes, plasma antennas 1018, rotatable or fixed central core 1008, circuits of the central core 1022 (e.g., motors, rings, wires, etc.), and inductor coils 1012.

In some implementations, the structure that supports the plasma antennas 1018 also supports one or more silicon detectors and/or coils.

Figure 11:
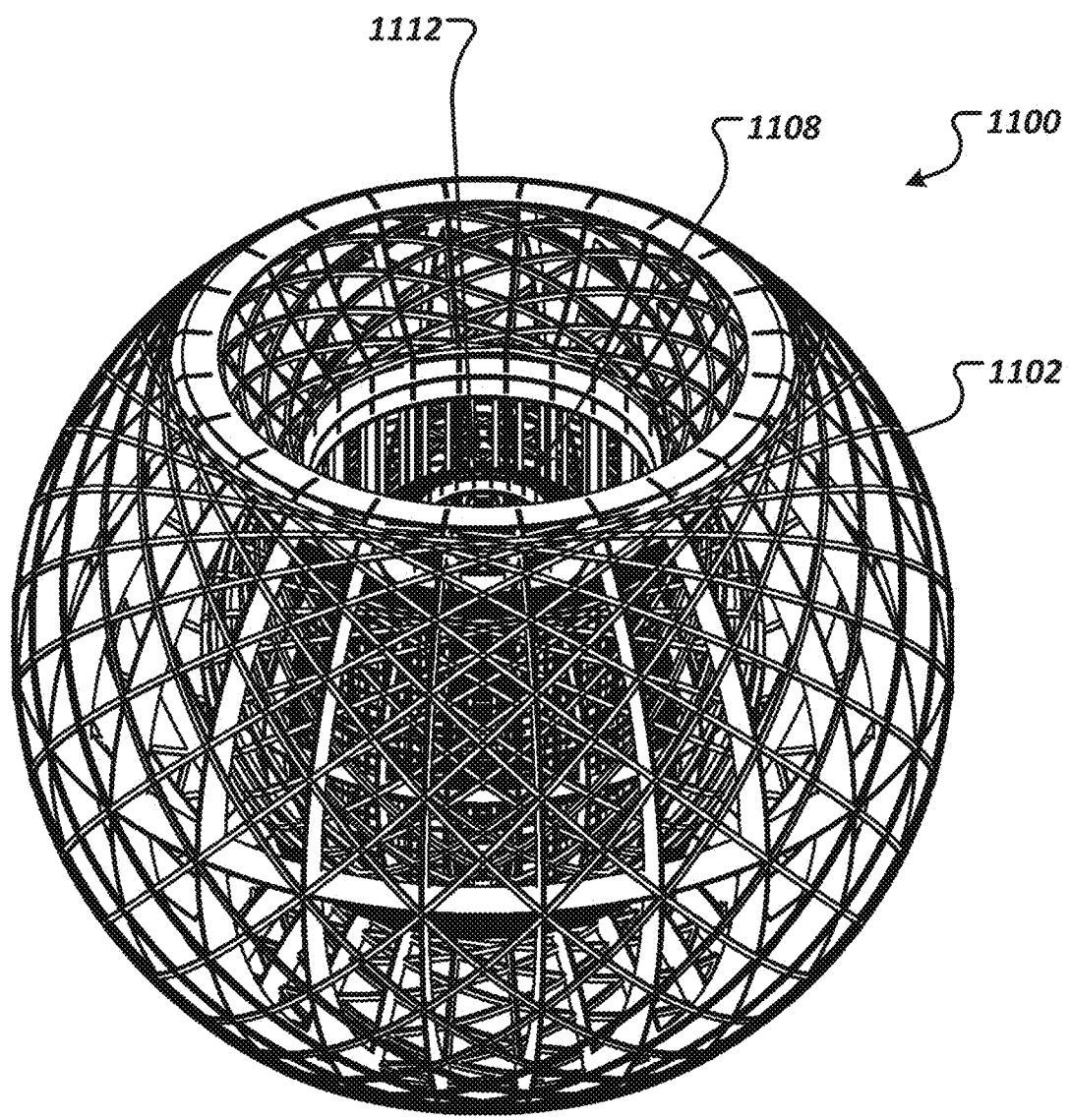
FIG. 11 illustrates components of an example communication system.

FIG. 11 is an isometric view of components of an example toroidal configuration of an atomic resonance communication system 1100 that includes primary coils 1102 disposed on the outside surface of the system 1100.

In the overall structure of the system 1100, various components can be included to assist operations. For example, a central core component and secondary coils (also presented from a better viewing perspective in various configurations in FIGS. 12-21, e.g., central core 1208 and secondary coils 1204 of FIG. 12) contribute considerably to operations and are positioned within the primary coils 1102.

FIGS. 12-21 represent distinct configurations of the system 1100 in which a central core exhibits a configuration that includes a respective geometric orientation of various central core components. Common components between each configuration include primary coils 1202 and secondary coils 1204 as described in relation to FIG. 12. For each configuration, the functionality of each component in relation to other components is the same, despite that the geometry and positioning of components can vary between configurations.

Figure 12:
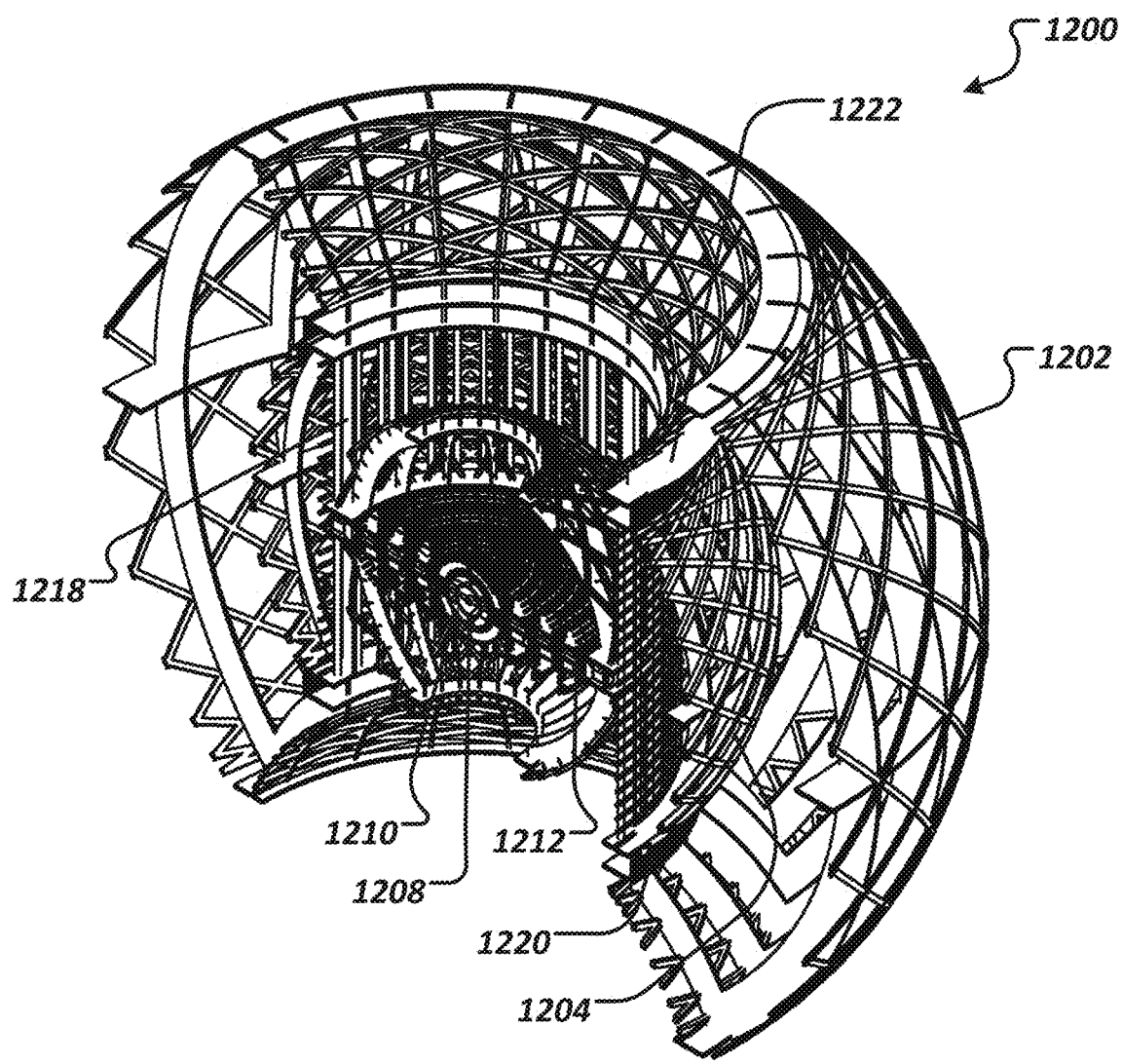
FIG. 12 illustrates a cutaway view of components of an example communication system.

FIG. 12 is an isometric view full length cutaway of components of an example toroidal configuration of an atomic resonance communication system 1200 configured in a first central core orientation that includes central core coils 1210, plasma antennas 1218, central core 1208, inductor coils 1212, signal injection circuit 1220 implemented as Helmholtz coils, signal detection circuit 1222 implemented as Helmholtz coils, the primary coils 1202, and the secondary coils 1204 that are concentric to and inside the primary coils 1202. The configuration illustrated in FIG. 12 is a full length cutaway view of the configuration illustrated in FIG. 11 with the first central core orientation.

Figure 13:
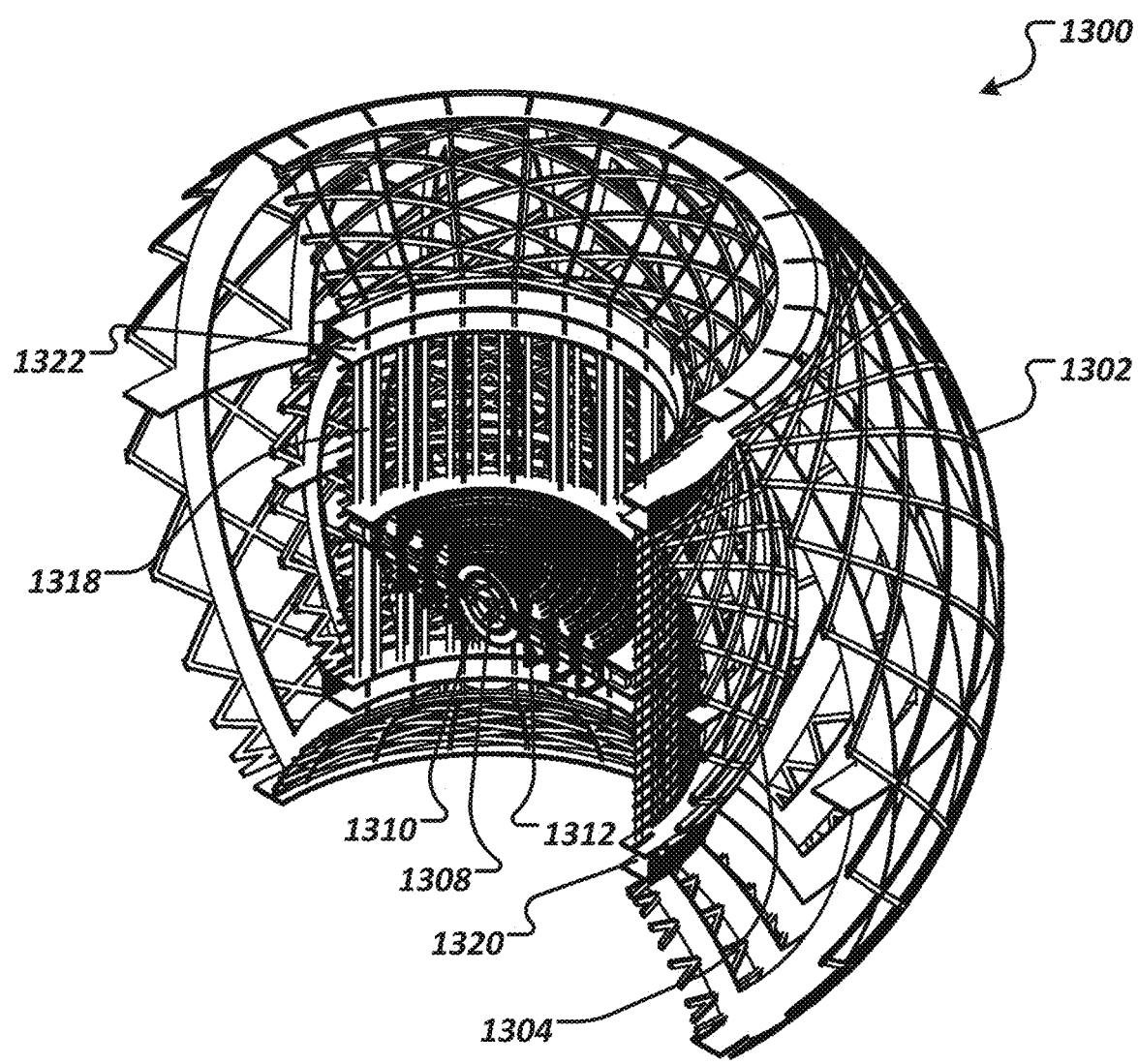
FIG. 13 illustrates a cutaway view of components of an example communication system.

FIG. 13 is an isometric view full length cutaway of components of an example toroidal configuration of an atomic resonance communication system 1300 configured in a second central core orientation that includes central core coils 1310, plasma antennas 1318, central core 1308, inductor coils 1312, signal injection circuit 1320 implemented as Helmholtz coils, signal detection circuit 1322 implemented as Helmholtz coils, the primary coils 1302, and the secondary coils 1304 that are concentric to and inside the primary coils 1302. The configuration illustrated in FIG. 13 is a full length cutaway view of the configuration illustrated in FIG. 11 with the second central core orientation.

Figure 14:
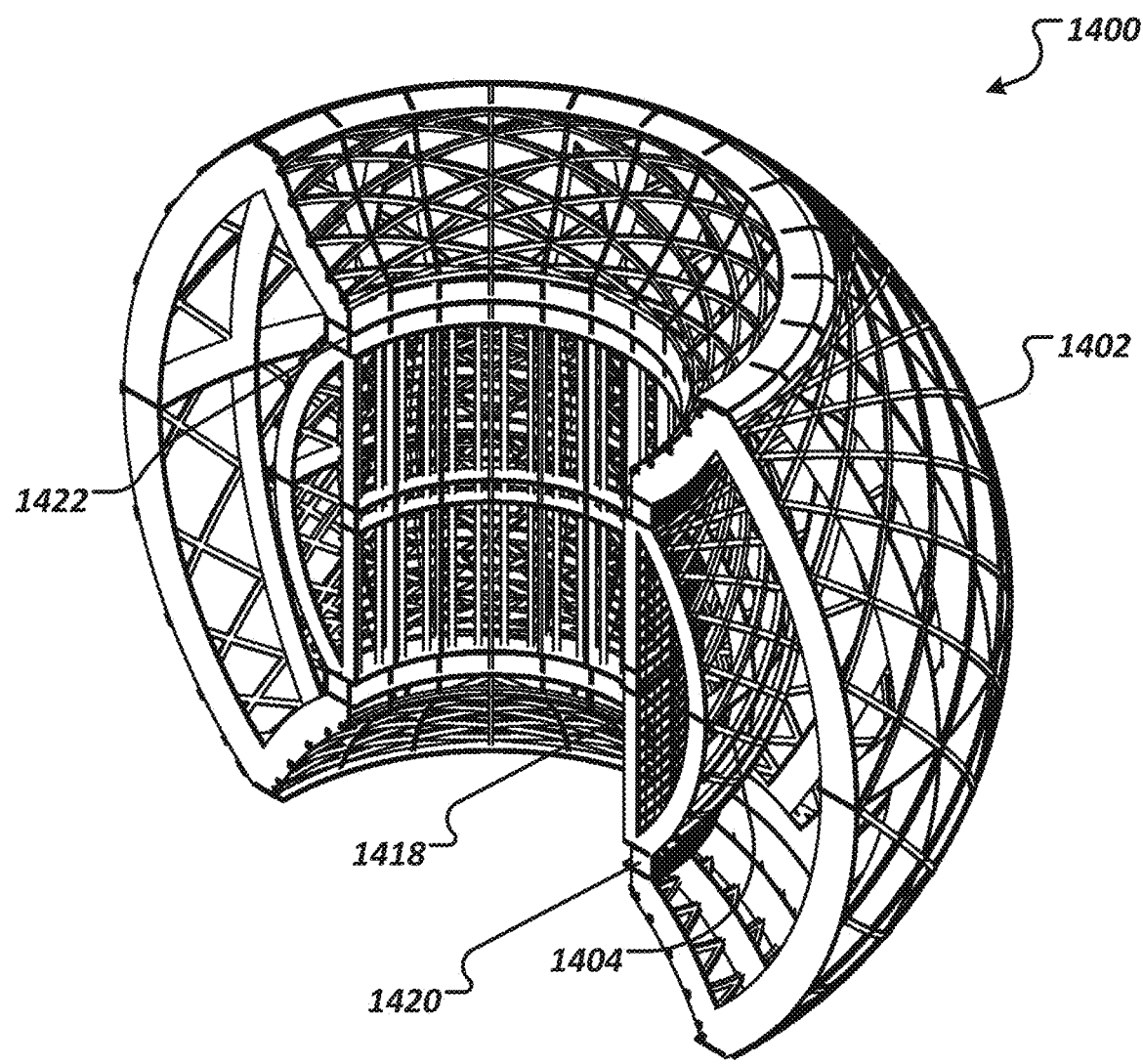
FIG. 14 illustrates a cutaway view of components of an example communication system.

FIG. 14 is an isometric view full length cutaway of components of an example toroidal configuration of an atomic resonance communication system 1400 configured in a third orientation that includes a vacant central core. The system 1400 includes a signal injection circuit 1420, signal detection circuit 1422, the primary coils 1402, secondary coils 1404 that are concentric to and inside the primary coils 1402, and plasma antennas 1416. The signal injection circuit 1420 and the signal detection circuit 1422 are implemented as Helmholtz coils. The configuration illustrated in FIG. 14 is a full length cutaway view of the configuration illustrated in FIG. 11 with the third central core configuration.

Figure 15:
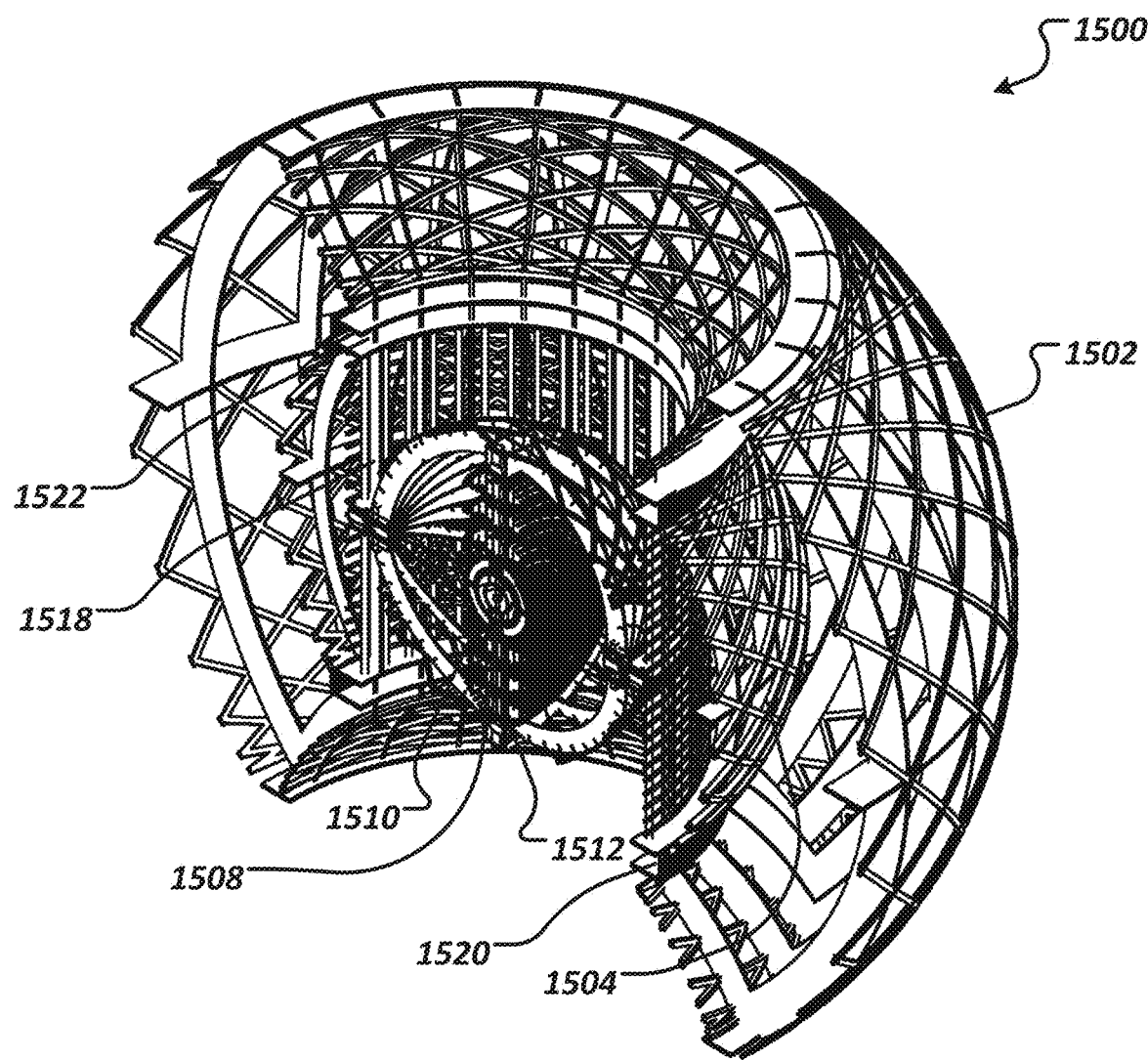
FIG. 15 illustrates a cutaway view of components of an example communication system.

FIG. 15 is an isometric view full length cutaway of components of an example toroidal configuration of an atomic resonance communication system 1500 configured in a fourth central core orientation that includes central core coils 1510, plasma antennas 1518, central core 1508, inductor coils 1512, signal injection circuit 1520 implemented as Helmholtz coils, signal detection circuit 1522 implemented as Helmholtz coils, the primary coils 1502, and the secondary coils 1504 that are concentric to and inside the primary coils 1502. The configuration illustrated in FIG. 15 is a full length cutaway view of the configuration illustrated in FIG. 11 with the fourth central core orientation.

Figure 16:
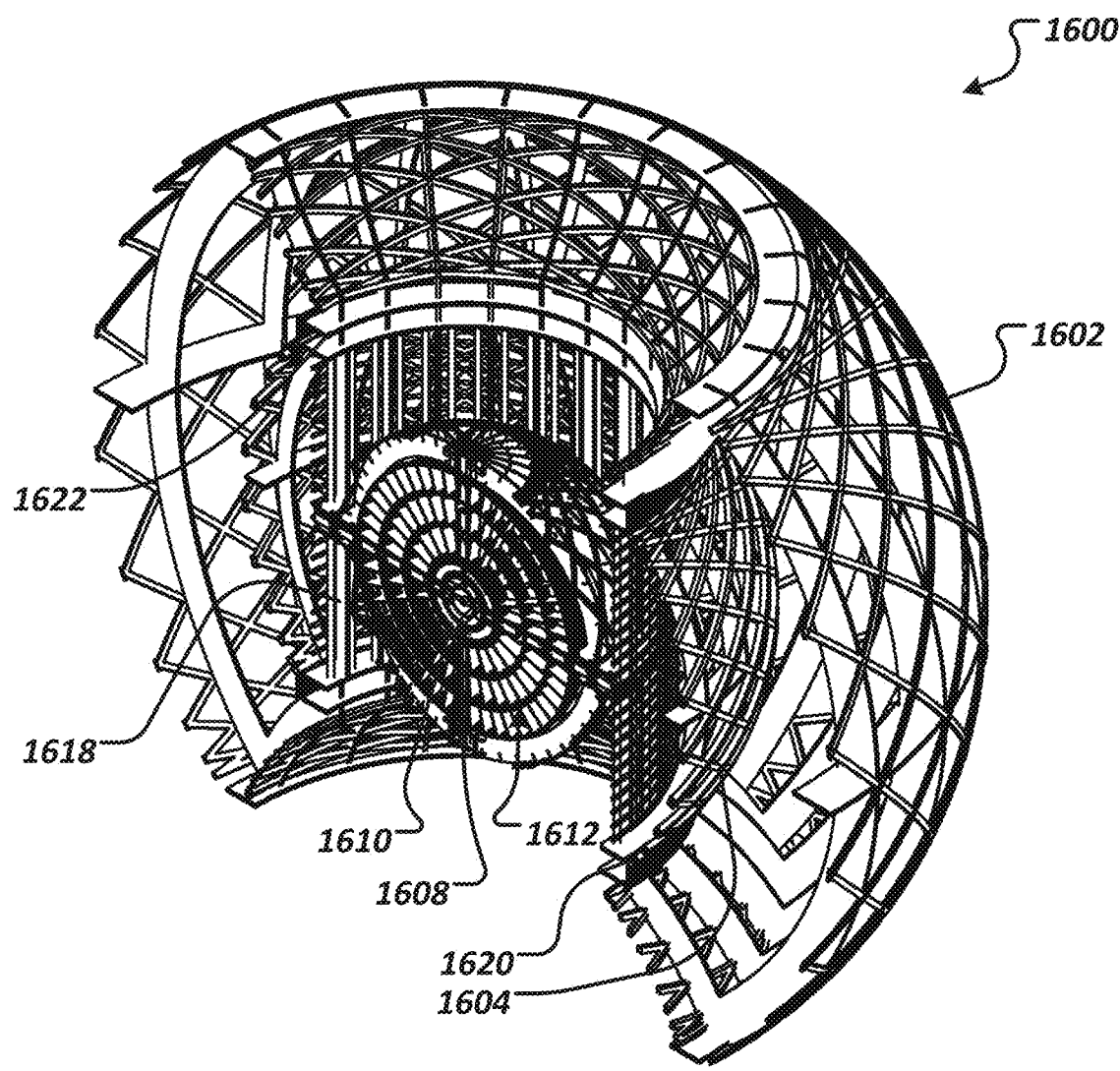
FIG. 16 illustrates a cutaway view of components of an example communication system.

FIG. 16 is an isometric view full length cutaway of components of an example toroidal configuration of an atomic resonance communication system 1600 configured in a fifth central core orientation that includes central core coils 1610, plasma antennas 1618, central core 1608, inductor coils 1612, signal injection circuit 1620 implemented as Helmholtz coils, signal detection circuit 1622 implemented as Helmholtz coils, the primary coils 1602, and the secondary coils 1604 that are concentric to and inside the primary coils 1602. The configuration illustrated in FIG. 16 is a full length cutaway view of the configuration illustrated in FIG. 11 with the fifth central core orientation.

Figure 17:
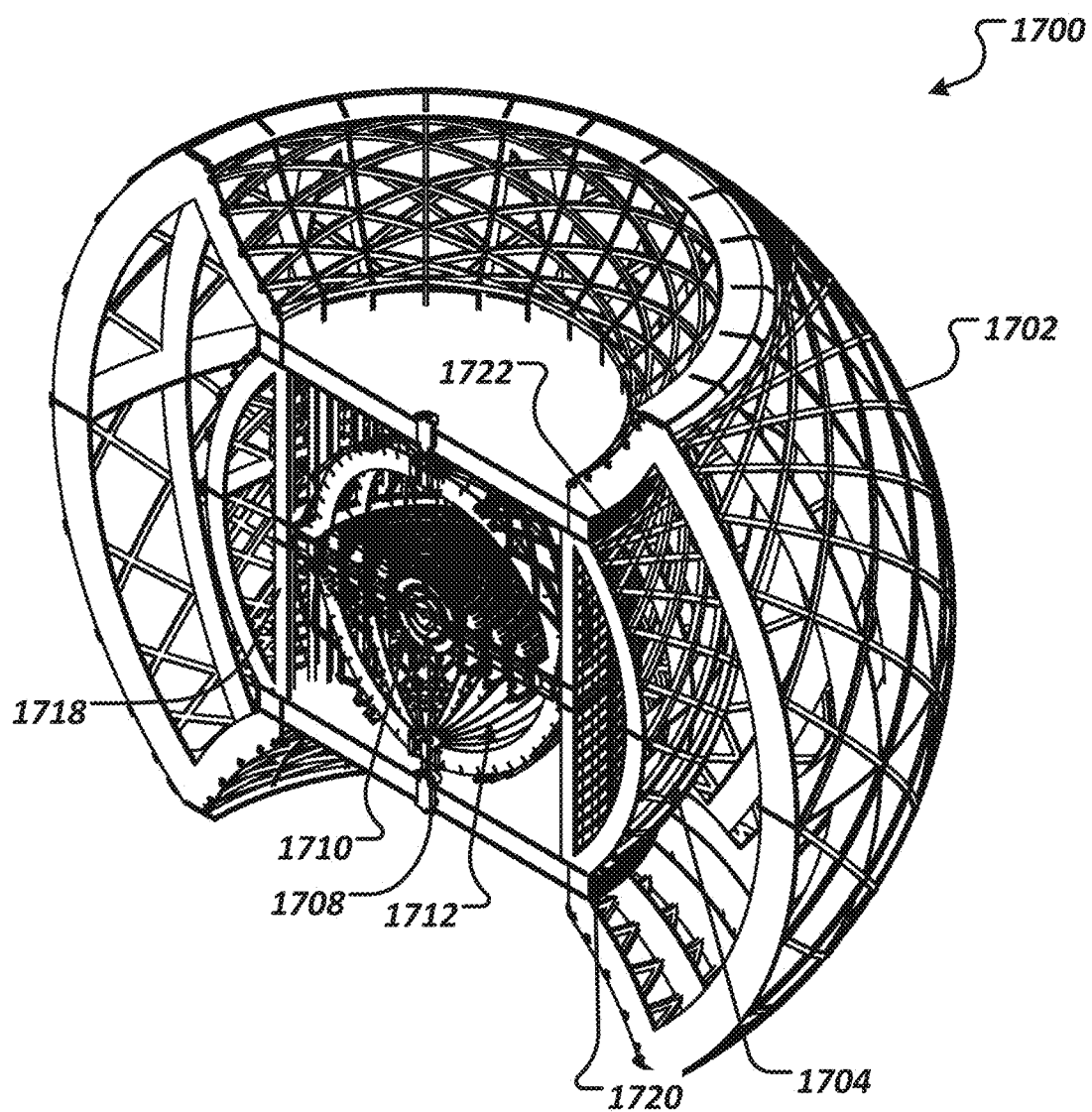
FIG. 17 illustrates a cutaway view of components of an example communication system.

FIG. 17 is an isometric view full length cutaway of components of an example toroidal configuration of an atomic resonance communication system 1700 configured in a sixth central core orientation that includes central core coils 1710, plasma antennas 1718, central core 1708, inductor coils 1712, signal injection circuit 1720 implemented as Helmholtz coils, signal detection circuit 1722 implemented as Helmholtz coils, the primary coils 1702, and the secondary coils 1704 that are concentric to and inside the primary coils 1702. The configuration illustrated in FIG. 17 is a full length cutaway view of the configuration illustrated in FIG. 11 with the sixth central core orientation.

Figure 18:
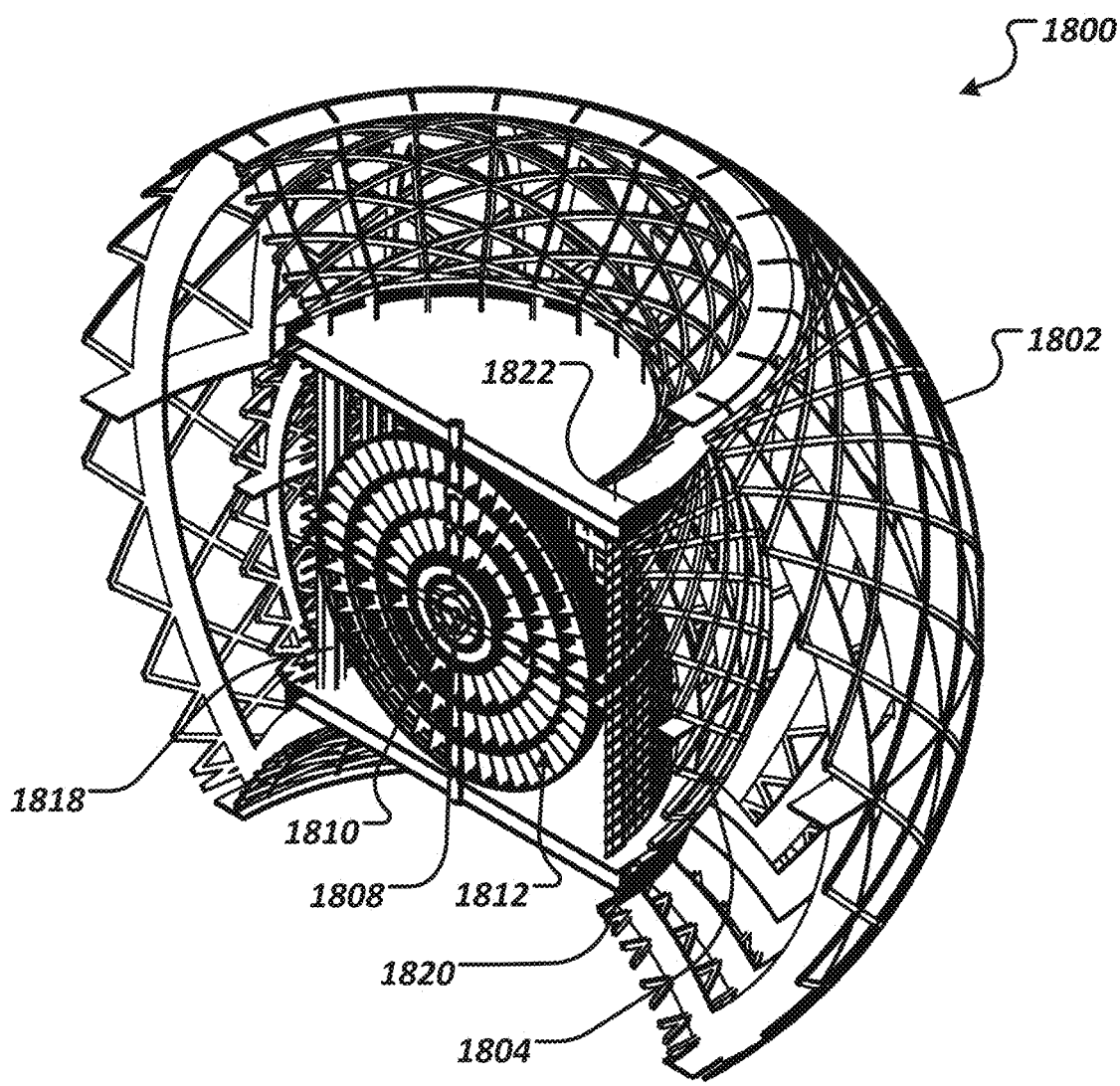
FIG. 18 illustrates a cutaway view of components of an example communication system.

FIG. 18 is an isometric view full length cutaway of components of an example toroidal configuration of an atomic resonance communication system 1800 configured in a seventh central core orientation that includes central core coils 1810, plasma antennas 1818, central core 1808, inductor coils 1812, signal injection circuit 1820 implemented as Helmholtz coils, signal detection circuit 1822 implemented as Helmholtz coils, the primary coils 1802, and the secondary coils 1804 that are concentric to and inside the primary coils 1802. The configuration illustrated in FIG. 18 is a full length cutaway view of the configuration illustrated in FIG. 11 with the seventh central core orientation.

Figure 19:
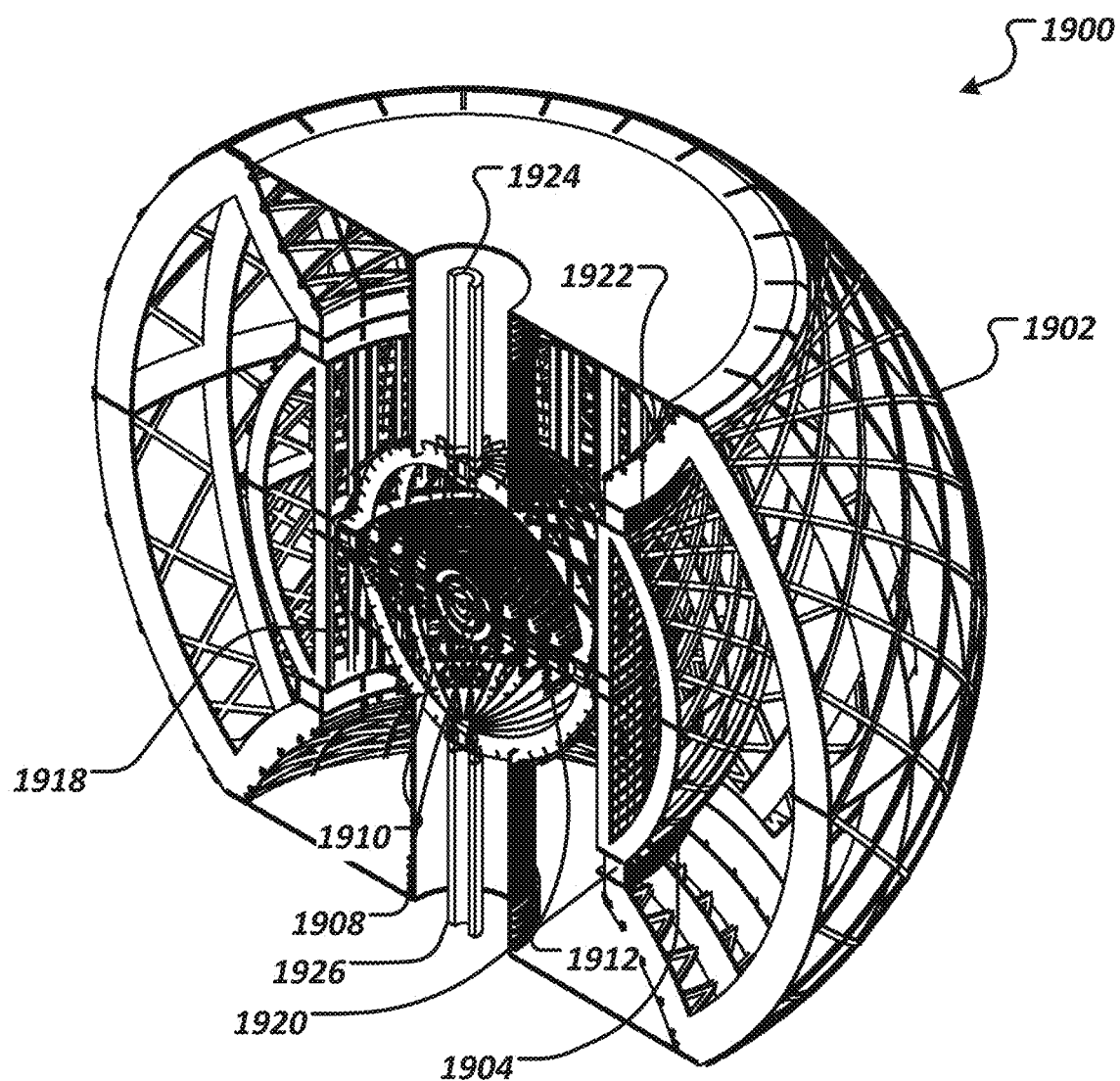
FIG. 19 illustrates a cutaway view of components of an example communication system.

FIG. 19 is an isometric view full length cutaway of components of an example toroidal configuration of an atomic resonance communication system 1900 configured in a eighth central core orientation that includes central core coils 1910, plasma antennas 1918, central core 1908, inductor coils 1912, a first signal injection circuit 1920 implemented as Helmholtz coils, a first signal detection circuit 1922 implemented as Helmholtz coils, a second signal injection circuit 1924 implemented as a particle accelerator, a second signal detection circuit 1926 implemented as a particle accelerator, the primary coils 1902, and the secondary coils 1904 that are concentric to and inside the primary coils 1902. The configuration illustrated in FIG. 19 is a full length cutaway view of the configuration illustrated in FIG. 11 with the eighth central core orientation.

Figure 20:
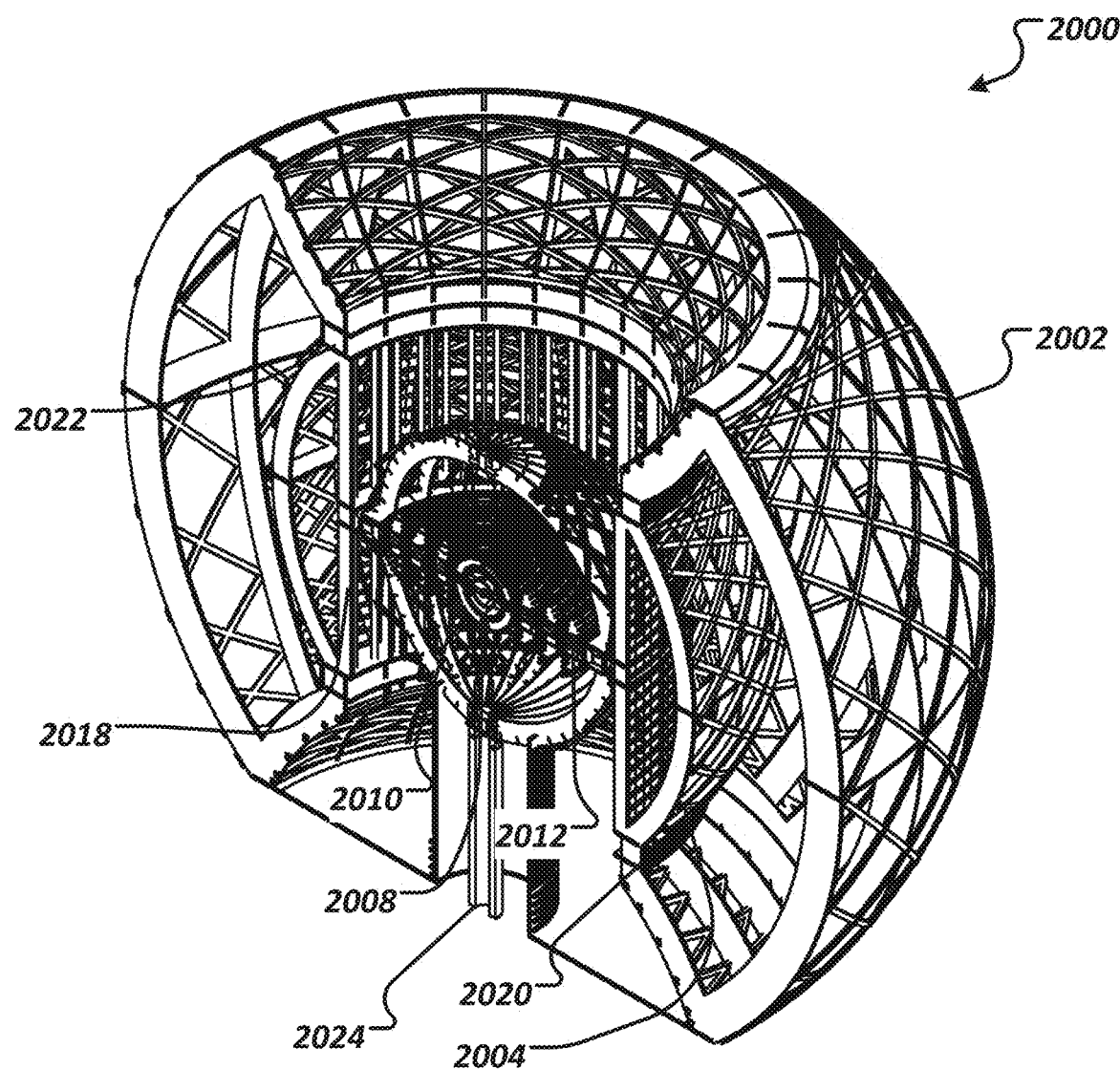
FIG. 20 illustrates a cutaway view of components of an example communication system.

FIG. 20 is an isometric view full length cutaway of components of an example toroidal configuration of an atomic resonance communication system 2000 configured in a ninth central core orientation that includes central core coils 2010, plasma antennas 2018, central core 2008, inductor coils 2012, a first signal injection circuit 2020 implemented as Helmholtz coils, a first signal detection circuit 2022 implemented as Helmholtz coils, a second signal injection circuit 2024 implemented as a particle accelerator, the primary coils 2002, and the secondary coils 2004 that are concentric to and inside the primary coils 2002. The configuration illustrated in FIG. 20 is a full length cutaway view of the configuration illustrated in FIG. 11 with the ninth central core orientation.

Figure 21:
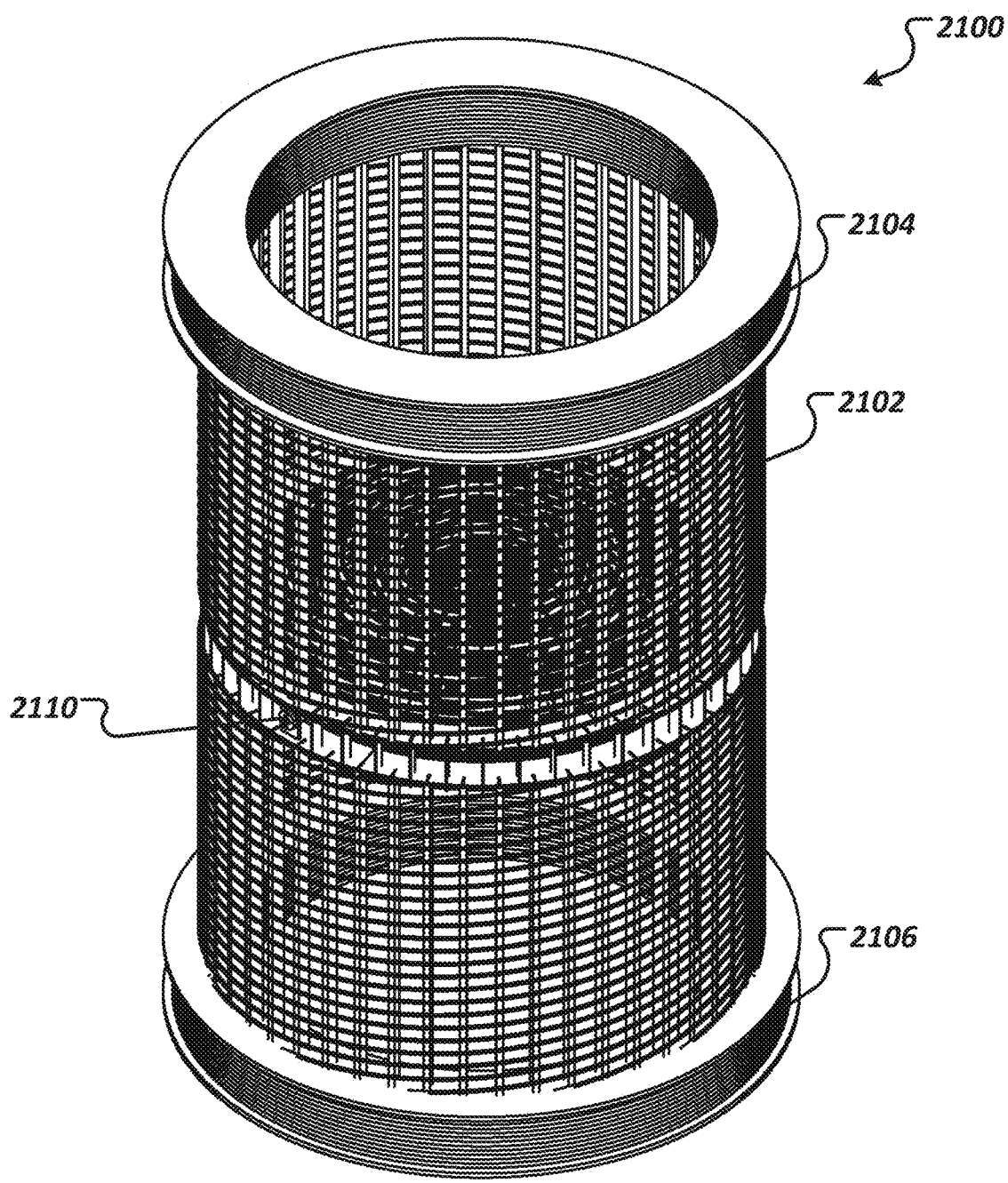
FIG. 21 illustrates an components of an example cylindrical communication system.

FIG. 21 is an isometric view of components of an example cylindrical configuration of an atomic resonance communication system 2100. The system 2100 includes primary coils 2102, central core circuits 2110, as well as an example of signal injection circuits 2104 and signal detection circuits 2106 implemented as Helmholtz coils.

In the overall structure of the system 2100, various components can be included to assist operations. For example, a core component positioned within the primary coils 2102 (also presented from a better viewing perspective as a central core 2208 of FIG. 22) contributes considerably to operations.

Figure 22:
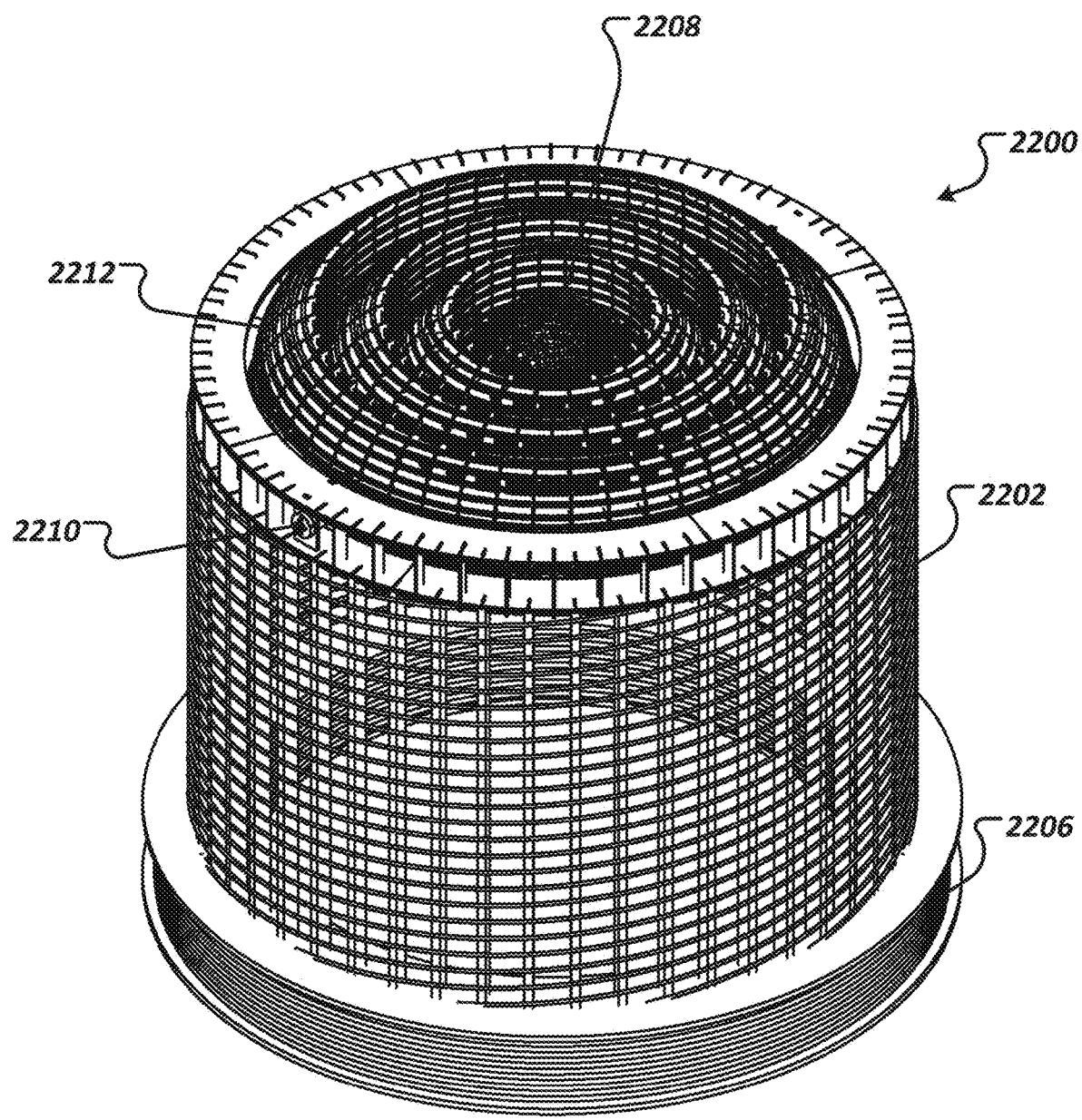
FIG. 22 illustrates components of an example communication system.

FIG. 22 is an isometric view of components of an example cylindrical configuration of an atomic resonance communication system 2200. The view is a horizontal cross section through the center of the system 2100. The system 2200 includes the central core 2208, primary coils 2202, central core circuits 2210, inductor coils 2212, and an example of a signal detection circuit 2206 implemented as Helmholtz coils. The view is also an orientation with the upper coils removed, in relation to system 2100.

Figure 23:
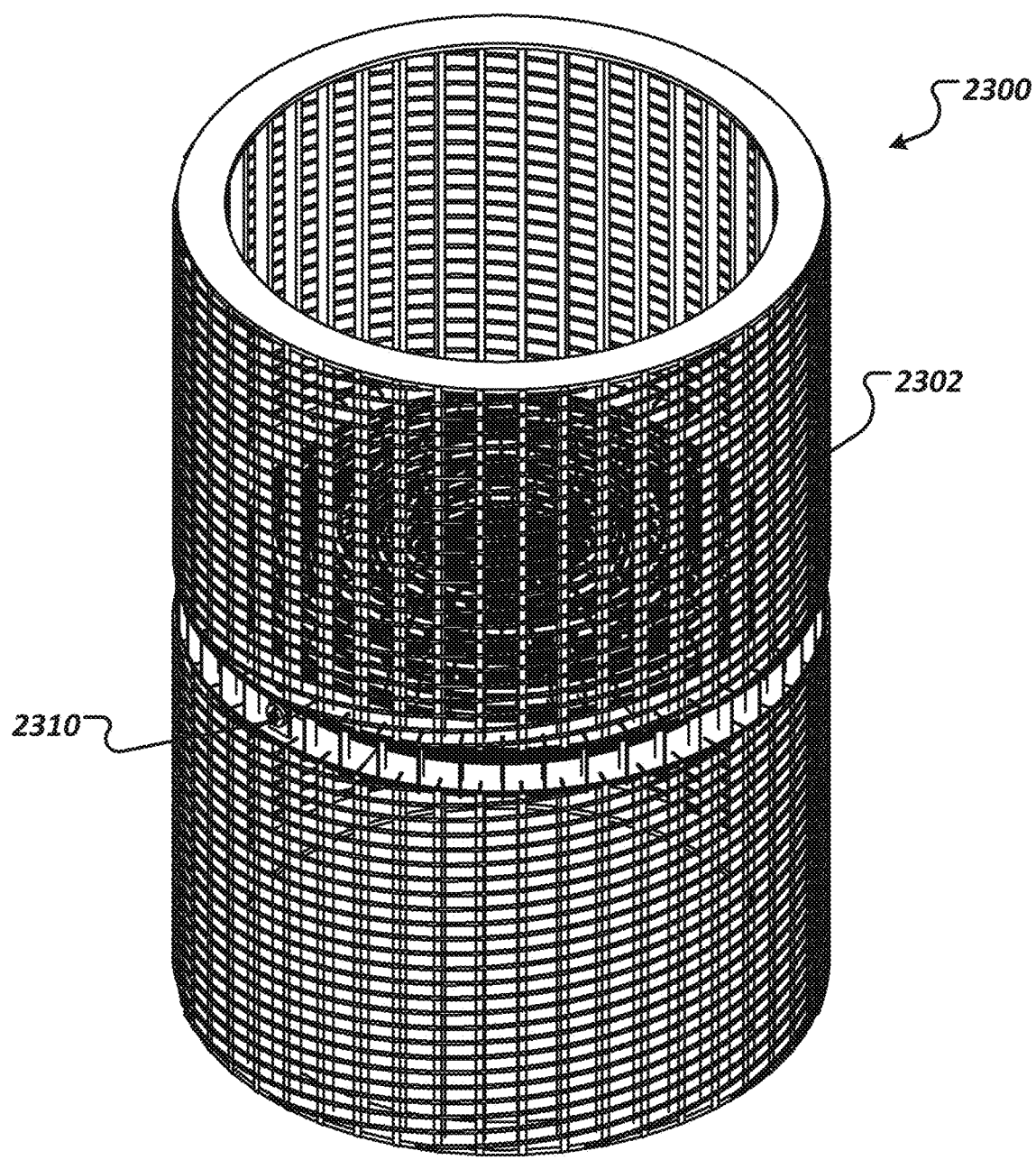
FIG. 23 illustrates components of an example communication system.

FIG. 23 is an isometric view of components of an example cylindrical configuration of an atomic resonance communication system 2300. The system 2300 includes primary coils 2302 and central core circuits 2310.

In the overall structure of the system 2300, various components can be included to assist operations. For example, a core component positioned within the primary coils 2302 (also presented from a better viewing perspective as the central core 2208 of FIG. 22) contributes considerably to operations.

Figure 24:
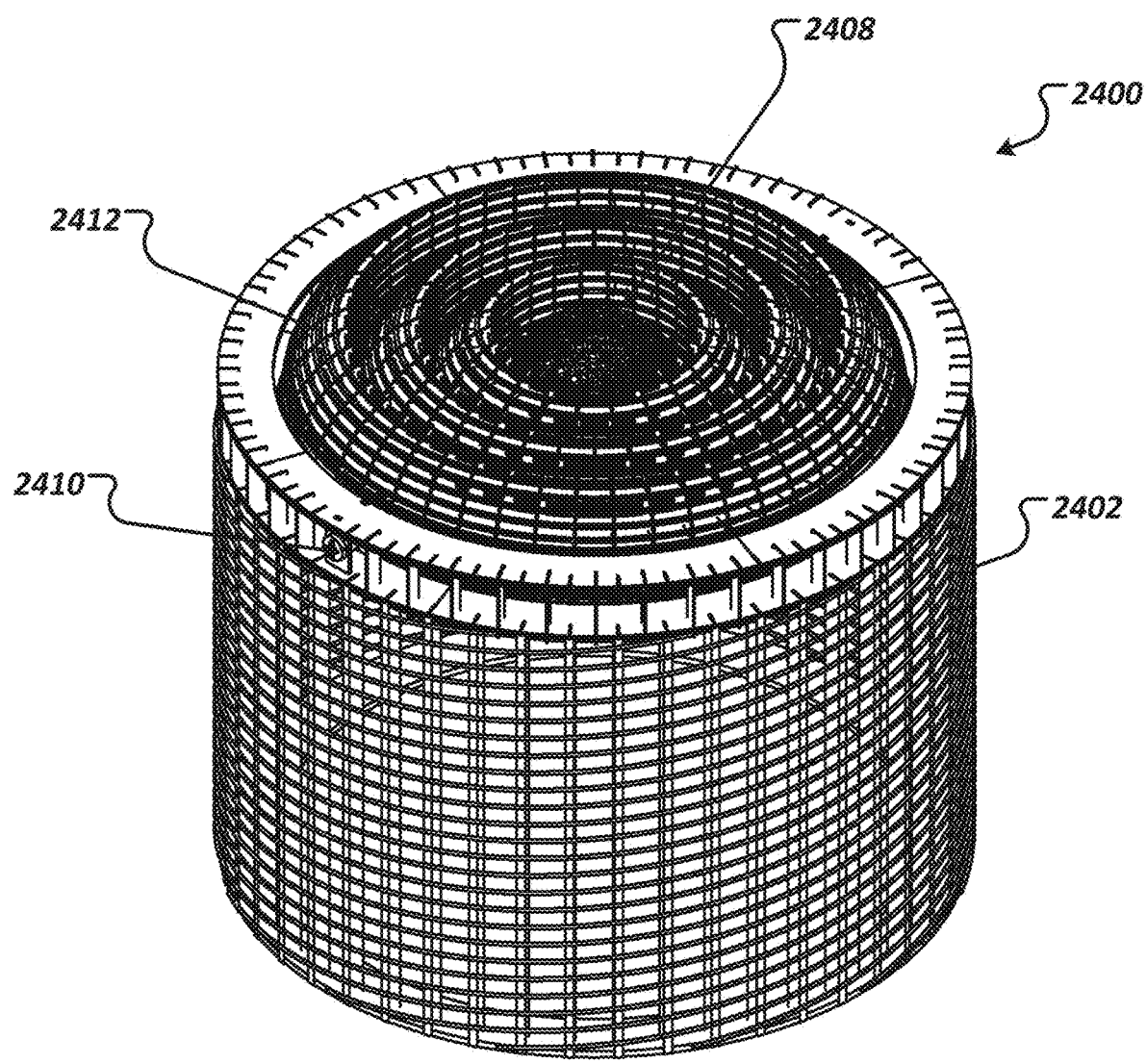
FIG. 24 illustrates components of an example communication system.

FIG. 24 is an isometric view of components of an example cylindrical configuration of an atomic resonance communication system 2400. The view is a horizontal cross section through the center of the system 2300. The system 2400 includes a central core 2408, primary coils 2402, central core circuits 2410, and inductor coils 2412. The view is also an orientation with the upper coils removed, in relation to system 2300.

Figure 25:
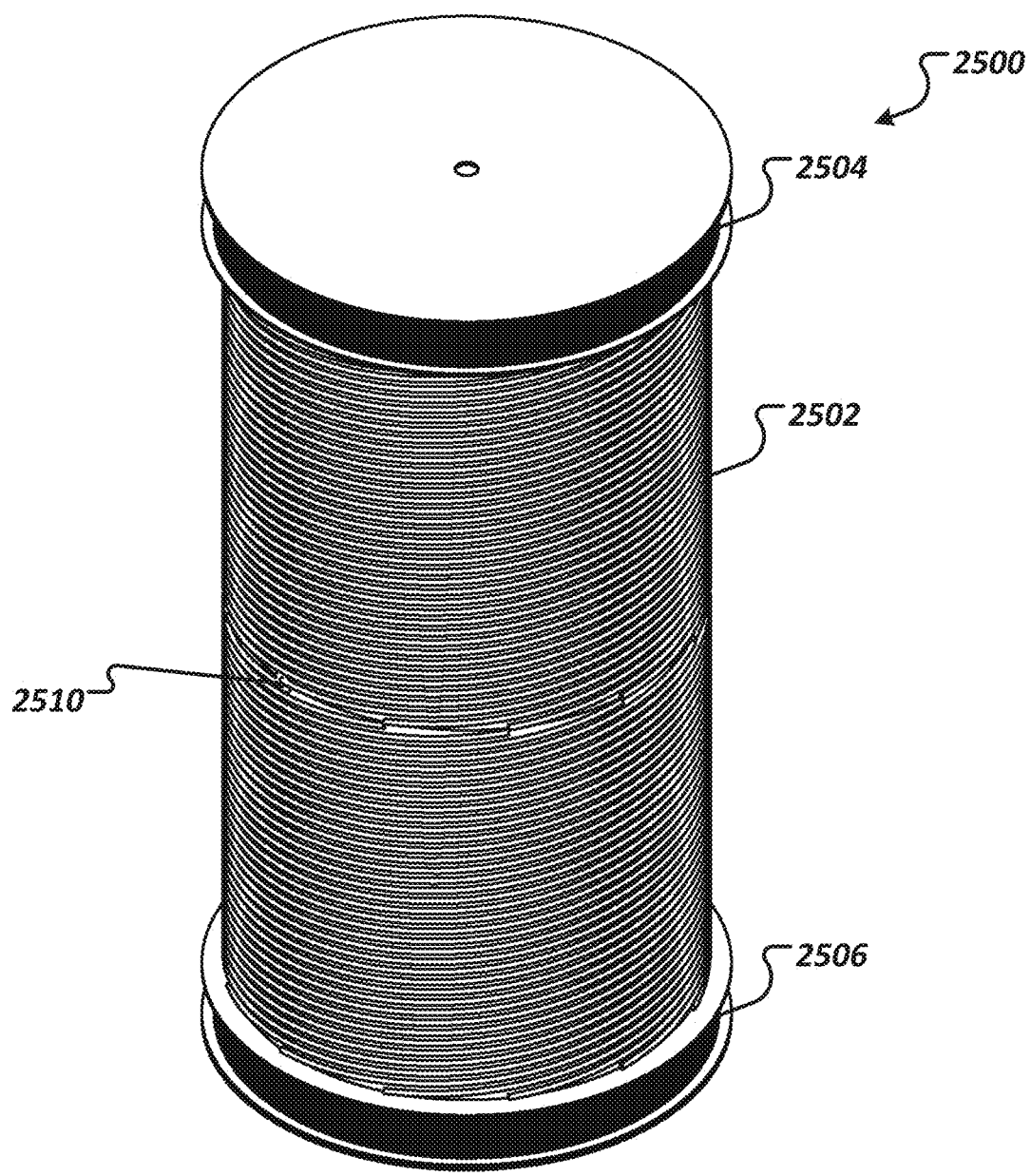
FIG. 25 illustrates components of an example communication system.

FIG. 25 is an isometric view of components of an example cylindrical configuration of an atomic resonance communication system 2500. The system 2500 includes primary coils 2502, central core circuits 2510, as well as an example of signal injection circuits 2504 and signal detection circuits 2506 implemented as Helmholtz coils.

In the overall structure of the system 2500, various components can be included to assist operations. For example, a core component positioned within the primary coils 2502 (also presented from a better viewing perspective as a central core 2908 of FIG. 29) contributes considerably to operations.

Figure 26:
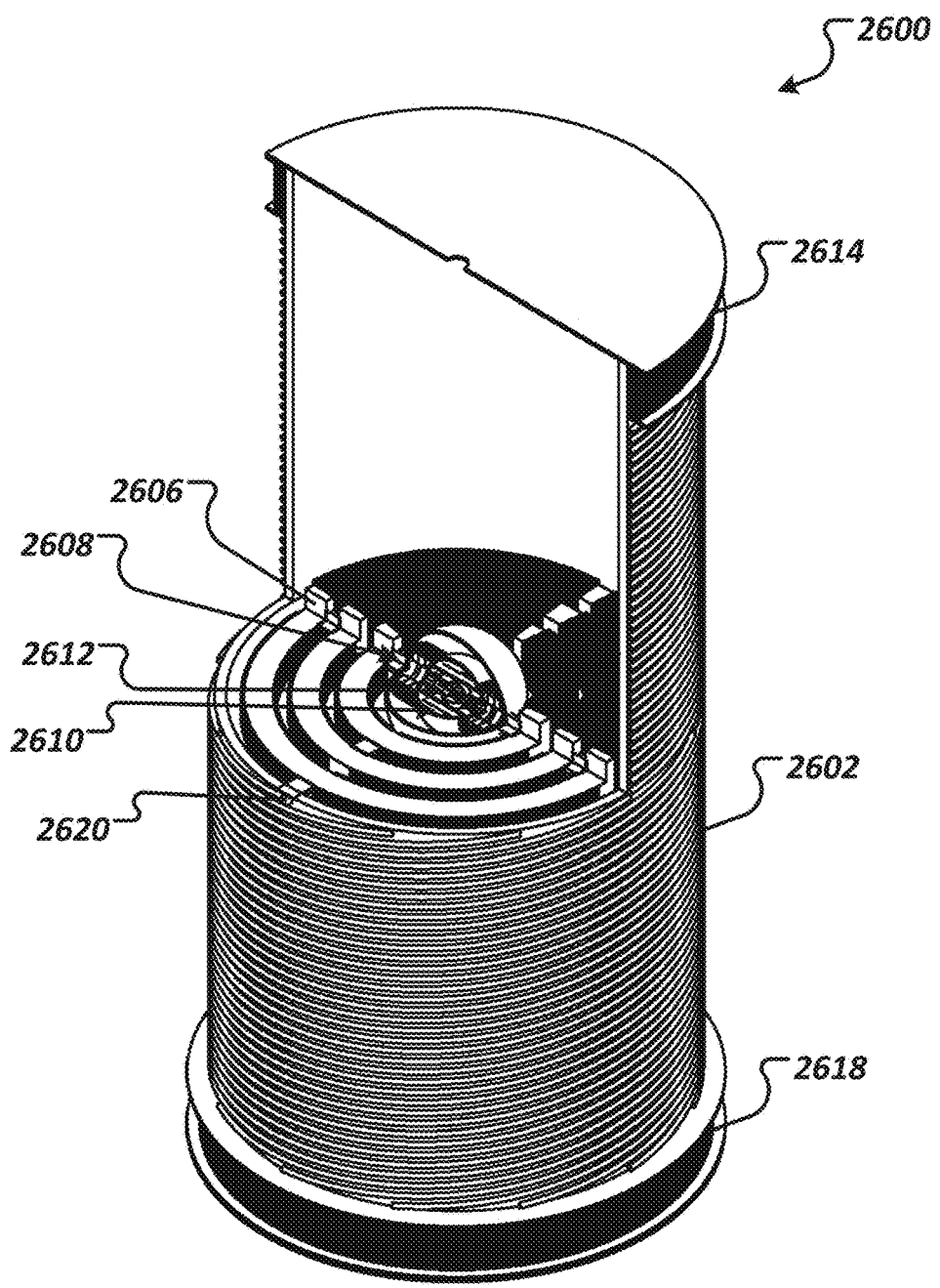
FIG. 26 illustrates a partial cutaway view of components of an example communication system.

FIG. 26 is an isometric view of a partial cutaway of components of an example cylindrical configuration of an atomic resonance communication system 2600 configured in a first orientation that includes a central core cavity 2612, central core coils 2610, central core 2608, inductor coils 2606, primary coils 2602, and central coil circuits 2620. The system 2600 includes an example signal injection circuit 2614 and signal detection circuits 2616 implemented as Helmholtz coils.

In the overall structure of the system 2600, various components can be included to assist operations. For example, the central core 2608 positioned within the primary coils 2602 (also presented from a better viewing perspective as central core 2908 of FIG. 29) contributes considerably to operations.

Figure 27:
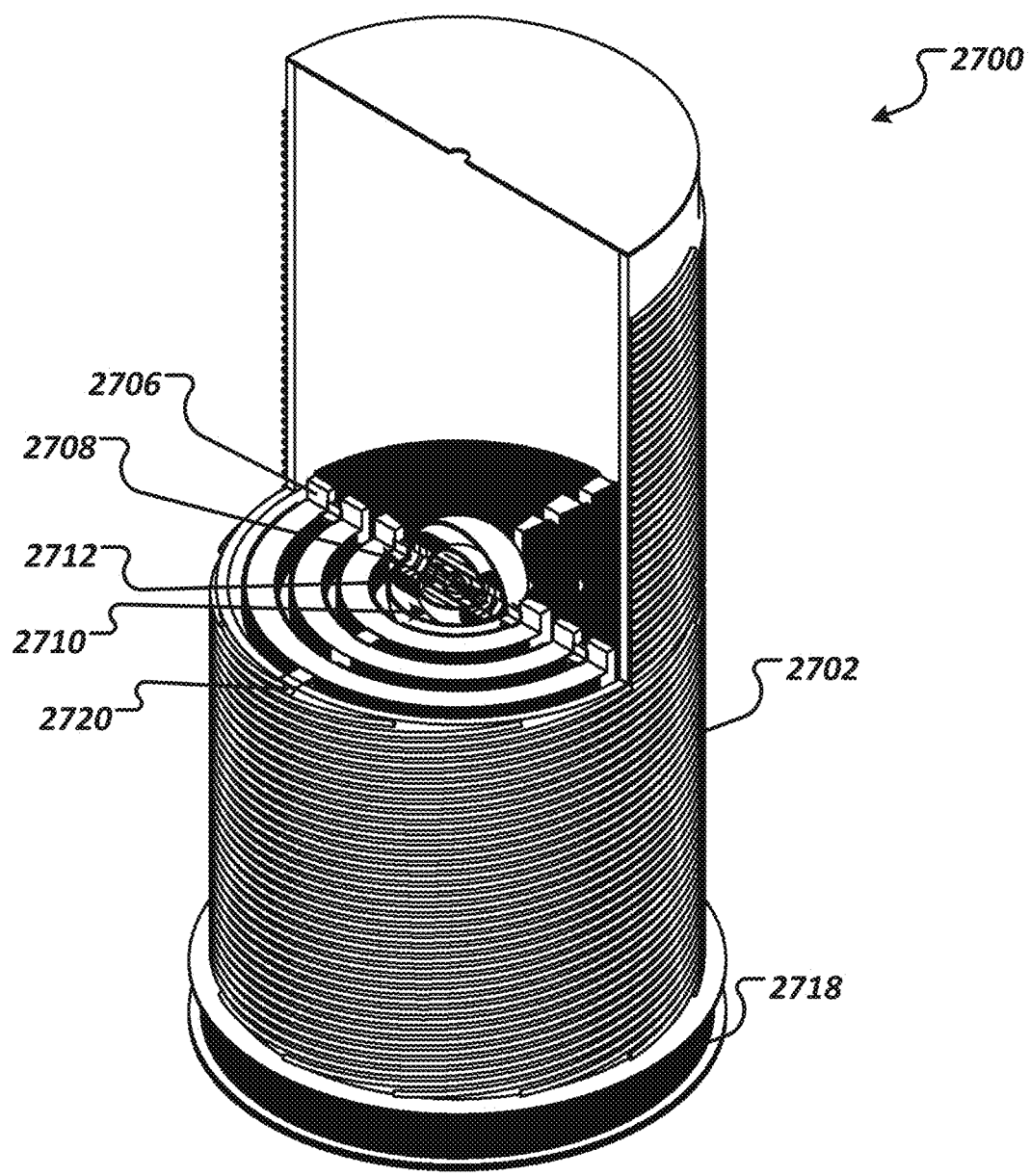
FIG. 27 illustrates a partial cutaway view of components of an example communication system.

FIG. 27 is an isometric view partial cutaway of components of an example cylindrical configuration of an atomic resonance communication system 2700 configured in a second orientation that includes a central core cavity 2712, central core coils 2710, central core 2708, inductor coils 2706, primary coils 2702, and central coil circuits 2720. The system 2700 includes an example signal injection circuit 2718 implemented as Helmholtz coils. In some implementations, the signal injection circuit 2718 operates as a signal detection circuit.

In the overall structure of the system 2700, various components can be included to assist operations. For example, the central core 2708 positioned within the primary coils 2702 (also presented from a better viewing perspective as central core 2908 of FIG. 29) contributes considerably to operations.

Figure 28:
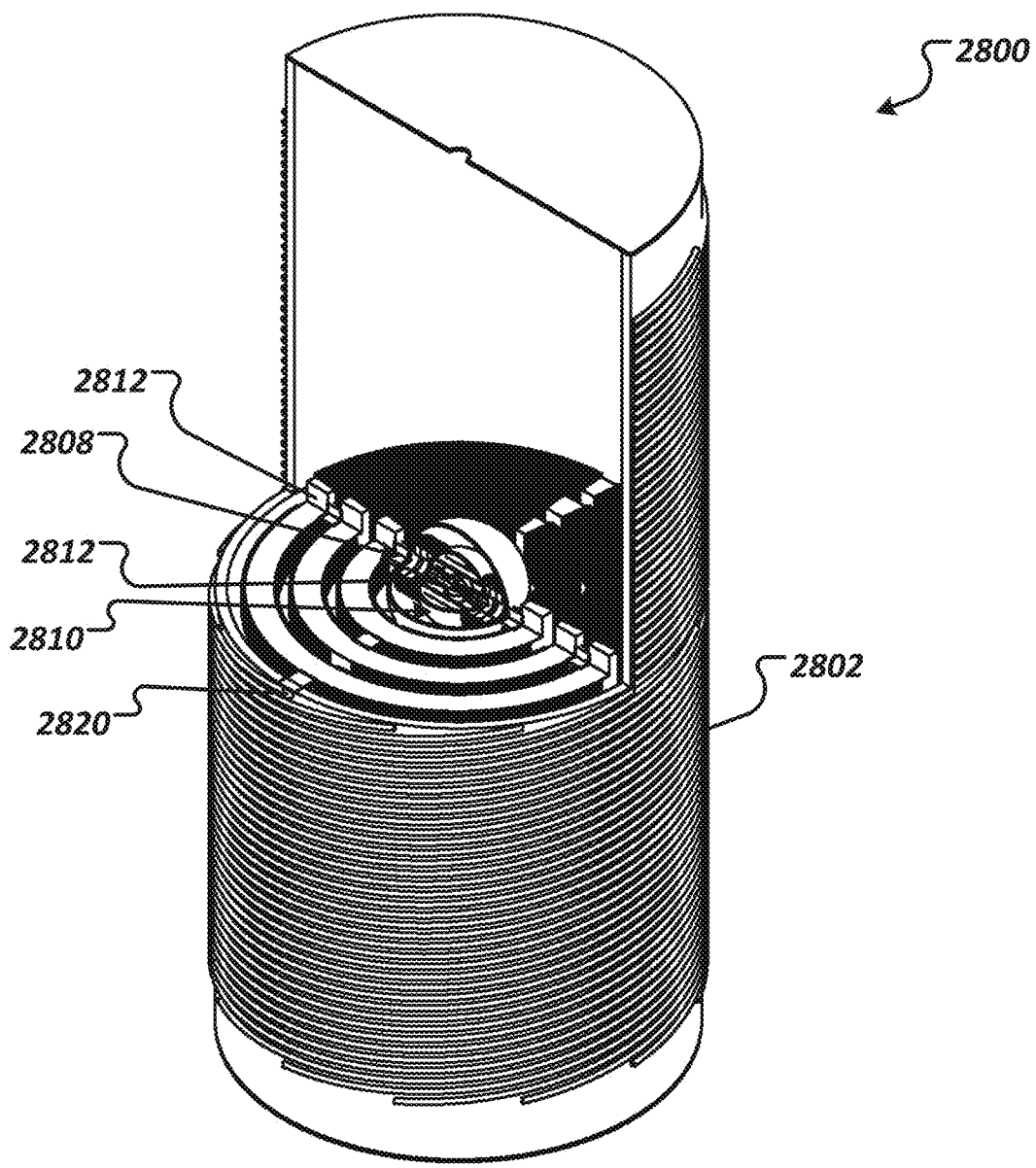
FIG. 28 illustrates a partial cutaway view of components of an example communication system.

FIG. 28 is an isometric view partial cutaway of components of an example cylindrical configuration of an atomic resonance communication system 2800 configured in a third orientation that includes a central core cavity 2812, central core coils 2810, central core 2808, inductor coils 2806, primary coils 2802, and central coil circuits 2820.

In the overall structure of the system 2800, various components can be included to assist operations. For example, the central core 2808 positioned within the primary coils 2802 (also presented from a better viewing perspective as central core 2908 of FIG. 29) contributes considerably to operations.

Figure 29:
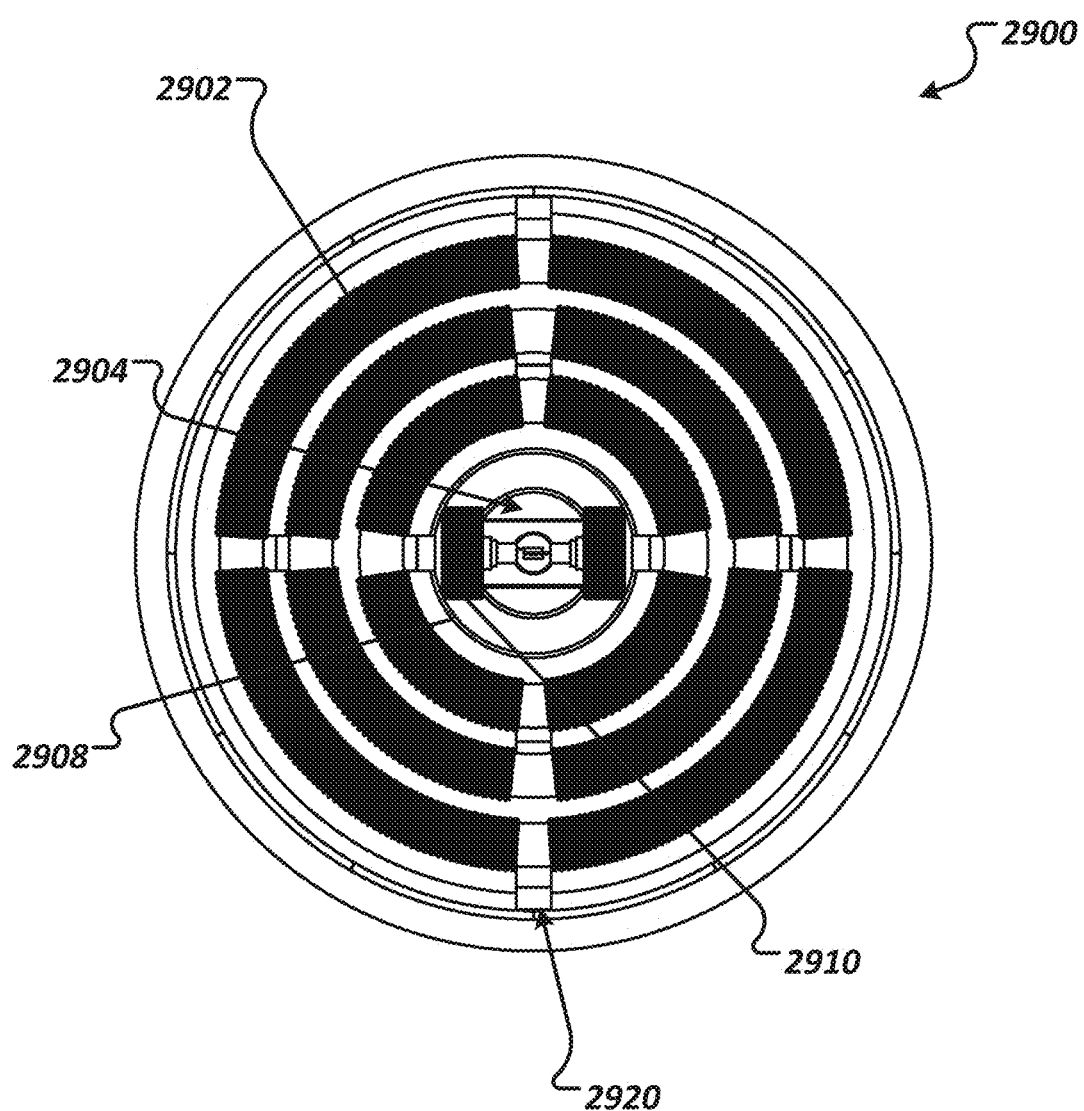
FIG. 29 illustrates a top view of components of an example communication system.

FIG. 29 is a top view of components of an example atomic resonance communication system 2900. The top view is a horizontal cross section through the center of the system 2500 with a particular central core configuration. The system 2900 includes a central core 2908, central core coils 2910, central coil circuits 2920, inductor coils 2902, and a central core cavity 2904.

Figure 30:
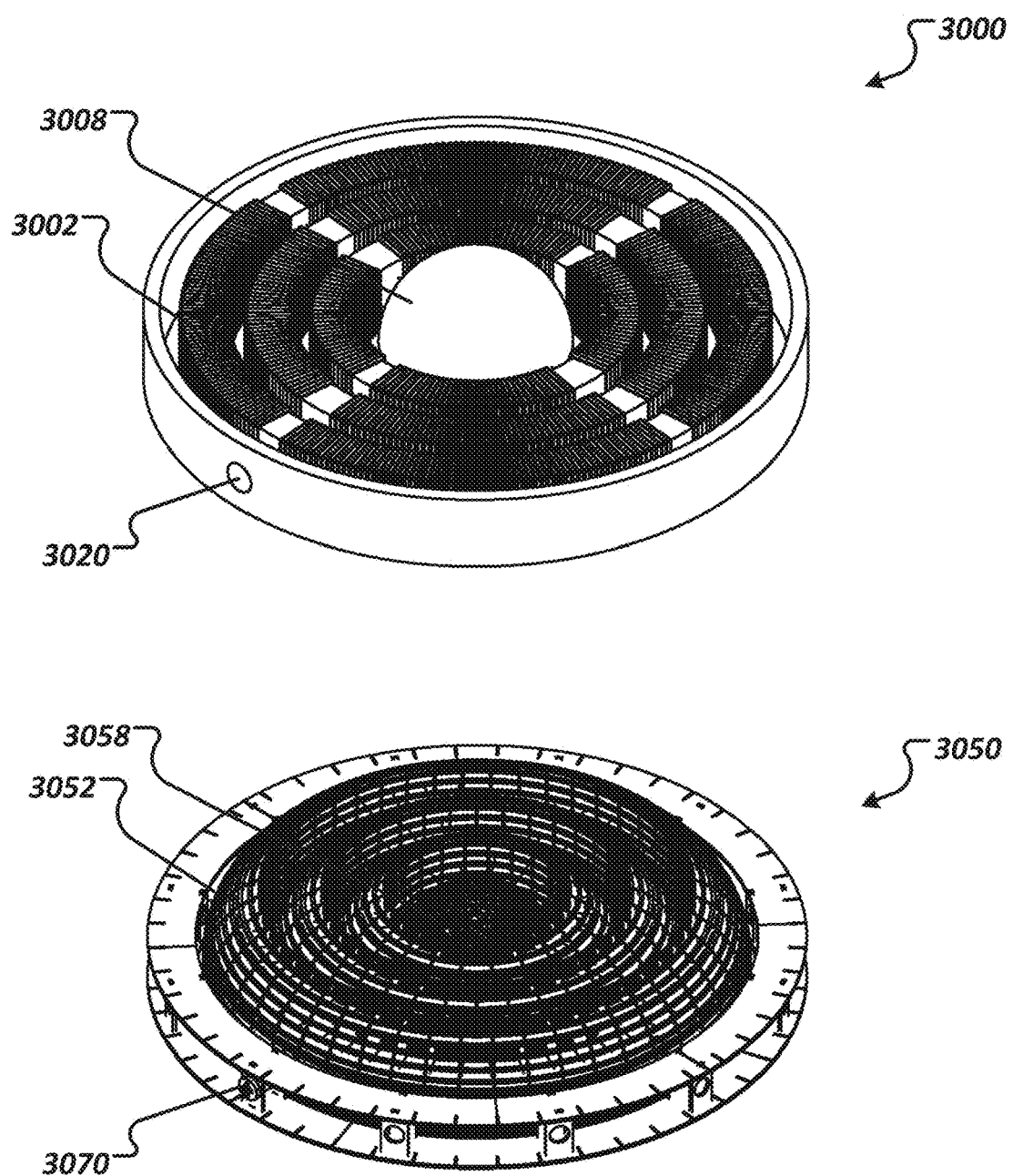
FIG. 30 illustrates components of an example communication system.

FIG. 30 illustrates an isometric view of components of an example atomic resonance communication system 3000 in a first configuration and an isometric view of an example atomic resonance communication system 3050 in a second configuration. In reference to both configurations, the system 3000 and the system 3050 include central coil circuits 3020 and 3070 respectively, a central core 3008 and 3058 respectively, and inductor coils 3002 and 3052 respectively.

In the overall structure of the system 3000 and system 3050, various components can be included to assist operations. For example, the central core 3008 and the central core 3058 (also presented from a better viewing perspective as central core 2908 of FIG. 29) contribute considerably to operations of each system.

Figure 31:
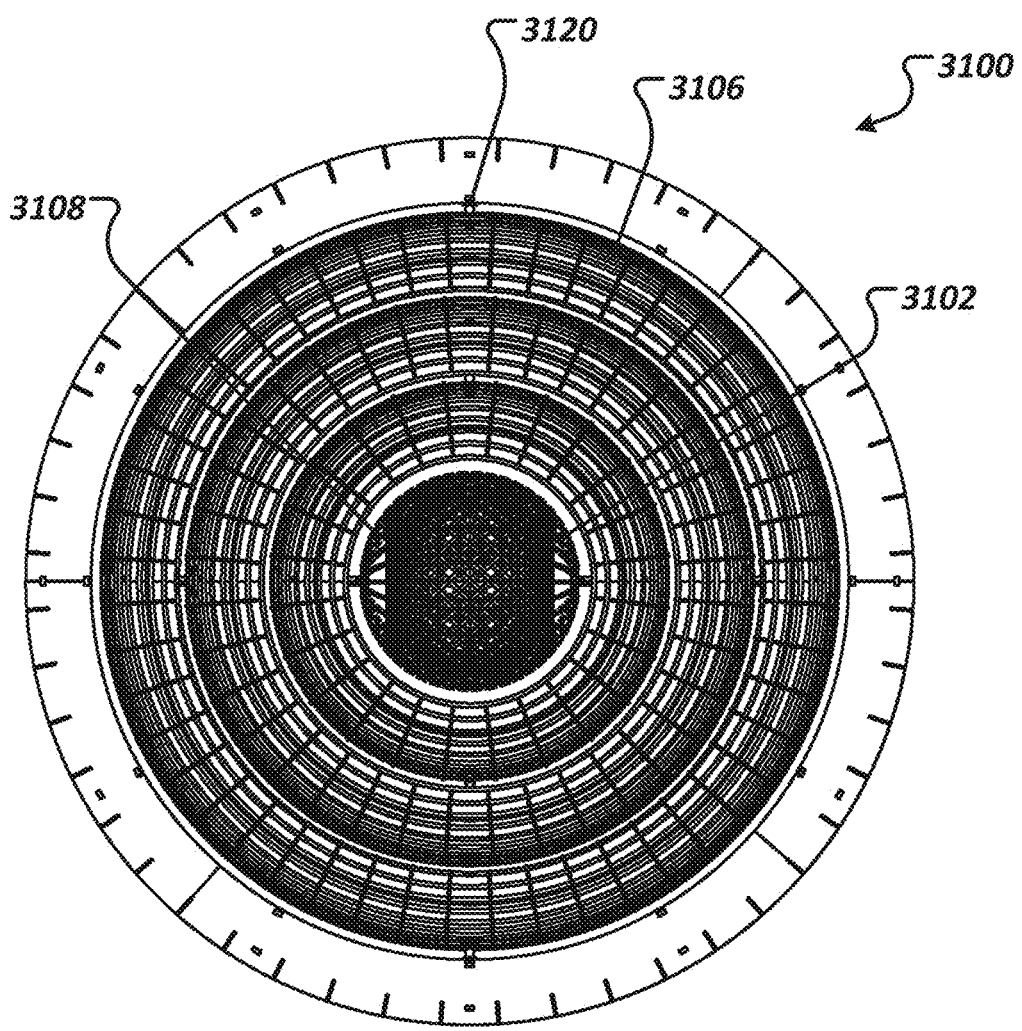
FIG. 31 illustrates a top view of components of an example communication system.

FIG. 31 is a top view of components of an example atomic resonance communication system 3100. The top view is a horizontal cross section through the center of the system 2500 with a particular central core configuration. The system 3100 includes a central core 3108, central core coils 3102, inductor coils 3106, and central coil circuits 3120.

Figure 32:
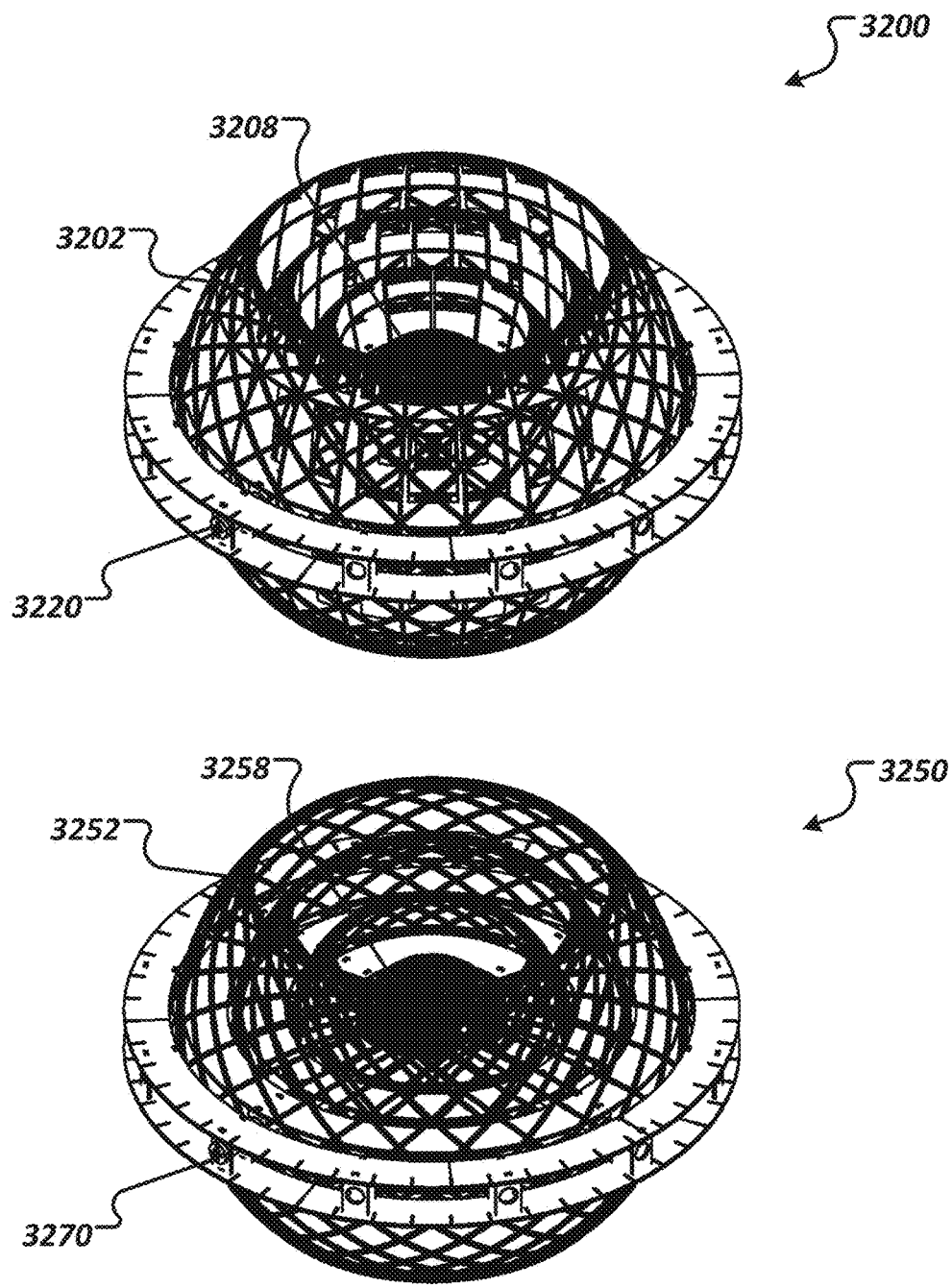
FIG. 32 illustrates components of an example communication systems.

FIG. 32 illustrates an isometric view of components of an example atomic resonance communication system 3200 in a first configuration and an isometric view of an example atomic resonance communication system 3250 in a second configuration. In reference to both configurations, the system 3200 and the system 3250 include inductor coils 3220 and 3270 respectively, and a central core 3208 and 3258 respectively.

In the overall structure of the system 3200 and system 3250, various components can be included to assist operations. For example, the central core 3208 and the central core 3258 (also presented from a better viewing perspective as central core 3108 of FIG. 31) contributes considerably to operations.

Figure 33:
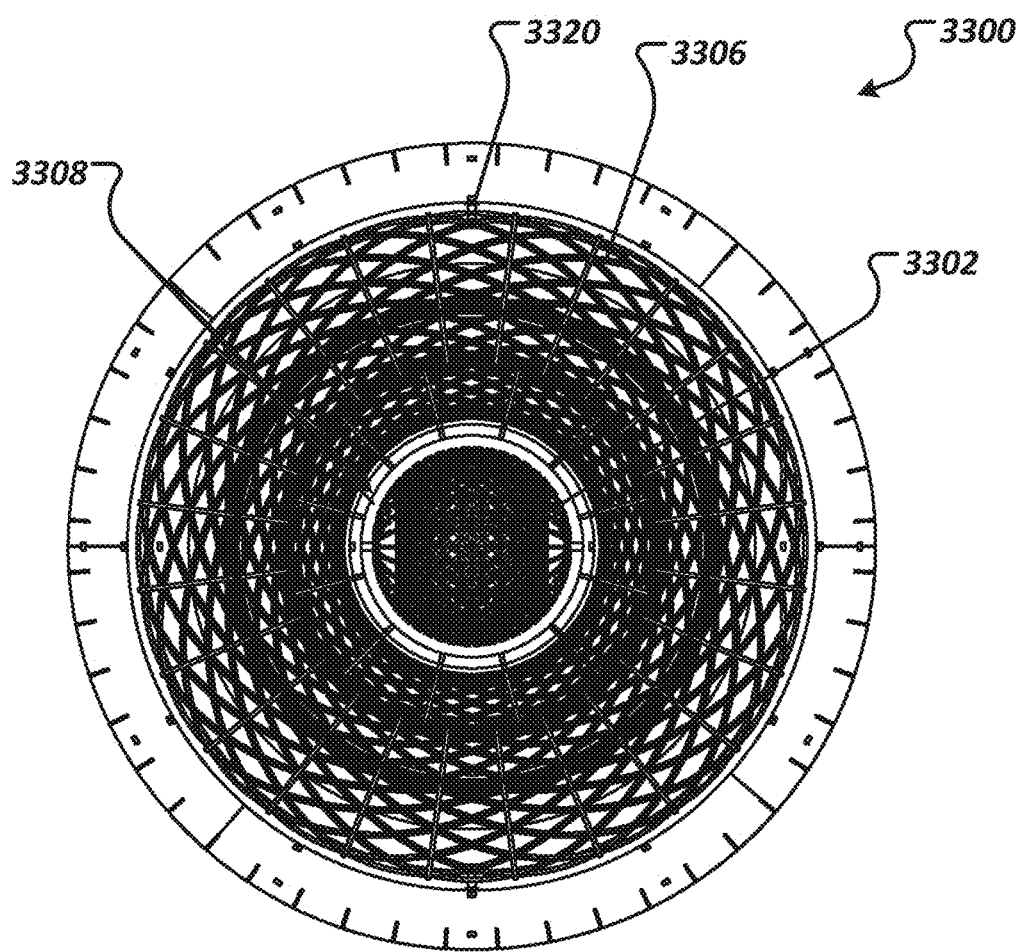
FIG. 33 illustrates components of an example communication system.

FIG. 33 is a top view of components of an example atomic resonance communication system 3300. The top view is a horizontal cross section through the center of the system 2500 with a particular central core configuration. The system 3300 includes a central core 3308, central core coils 3302, inductor coils 3306, and central coil circuits 3320.

Figure 34:
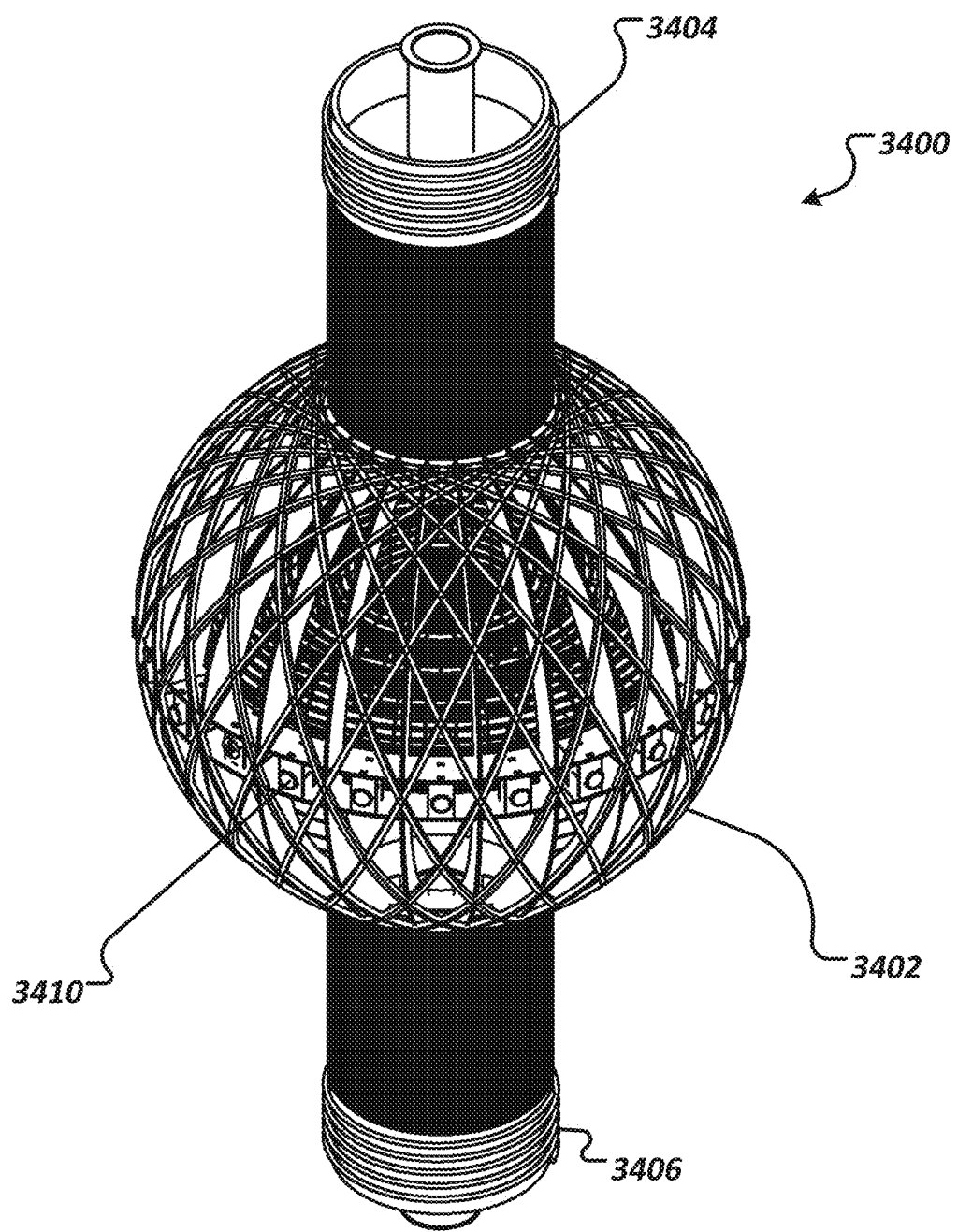
FIG. 34 illustrates components of an example communication system.

FIG. 34 is an isometric view of components of an example spherical configuration of an atomic resonance communication system 3400. The system 3400 includes primary coils 3402, central coil circuits 3410, as well as an example of signal injection circuits 3404 and signal detection circuits 3406.

In the overall structure of the system 3400, various components can be included to assist operations. For example, a core component positioned within the primary coils 3402 (also presented from a better viewing perspective as central core 3308 of FIG. 33) contributes considerably to operations.

Figure 35:
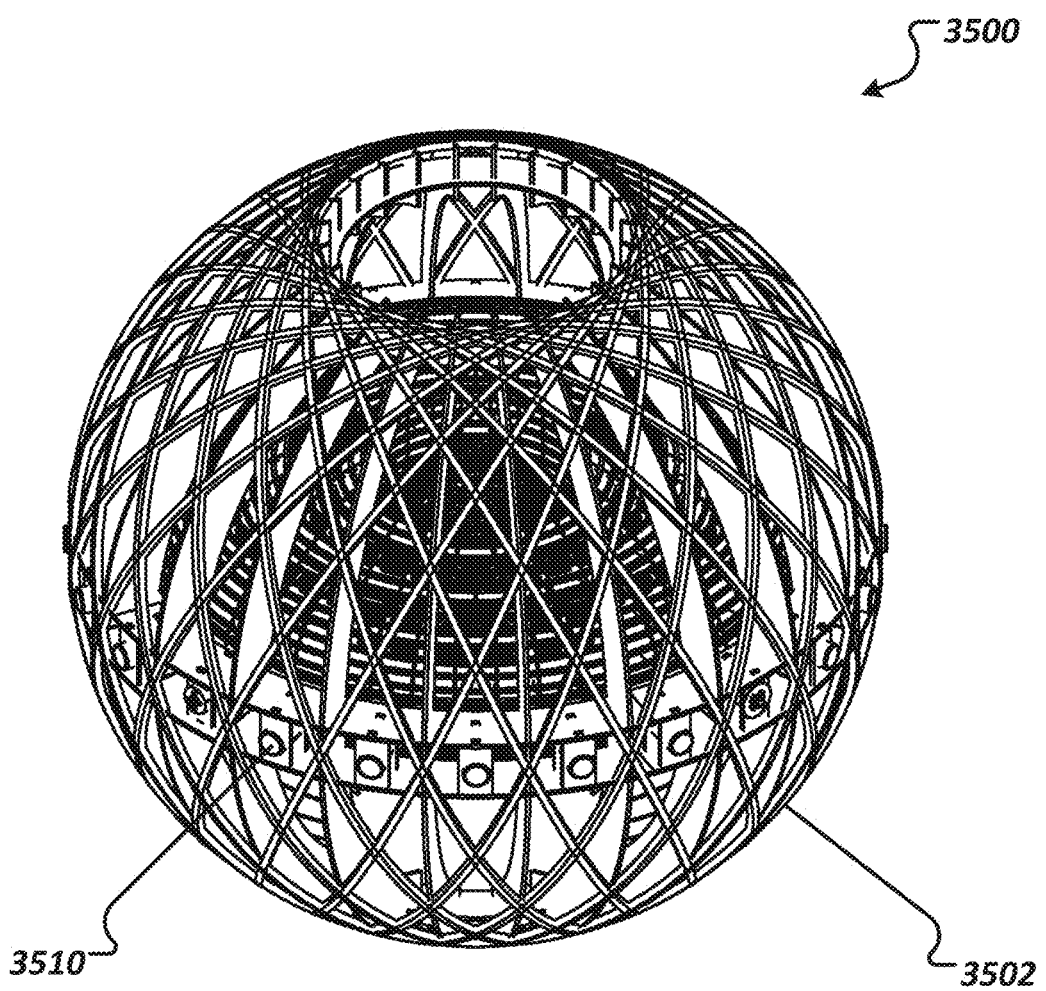
FIG. 35 illustrates components of an example communication system.

FIG. 35 is an isometric view of components of an example spherical configuration of an atomic resonance communication system 3500. The system 3500 includes primary coils 3502 and central coil circuits 3510.

In the overall structure of the system 3500, various components can be included to assist operations. For example, a core component positioned within the primary coils 3502 (also presented from a better viewing perspective as central core 3308 of FIG. 33) contributes considerably to operations.

Figure 36:
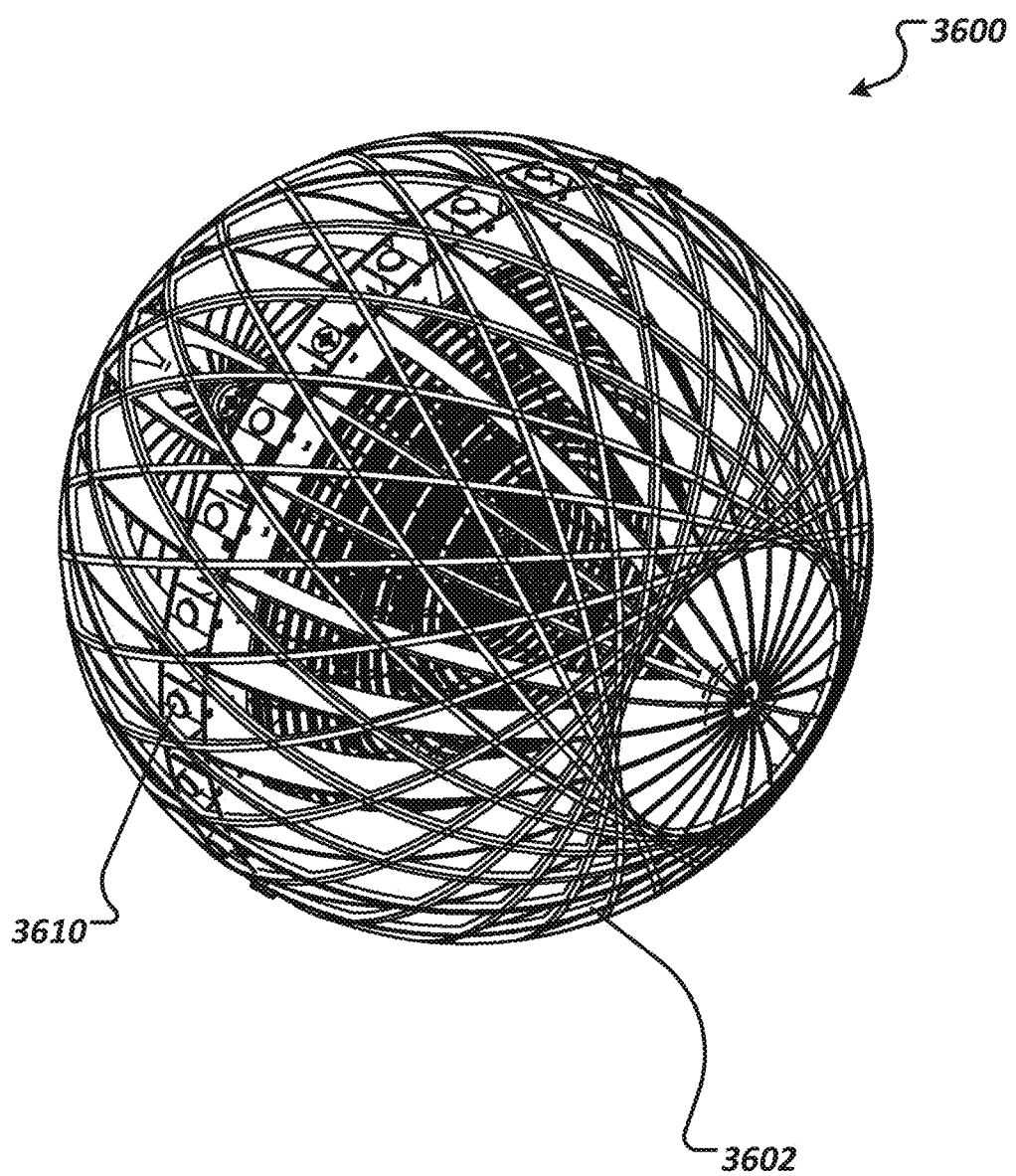
FIG. 36 illustrates components of an example communication system.

FIG. 36 is an isometric view of components of an example spherical configuration of an atomic resonance communication system 3600. The system 3600 includes primary coils 3602 and central coil circuits 3610.

In the overall structure of the system 3600, various components can be included to assist operations. For example, a core component positioned within the primary coils 3602 (also presented from a better viewing perspective as central core 3308 of FIG. 33) contributes considerably to operations.

Figure 37:
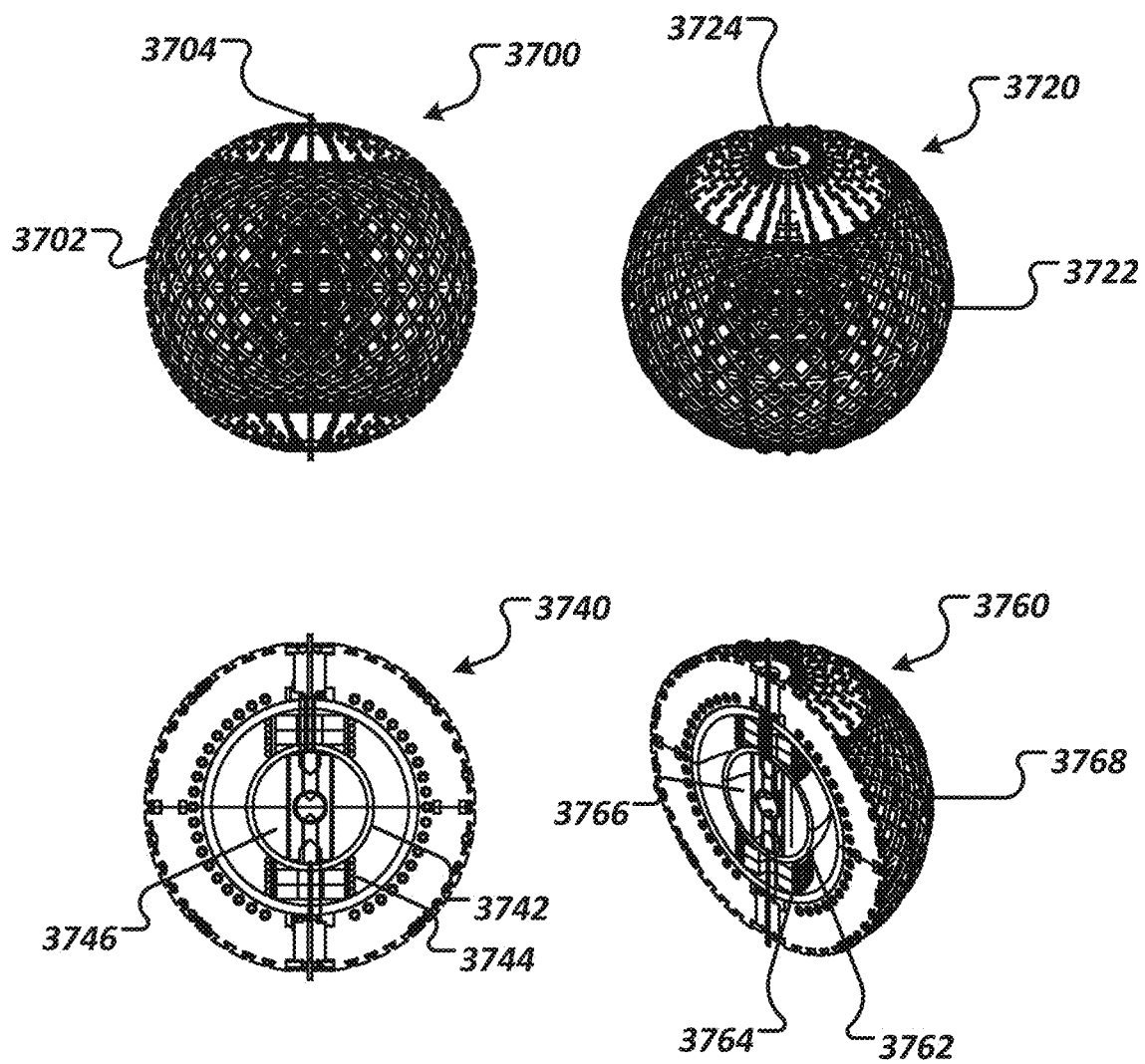
FIG. 37 illustrates multiple views of components an example communication system.

FIG. 37 illustrates multiple views of components of an example atomic resonance communication system. An example side view of an atomic resonance communication system 3700 illustrates the system 3700 that includes central coil circuits 3704 and central core coils 3702. An example isometric view of an atomic resonance communication system 3720 illustrates the system 3700 that includes central coil circuits 3724 and central core coils 3722.

An example side view of a vertical cross-section of an atomic resonance communication system 3740 taken through the center of the system 3700 illustrates central coil circuits 3744, a central core 3742, and central core cavity 3746. An example isometric view of the vertical cross-section of an atomic resonance communication system 3740 taken through the center of the system 3700 illustrates central coil circuits 3764, a central core 3762, central core coils 3768, and central core cavity 3766.

Figure 38:
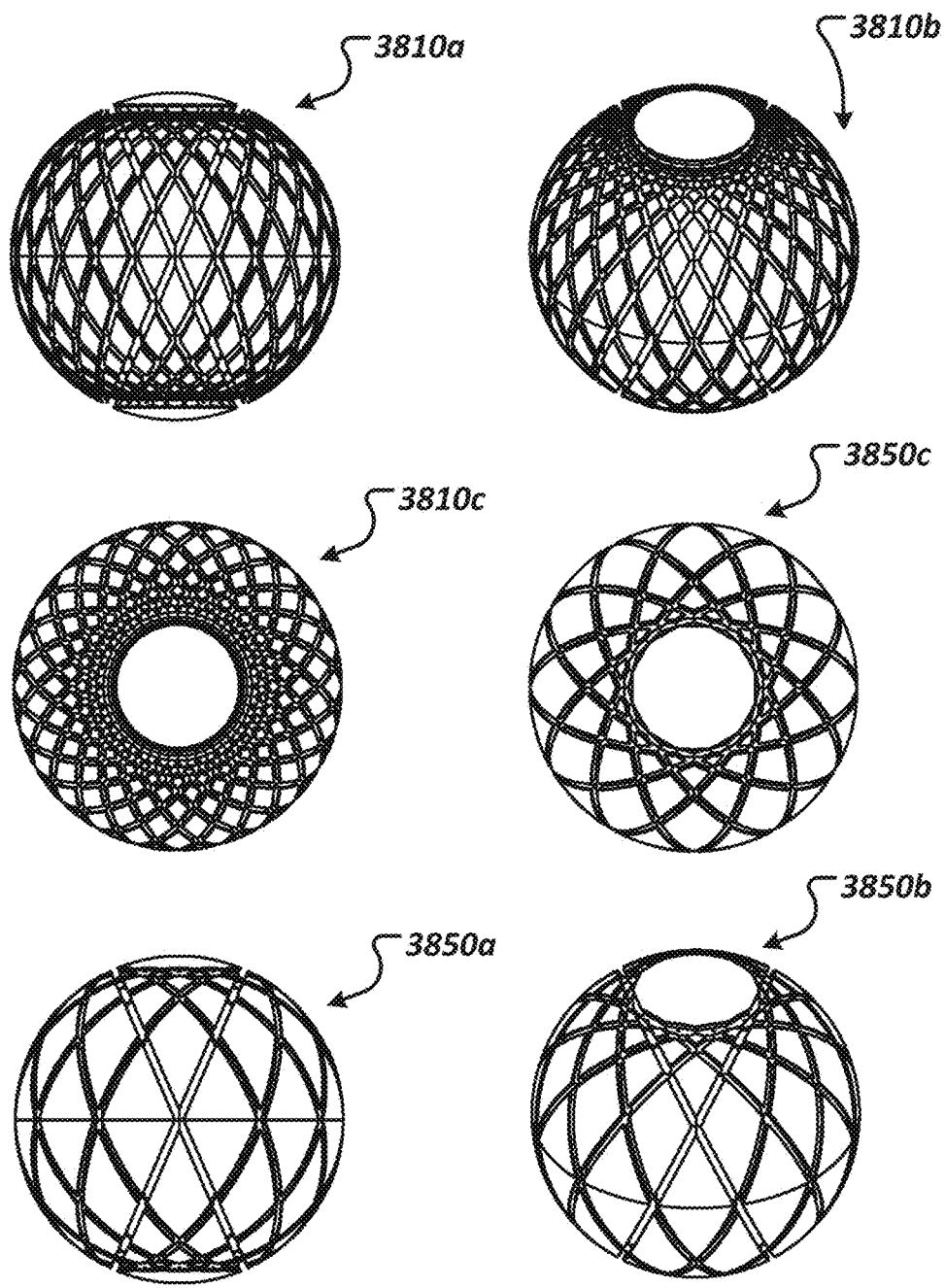
FIG. 38 illustrates multiple views of components of examples of communication systems.

FIG. 38 illustrates two examples of components of atomic resonance communication systems, in which each example is in a toroidal configuration with a different coil density. A first system with a first coil density is illustrated in a side view 3810a, an isometric view 3810b, and a top view 3810c. A second system with a second, lower coil density is illustrated in a side view 3850a, an isometric view 3850b, and a top view 3850c.

FIGS. 39-47 illustrate examples of atomic resonance systems that include a signal injection circuit and/or signal detection circuit. The circuits include one or more helical coil antennas, in which the outer end of each helical coil antenna includes an optical lens. In some implementations, the optical lens is a Fresnel lens. In some cases, the optical lens is referred to as a helioptic antenna or an optohelical antenna, which can be used for free-space optical and RF communication channels. In some other implementations, the optical lens has a geometric and refractive profile other than a Fresnel lens. The signal injection circuit and/or signal detection circuit can emit light to a central core (e.g., focus external light through the optical lens from transceiver and/or external light sources like lasers), emit light from the central core (e.g., collect light emitted from the central core to a region external to the system), receive RF signals from the central core or other systems that include similar antennas, and transmit RF signals to the central core or other systems that include similar antennas. In some implementations, the central core includes plasma and/or a gain medium.

In some implementations, one or more light sources and/or light from a gain medium are coupled to an optical lens (e.g., Fresnel lens, helioptic antenna, optohelical antenna). The light can include infrared light sources, ultraviolet light sources, white light sources, x-ray sources, and other laser light sources. The light sources that emit the light can include light bulbs, ultraviolet light tubes, x-ray tubes, light-pumped crystal rod lasers, gas lasers, ionic gases, plasma sources, solid state lasers, arc sources, and others. The light from the light source can interact with one or more of lenses, mirrors, prisms, beam splitters, atomic vapor cells, gas chambers, and/or birefringent crystals for quantum interactions including four-wave mixing (FWM), wavelength division multiplexing (WDM), and/or spontaneous parametric down conversion. Optical communication protocols can include dense wavelength division multiplexing (DWDM), coarse wavelength division multiplexing (CWDM), as well as traditional telecommunications optical transport network (OTN), synchronous digital hierarchy (SDH), synchronous optical network (SONET), and multiwavelength optical networking (MONET). In addition, the light from the light source can interact with one or more optical network switches, multiplexers (MUX), demultiplexers (DEMUX), single mode fibers, and multimode fibers. In general, each optical antenna/lens can be coupled to one or more of a time-domain reflectometer, photodetector, photodiode, transceiver module, software-defined radio, data acquisition system, fiber optic cable, transmission line cable, and/or a computing system. In some implementations, the computing system can implement one or more machine learning models to identify and/or classify a frequency spectrum and polarization of light propagating through the system. In some cases, qubits can be generated by quantum effects within the system.

In some implementations, an optohelical antenna includes a helical coil antenna wrapped around a support structure. One or more lenses are disposed within or at one end or both ends of the support structure. In some cases, one or more associated light sources, e.g., photon sources, an associated signal injection circuit, and an associated signal detection circuit are communicatively coupled to a computing system. The structure, e.g., the body, of the optohelical antenna can be a tube, a vessel, or a cylindrical support structure that contains the optical lens and one or more light sources. The structure can be filled with one or more materials including a gain medium, gases, liquids, crystal rods, atomic vapor, and/or plasma discharge tubes. In some cases, the structure contains one or more mirrors and/or one or more mirrored interior walls. In some cases, the one or more optical lenses include composite lenses of multiple refractive indices and/or a combination of lenses, mirrors, beam splitters, etc. In some cases, the structure contains one or more gases kept at low pressure.

In some implementations, the support structure, e.g., a tube, may be referred to as an optical tube assembly of an optical system. In some cases, the optical tube assembly and the support structure that supports a helical coil antenna are separate structures. In some cases, the support structure is self-supported, e.g., the helical coil antenna is configured to be self-supporting. In some cases, the support structure is composed of multiple standoffs attached to the central structure or tube, providing a spiral structure to the helical coil antenna. In some cases, the support structure is configured in a spiral or helix shape. In some cases, the structure includes multiple helical coils.

In some implementations, the optical system includes one or more photon sources, photodetectors, optical lenses, spectrometers, linear and/or nonlinear systems, and associated electrical and computational circuits. In some cases, the optical system is coupled to an optohelical antenna. In some cases, the optical system is coupled to a computing system and/or to the atomic resonance communication system.

In some implementations, a light source of the optohelical antenna includes a laser, an incoherent light source, e.g., a lightbulb, a plasma discharge tube, an ultraviolet light source, and/or an x-ray tube. Each light source can be configured to provide continuous wave light or pulsed/non-continuous wave light. In some cases, the light interacts non-linearly with the lens material and/or the material within the optohelical antenna structure.

In some cases, a computing device, e.g., the computing device 102 of FIG. 1, determines a pattern of light emitted from the one or more light sources and a pattern of radiation emitted from the helical antenna. The computing device can implement one or more machine learning models to determine and/or detect patterns of radiation in the optical and radio frequency domains. In some cases, the computing device configures a transceiver, e.g., the transceiver module 132 of FIG. 1, to communicate appropriate drive signals to each signal injection circuit, e.g., the helical antenna and/or a light source. The computing device can determine a mode of the transceiver module, e.g., transmit or receive and which communication channels to implement, based on an output of one or more machine learning models or other algorithms.

In some implementations, a signal injection circuit includes an optohelical antenna, (e.g., one or more light sources and a helical coil antenna), a RF transmitter/transceiver, and/or a software-defined radio. Similarly, a signal detection circuit includes an optohelical antenna, (e.g., one or more photodetectors and a helical coil antenna), an RF receiver/transceiver, and/or a software-defined radio. In addition, in some implementations, the signal detection circuit can include a time-domain reflectometer to analyze optical signals. The one or more photodetectors can include a photomultiplier tube, a scintillator, a charged coupled device (CCD), a silicon-based sensor, or any other device sensitive to optical and/or x-ray signals. In some cases, the helical coil is configured in an axial mode with a ground plane, e.g., a plane parallel to a ground surface, at one end.

Figure 39:
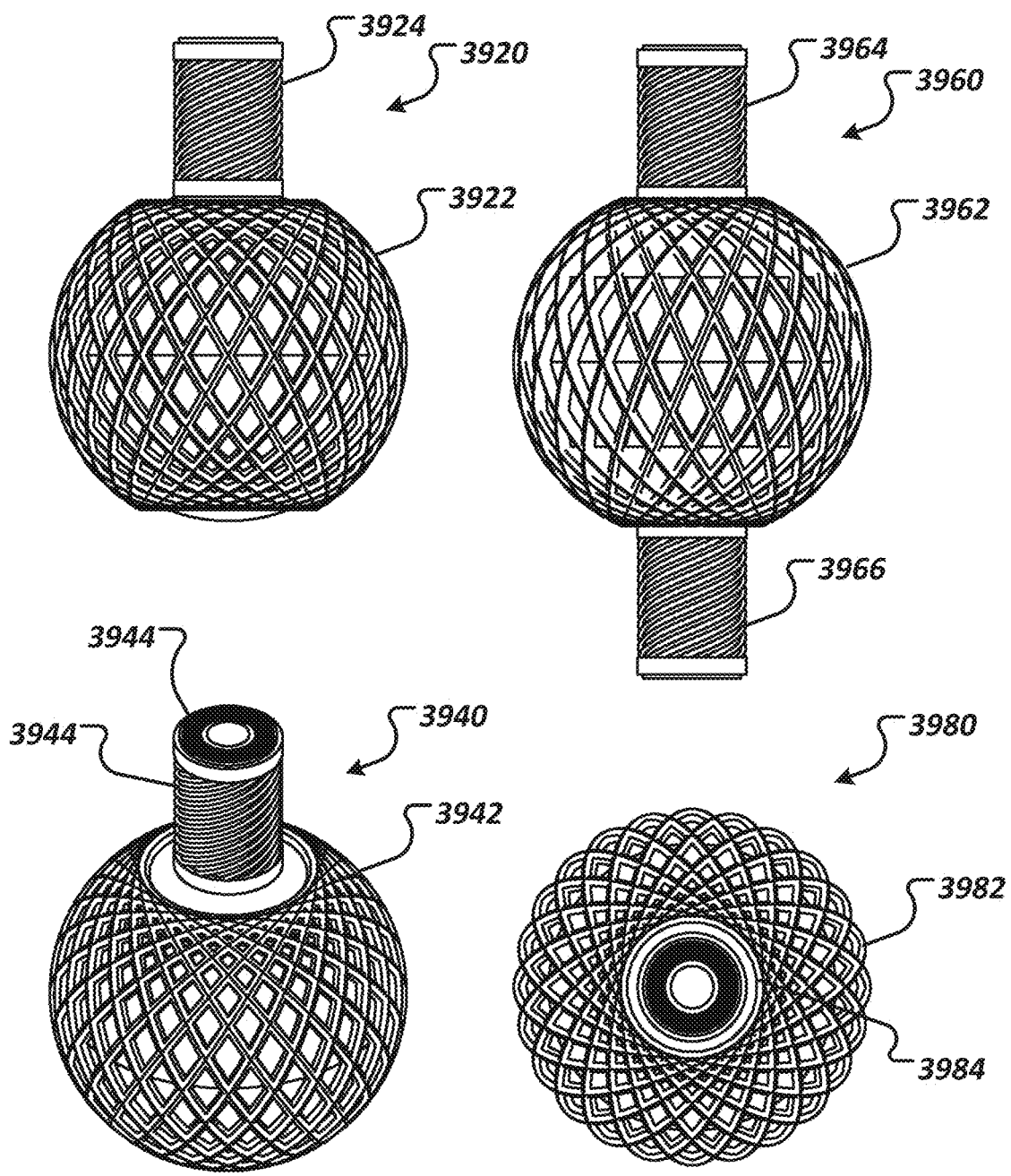
FIG. 39 illustrates multiple views of example communication systems.

FIG. 39 illustrates two examples of an atomic resonance communication system, in which each example system has a signal injection circuit and/or a signal detection circuit. A first system is illustrated in a side view 3920 and an isometric view 3940. The first system includes primary coils 3922 and 3942 respectively and a signal injection circuit 3924 and 3944 respectively. The signal injection circuit 3924 is implemented as a helical coil antenna with an optical lens disposed within or at one end or at both ends. In some implementations, the optical lens is a Fresnel lens 3946. A second system is illustrated in a side view 3960 and a top view 3980 and includes primary coils 3962 and 3982 respectively, a signal injection circuit 3964 and 3984, and a signal detection circuit 3966 illustrated in the side view 3960. Both signal injection and signal detection circuits (e.g., signal injection circuit 3964 and signal detection circuit 3966) are implemented as helical coil antennas with a respective optical lens disposed within or at one end or at both ends.

Figure 40:
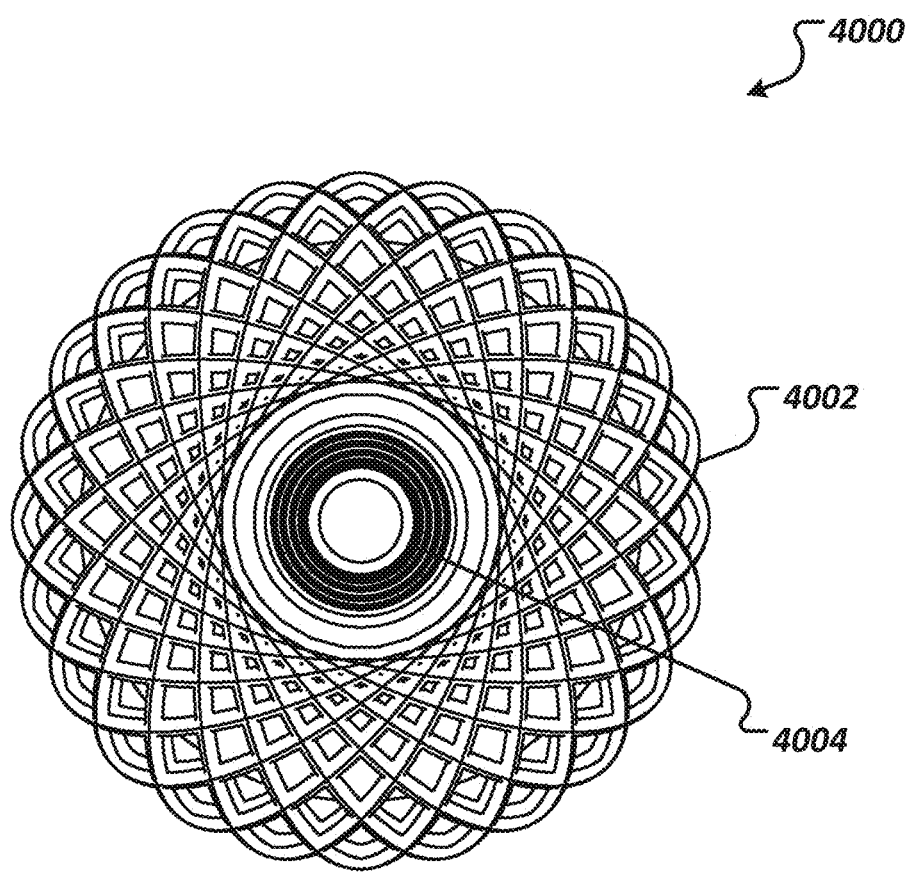
FIG. 40 illustrates components of an example communication system.

FIG. 40 is a top view of an example atomic resonance communication system 4000. The system includes primary coils 4002 and a lens 4004 of a signal injection circuit.

Figure 41:
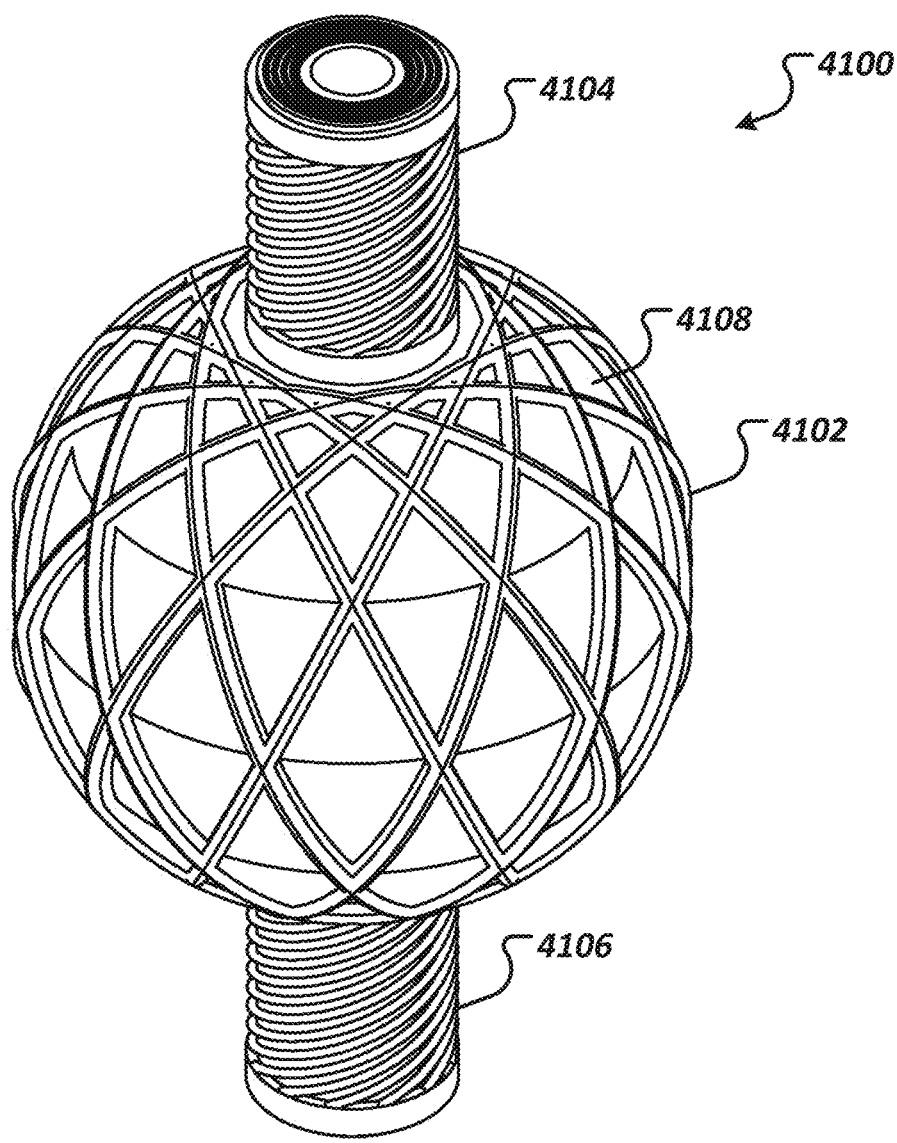
FIG. 41 illustrates components of an example communication system.

FIG. 41 is an isometric view of an example atomic resonance communication system 4100, in which the system 4100 includes primary coils 4102, an example of a signal injection circuit that includes a helical coil antenna 4104 and a lens 4108 disposed within or at one end or at both ends of the antenna 4104, and an example of a signal detection circuit that includes a helical coil antenna 4106 and a lens disposed within or at one end or both ends of the antenna 4106. The system 4100 includes a reflective shell 4108 internal to the primary coils 4102. In some implementations, the reflective shell 4108 is a fusion reactor. In some implementations, the reflective shell 4108 is metallic. In some implementations, the reflective shell 4108 is superconductive. In some other implementations, the reflective shell 4208 is glass or ceramic.

Figure 42:
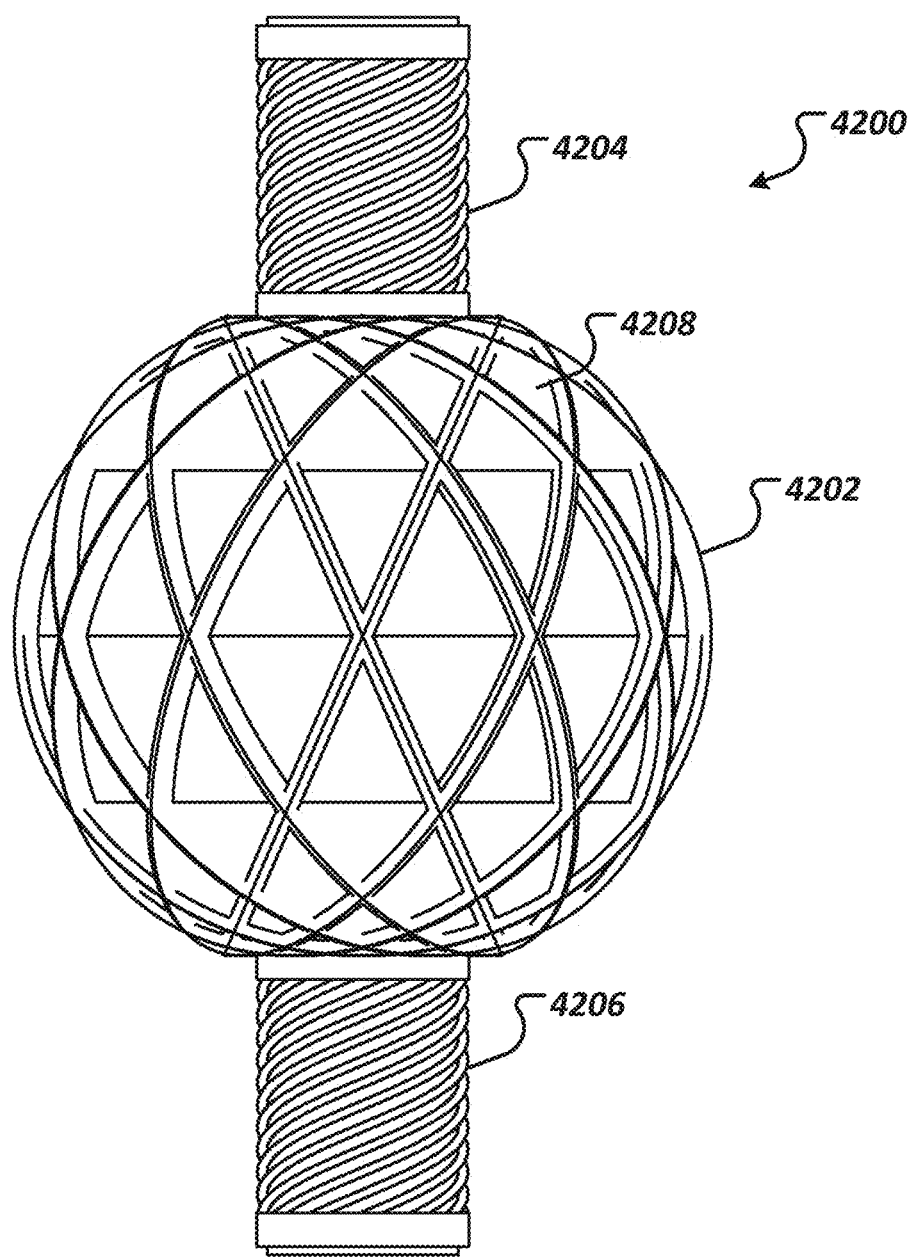
FIG. 42 illustrates components of an example communication system.

FIG. 42 is side view of an example atomic resonance communication system 4200, in which the system 4200 includes primary coils 4202, an example of a signal injection circuit that includes a helical coil antenna 4204, and an example of a signal detection circuit that includes a helical coil antenna 4206. The system 4200 includes a reflective shell 4208 internal to the primary coils 4202. In some implementations, the reflective shell 4208 is a fusion reactor. In some implementations, the reflective shell 4208 is metallic. In some implementations, the reflective shell 4208 is superconductive.

Figure 43:
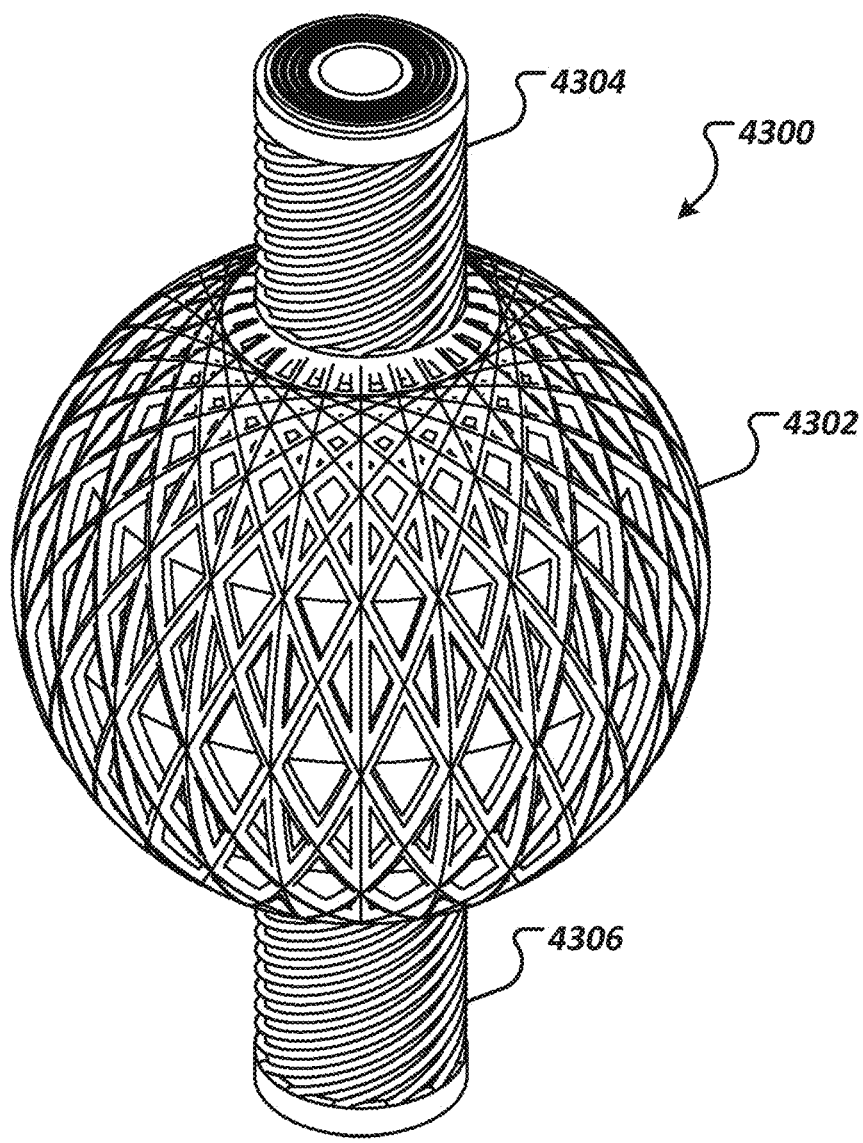
FIG. 43 illustrates components of an example communication system.

FIG. 43 is an isometric view of an example atomic resonance communication system 4300, in which the system 4300 includes primary coils 4302, an example of a signal injection circuit that includes a helical coil antenna 4304 and a lens 4306 disposed within or at one end or both ends of the antenna 4304, and an example of a signal detection circuit that includes a helical coil antenna 4306 and a lens disposed within or at one end or both ends of the antenna 4306.

Figure 44:
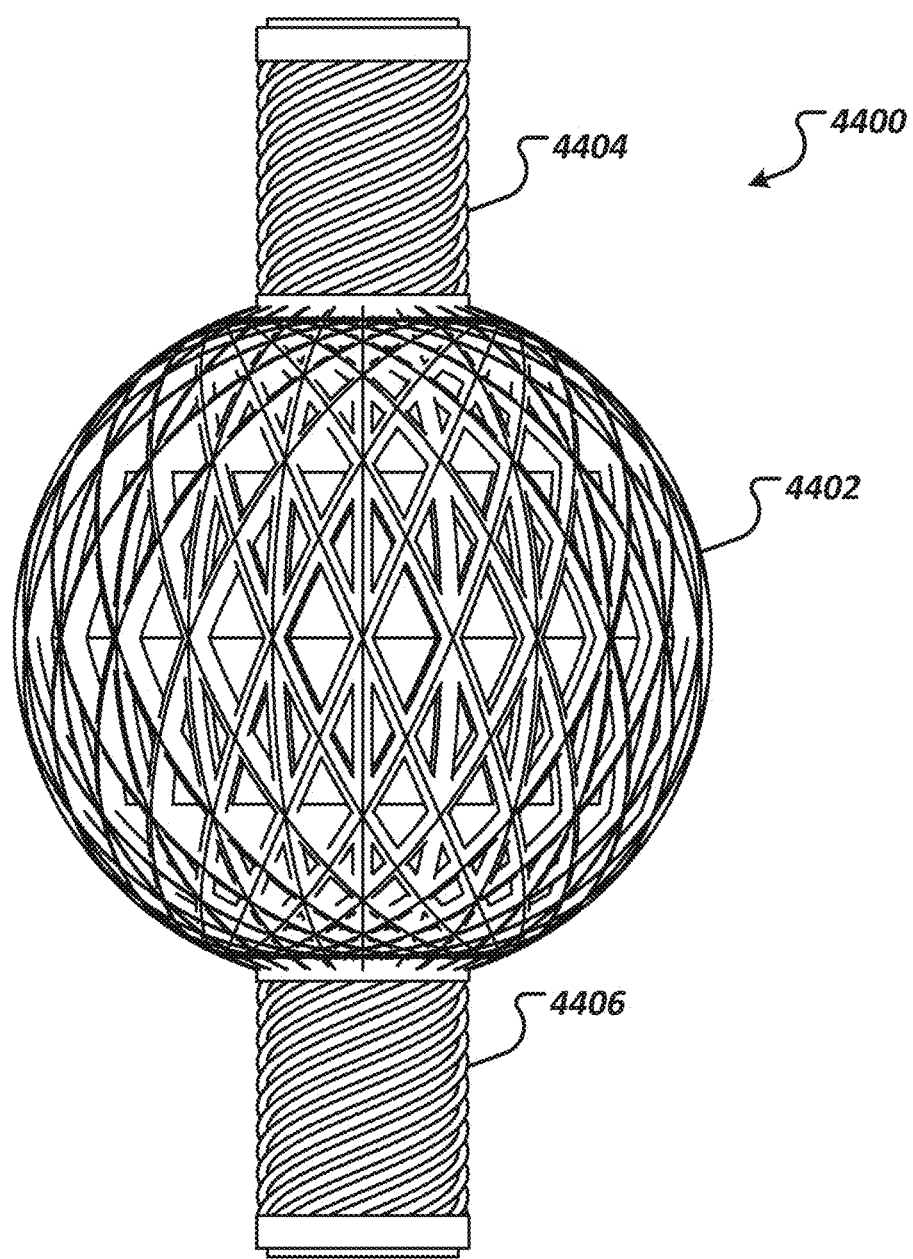
FIG. 44 illustrates components of an example communication system.

FIG. 44 is side view of an example atomic resonance communication system 4400, in which the system includes primary coils 4402, an example of a signal injection circuit that includes a helical coil antenna 4404, and an example of a signal detection circuit that includes a helical coil antenna 4406.

Figure 45:
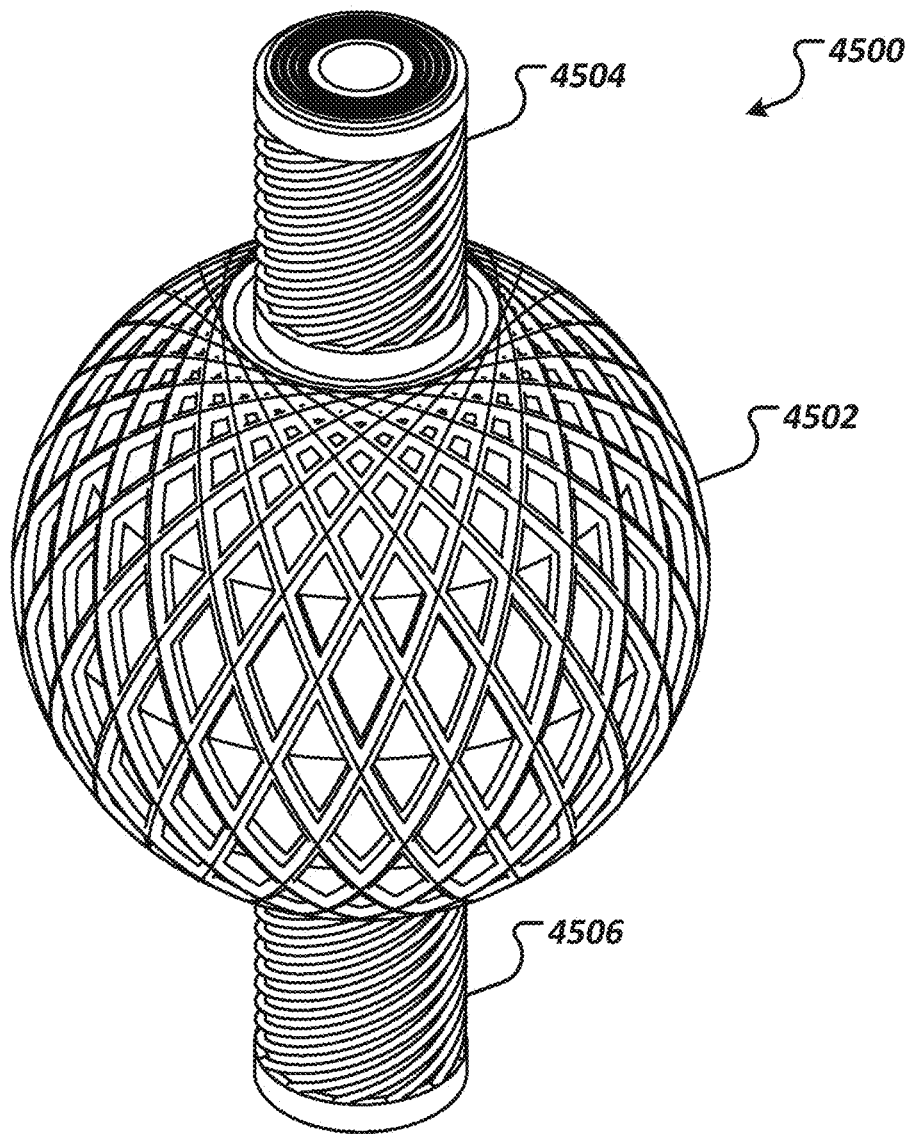
FIG. 45 illustrates components of an example communication system.

FIG. 45 is an isometric view of an example atomic resonance communication system 4500, in which the system 4500 includes primary coils 4502, an example of a signal injection circuit that includes a helical coil antenna 4504 and a lens 4508 disposed within or at one end or both ends of the antenna 4504, and an example of a signal detection circuit that includes a helical coil antenna 4506 and a lens disposed with or at one end or both ends of the antenna 4506.

Figure 46:
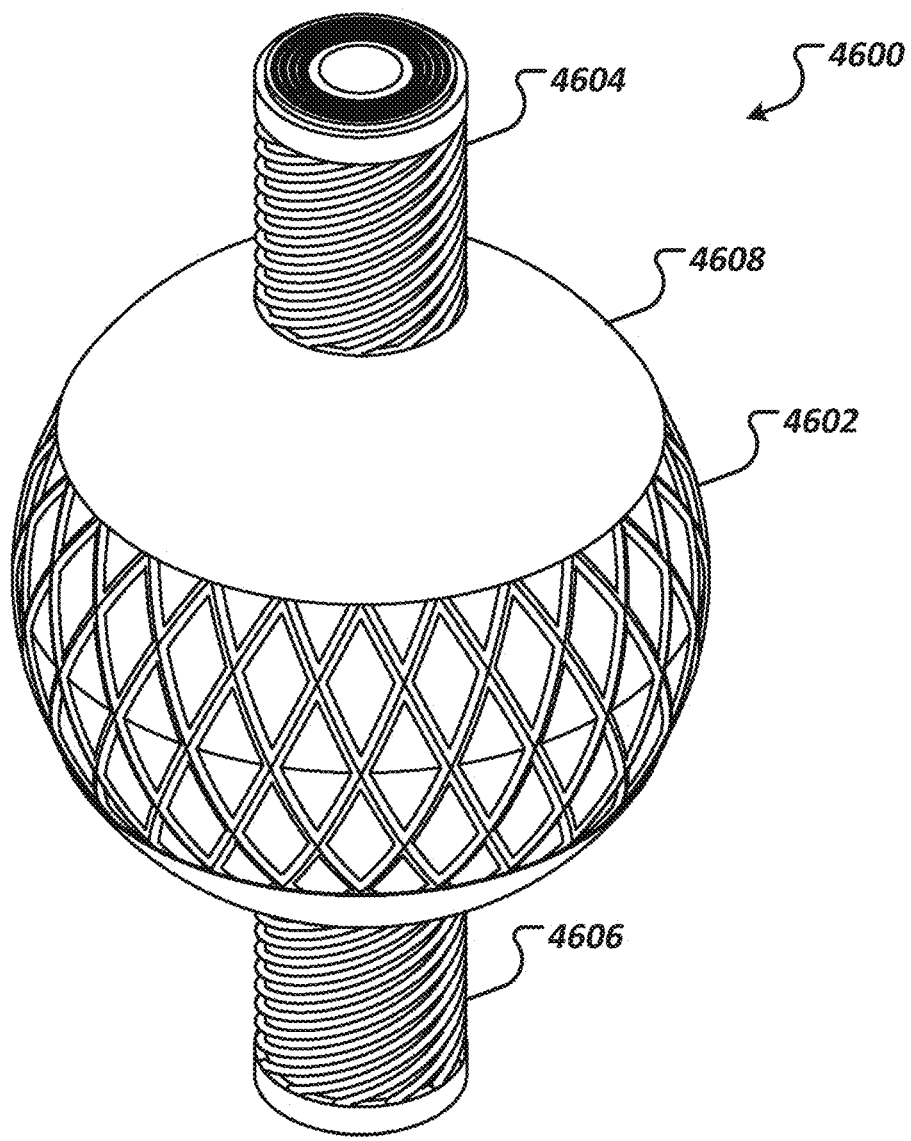
FIG. 46 illustrates components of an example communication system.

FIG. 46 is an isometric view of an example atomic resonance communication system 4600, in which the system includes primary coils 4602, an example of a signal injection circuit that includes a helical coil antenna 4604 and a lens 4610 disposed within or at one end or both ends of the antenna 4606, and an example of a signal detection circuit that includes a helical coil antenna 4606 and a lens disposed within or at one end or both ends of the antenna 4606. The system 4600 includes an example configuration of an atomic resonance communication system encased in a vacuum chamber/fusion reactor shell 4608 with primary coils 4602 that cover a partial external area of the reactor shell 4608. In some implementations, a portion of the primary coils 4602 are disposed inside the reactor shell 4608. In some implementations, the reactor shell 4608 is superconductive.

Figure 47:
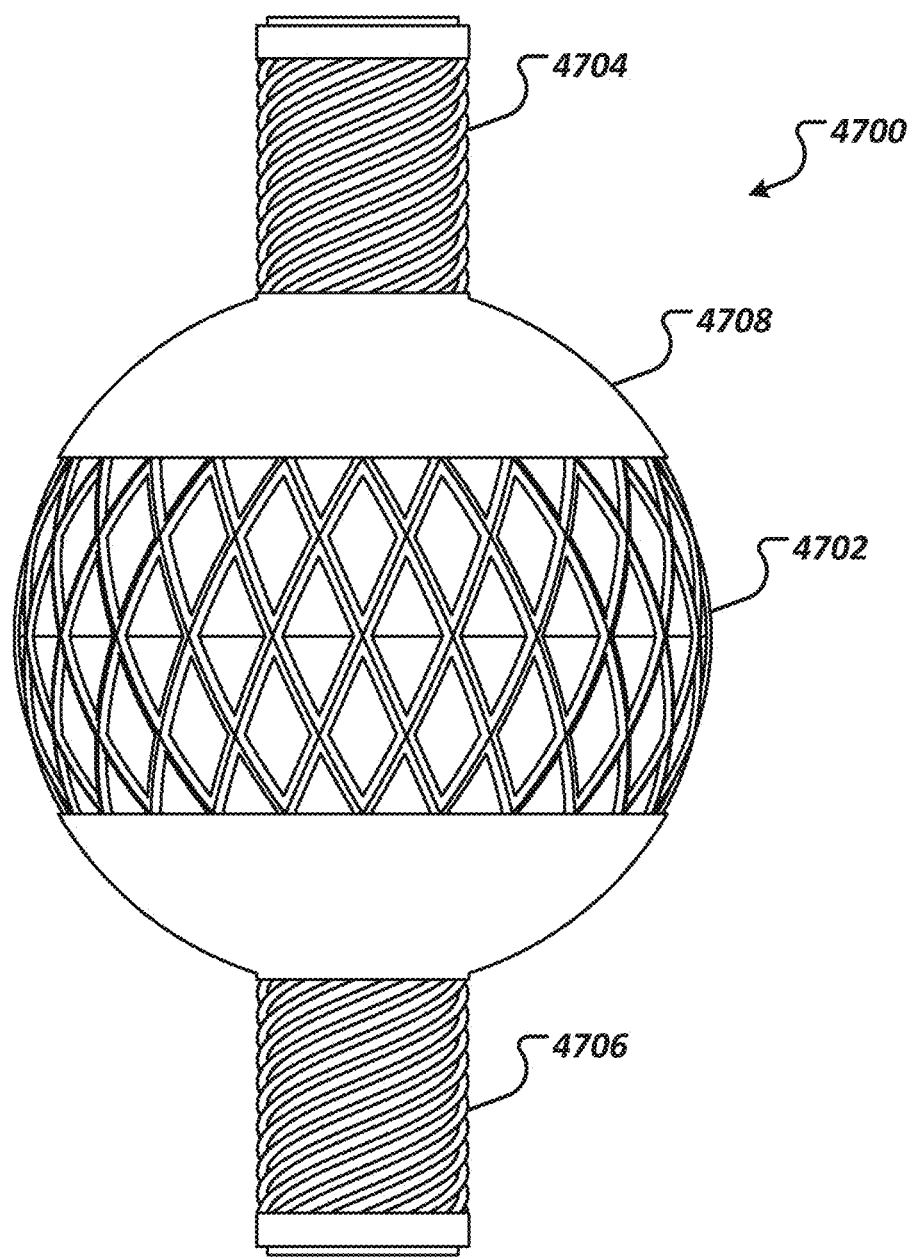
FIG. 47 illustrates components of an example communication system.

FIG. 47 is an isometric view of an example atomic resonance communication system 4700, in which the system 4700 includes primary coils 4702, an example of a signal injection circuit that includes a helical coil antenna 4702, and an example of a signal detection circuit that includes a helical coil antenna 4704. The system 4700 includes an example configuration of an atomic resonance communication system encased in a vacuum chamber/fusion reactor shell 4708 with primary coils 4702 that cover a partial external area of the reactor shell 4708. In some implementations, a portion of the primary coils 4702 are disposed inside the reactor shell 4708. In some implementations, the reactor shell 4708 is superconductive.

Figures 48A, 48B:
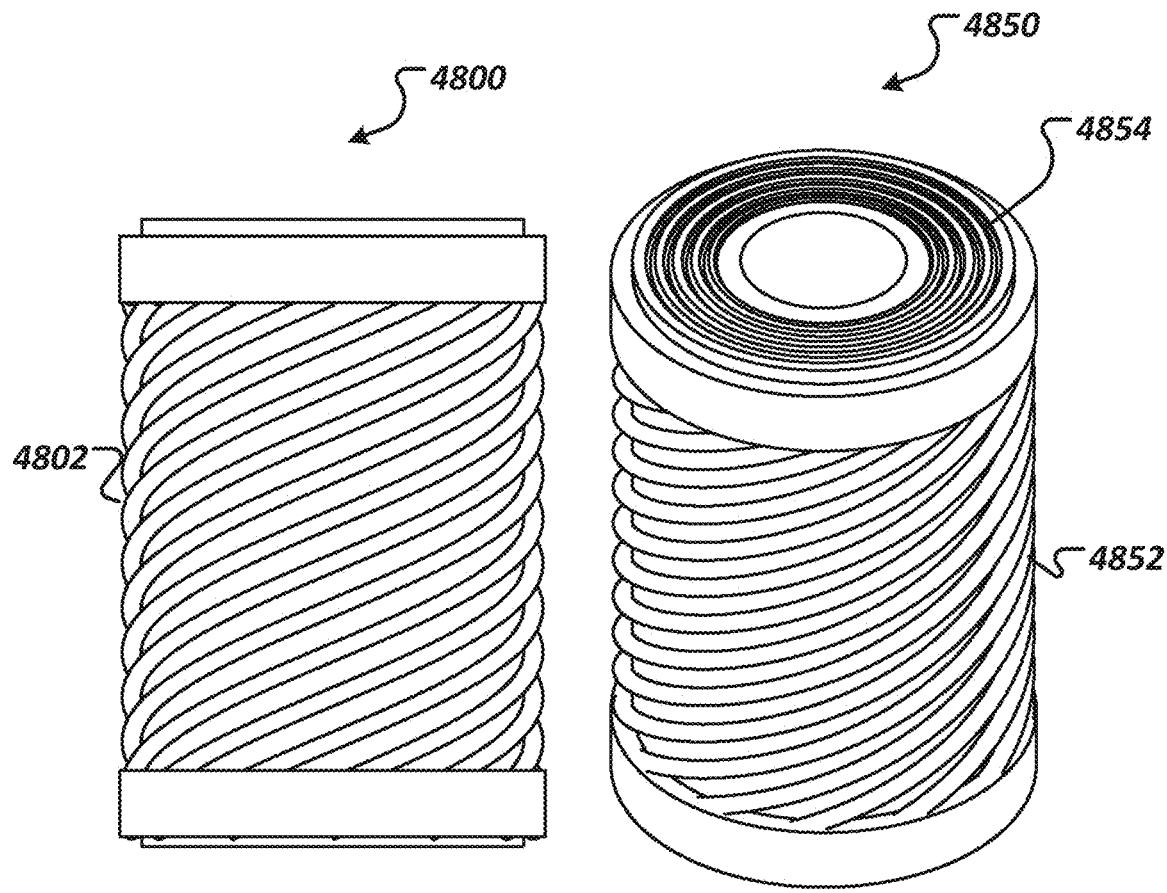
FIGS. 48A and B illustrate components of an example communication system.

FIG. 48A is a side view of an example signal injection and/or detection circuit 4800. The circuit 4800 includes a helical coil antenna 4802.

FIG. 48B is an isometric view of an example signal injection and/or detection circuit 4850. The circuit 4850 includes a helical coil antenna 4852. A lens 4854 is disposed within or at one end or both ends of the helical coil antenna 4852.

Figure 49:
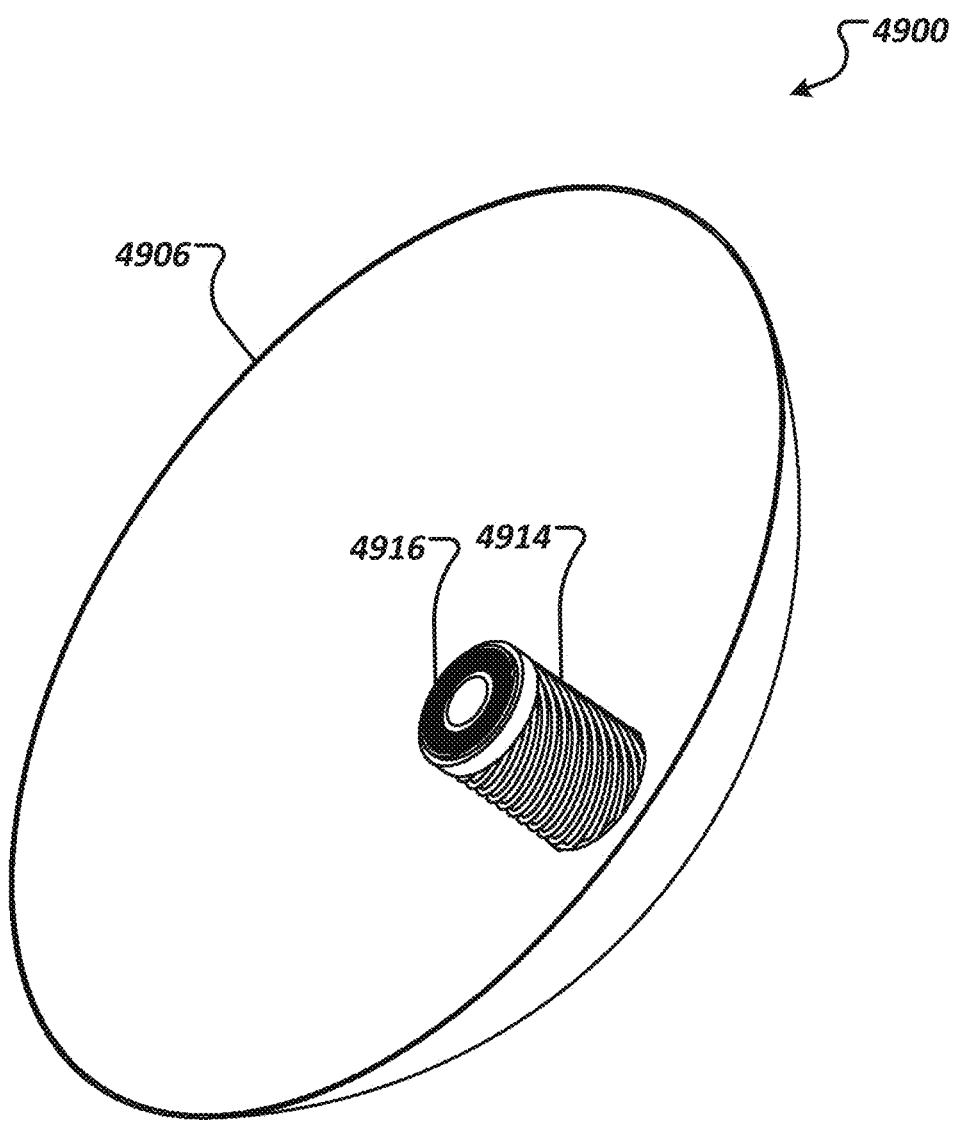
FIG. 49 illustrates components of an example communication system.

FIG. 49 is an isometric view of an example system 4900 with a signal injection and/or detection circuit and a dish receiver 4906. The signal injection and/or detection circuit includes a helical coil antenna 4914 and a lens 4916 disposed within or at one end or both ends of the antenna 4914. In some implementations, the dish receiver 4906 can be configured as a flat metal ground plane for an optohelical antenna in an axial mode configuration.

Figure 50:
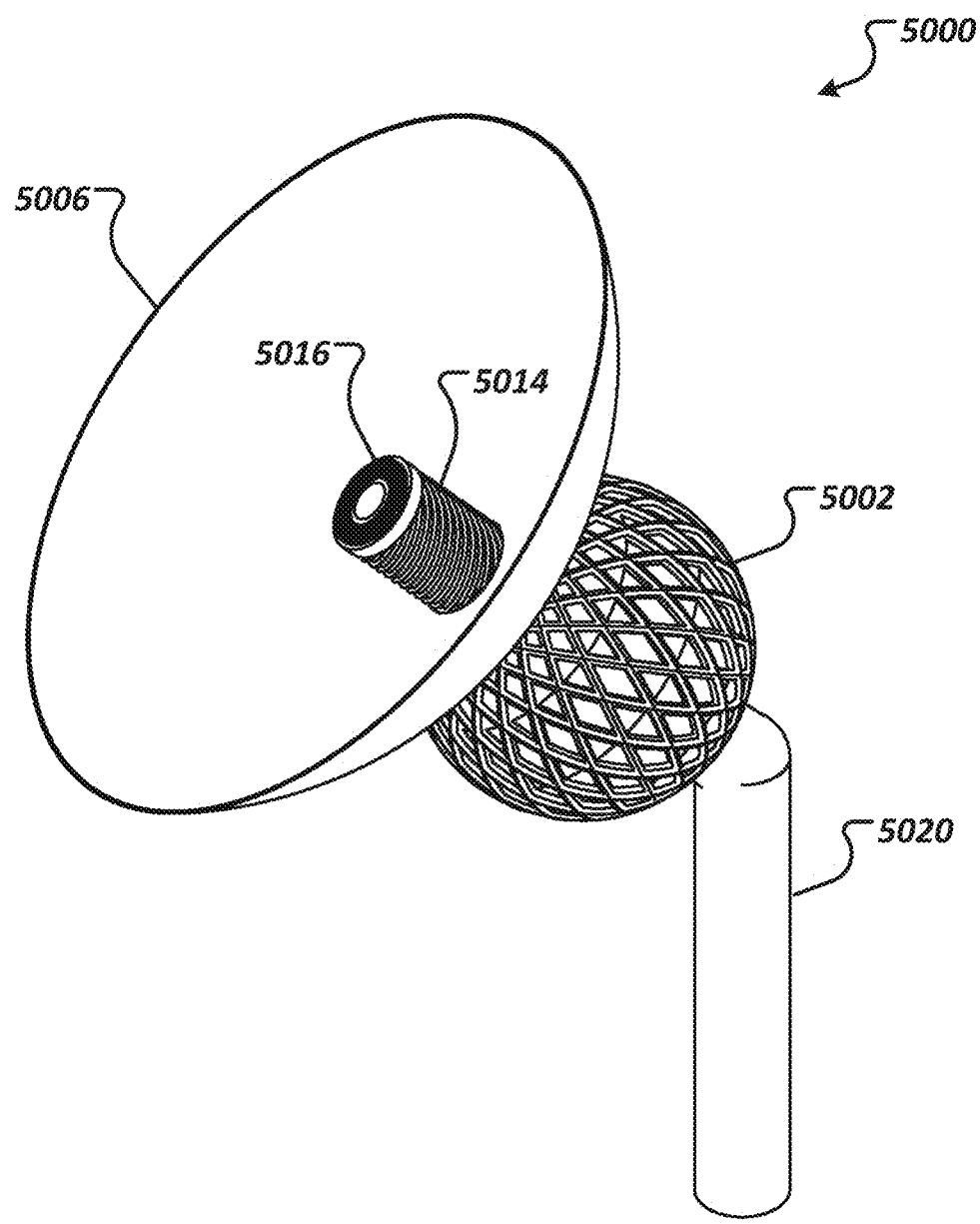
FIG. 50 illustrates components of an example communication system.

FIG. 50 is an isometric view of an example system 5000 with a signal injection and/or detection circuit and a dish receiver 5006 coupled to an atomic resonance communication system 5002 with a support stand 5020. The signal injection and/or detection circuit includes a helical coil antenna 5014 and a lens 5016 disposed within or at one end or both ends of the antenna 5014. In some implementations, the dish receiver 5006 can be configured as a flat metal ground plane for an optohelical antenna in an axial mode configuration.

Figure 51:
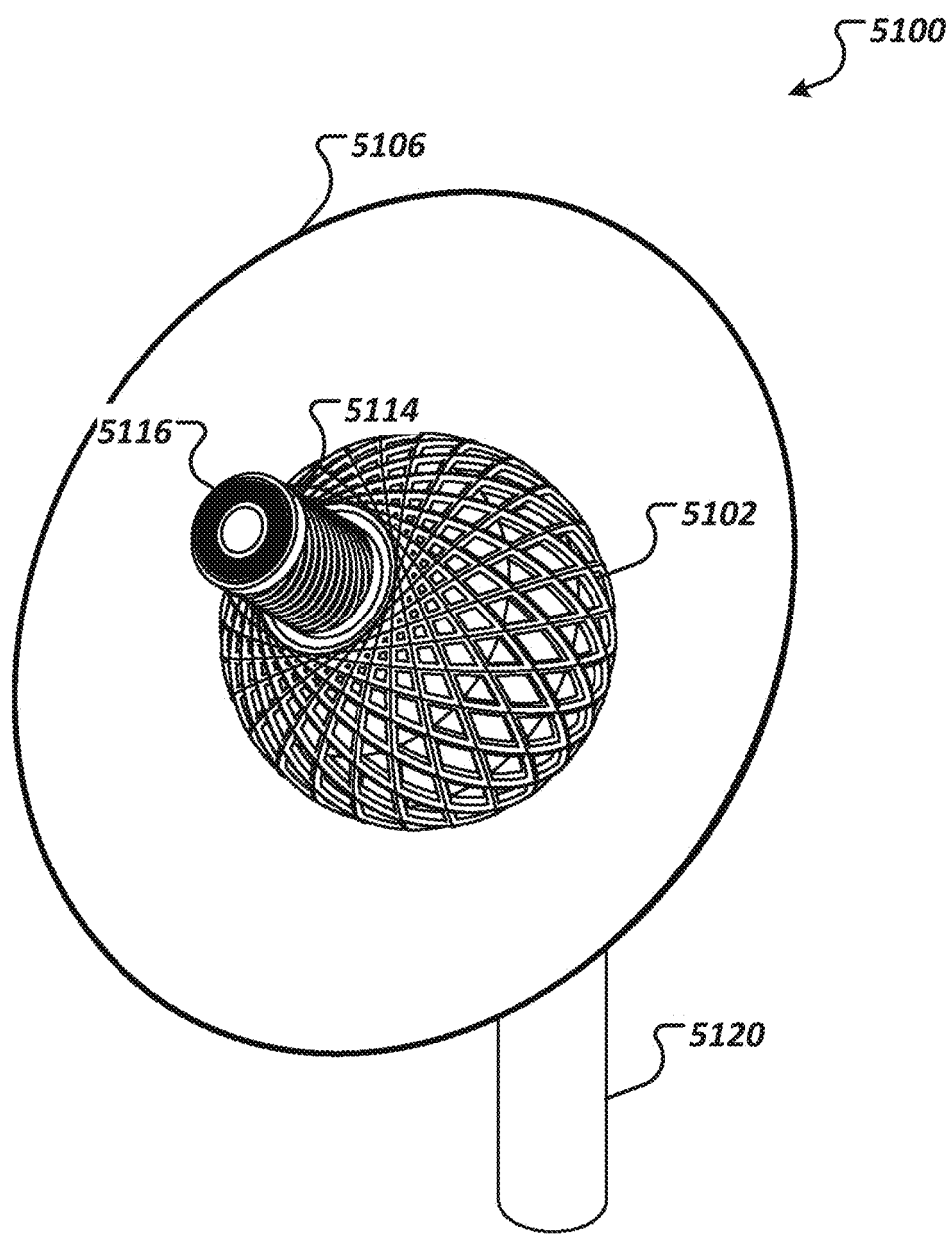
FIG. 51 illustrates components of an example communication system.

FIG. 51 is an isometric view of an example system 5100 with a signal injection and/or detection circuit and a dish receiver 5106 coupled to an atomic resonance communication system 5102 with a support stand 5120. The signal injection and/or detection circuit includes a helical coil antenna 5114 and a lens 5116 disposed within or at one end or both ends of the antenna 5114. In some implementations, the dish receiver 5106 can be configured as a flat metal ground plane for an optohelical antenna in an axial mode configuration.

Figure 52:
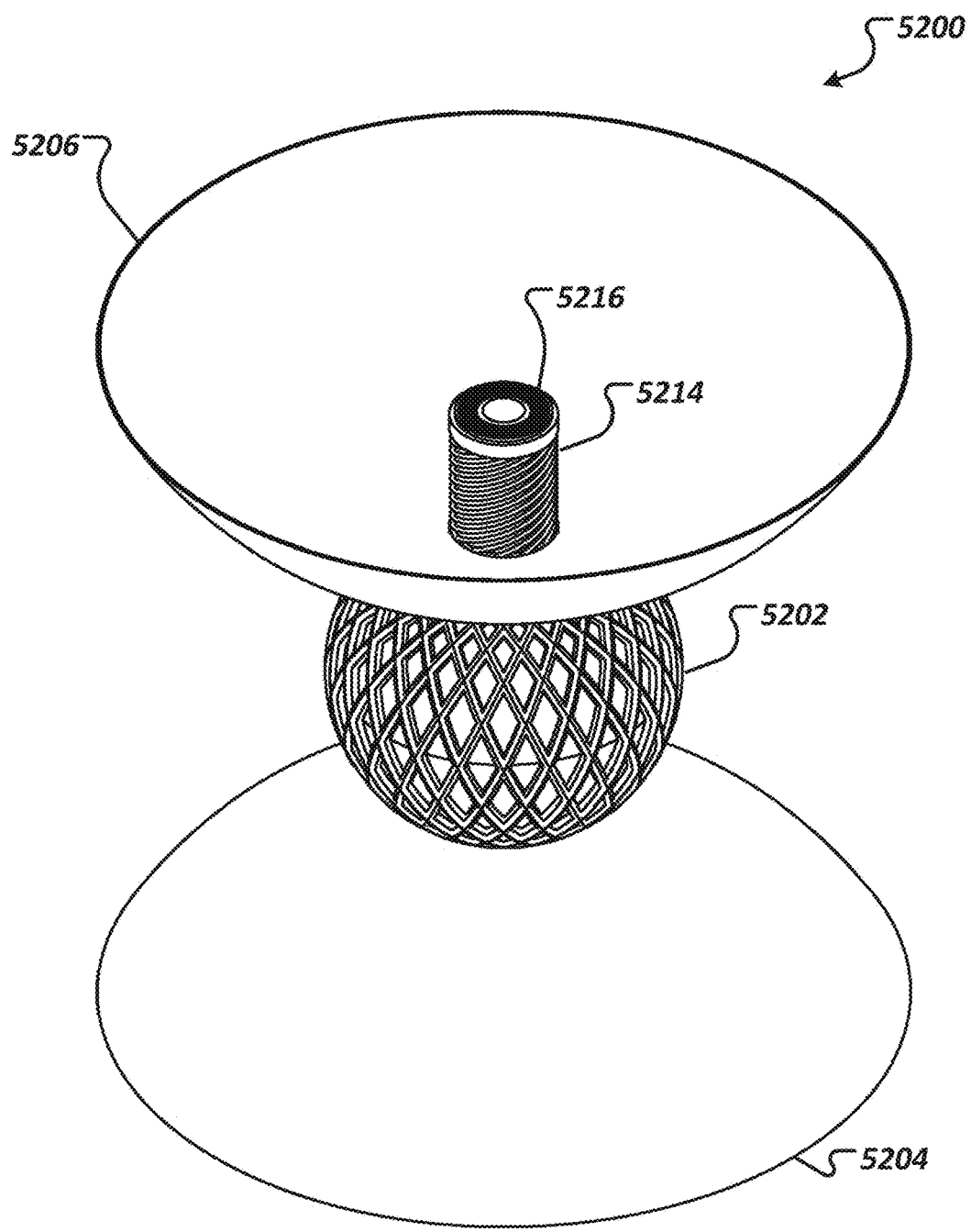
FIG. 52 illustrates components of an example communication system.

FIG. 52 is an isometric view of an example system 5200 with signal injection and/or detection circuit, a top dish receiver 5206, a bottom dish receiver 5204, and an atomic resonance communication system 5202. The signal injection and/or detection circuit includes a helical coil antenna 5214 and a lens 5216 disposed within or at one end or both ends of the antenna 5214. In some implementations, the dish receiver 5206 can be configured as a flat metal ground plane for an optohelical antenna in an axial mode configuration.

Figure 53:
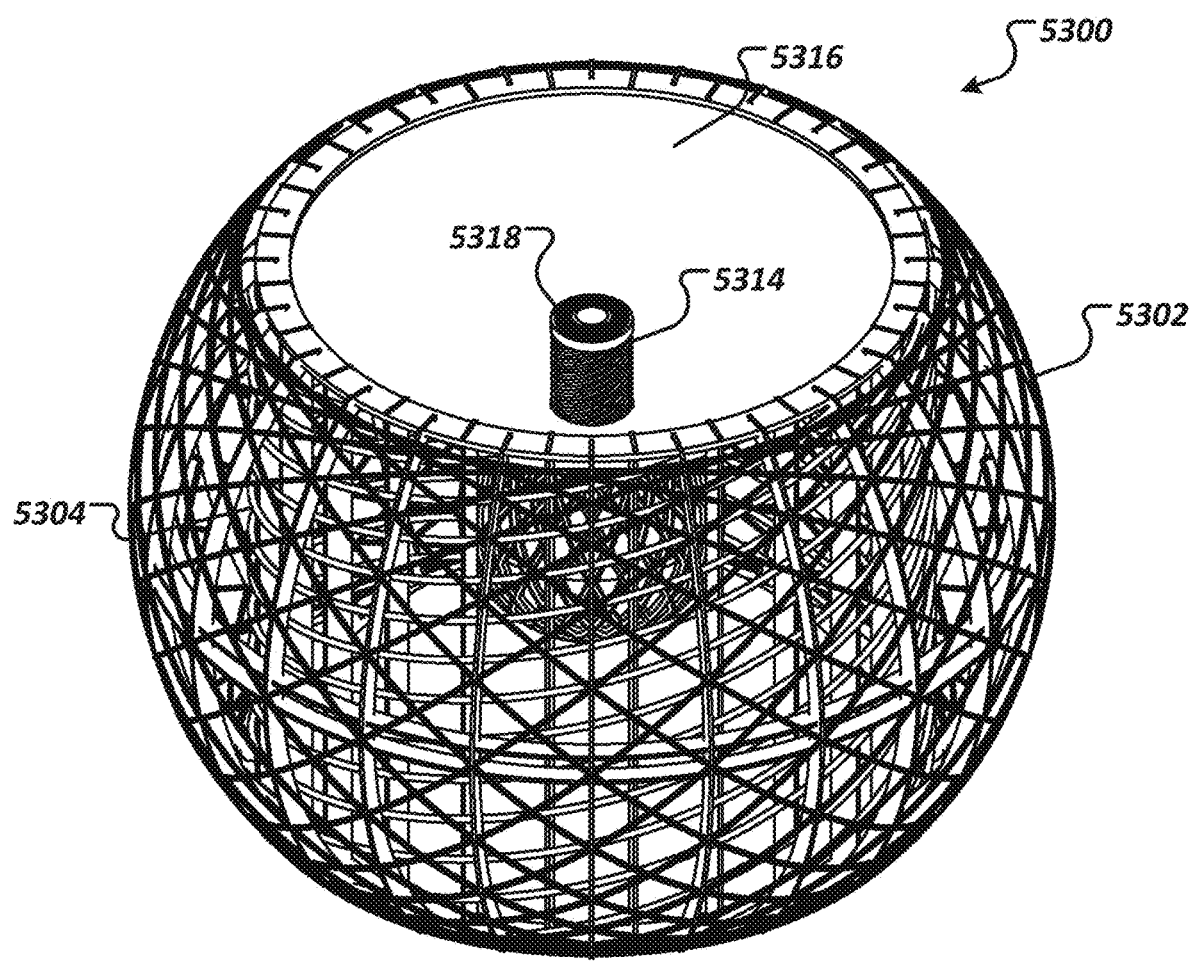
FIG. 53 illustrates components of an example communication system.

FIG. 53 is an isometric view of components of an example atomic resonance communication system 5300 that includes an example signal injection circuit, a dish receiver 5316, and primary coils 5302 with a toroidal configuration. The signal injection circuit includes a helical coil antenna 5314 and a lens 5318 disposed within or at one end or both ends of the antenna 5314. An internal helical antenna 5304 is disposed within the primary coils 5302. In some implementations, the dish receiver 5316 can be configured as a flat metal ground plane for an optohelical antenna in an axial mode configuration.

Figure 54:
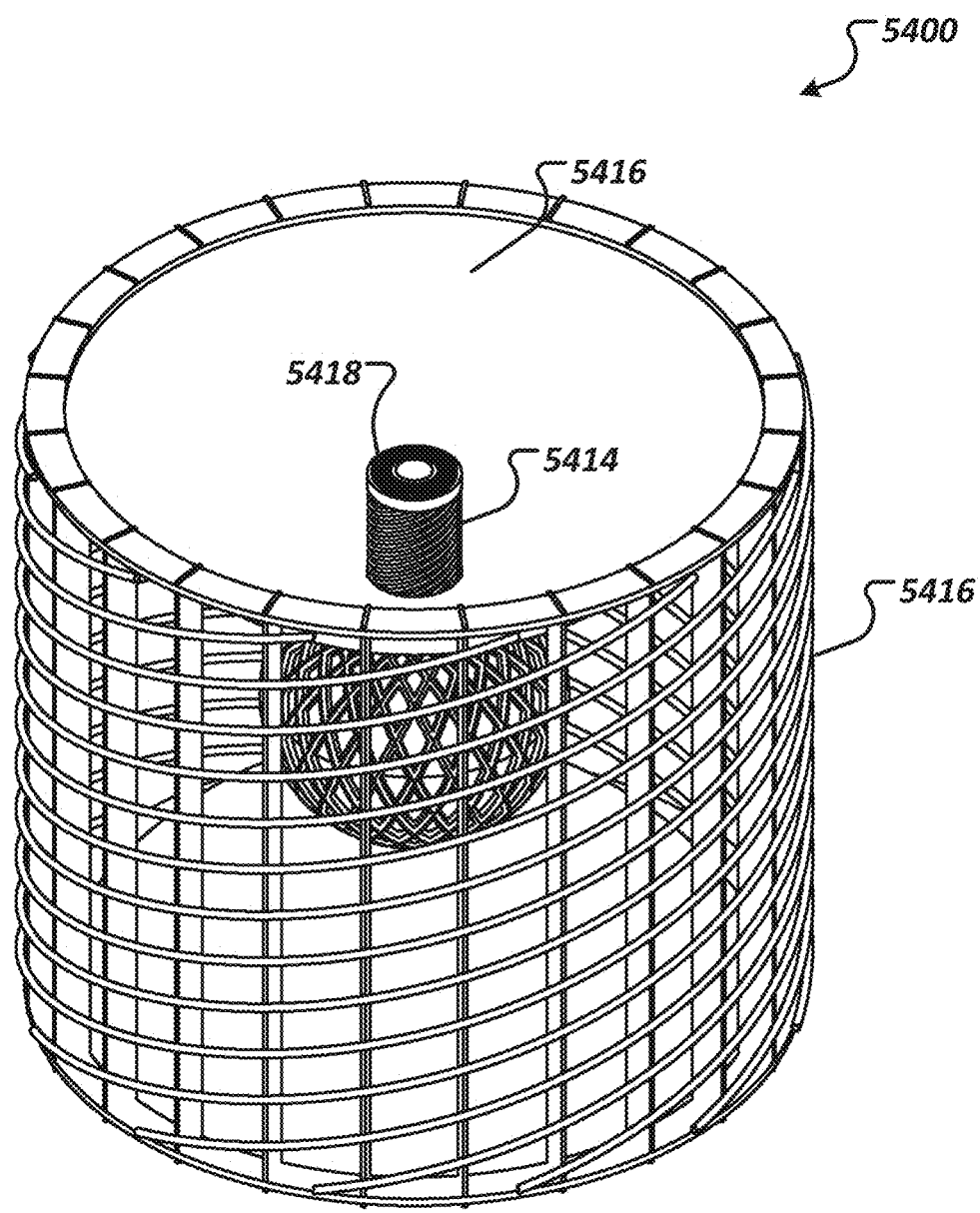
FIG. 54 illustrates components of an example communication system.

FIG. 54 is an isometric view of components of an example atomic resonance communication system 5400 that includes an example signal injection circuit, a dish receiver 5416, and helical coils 5402 with a cylindrical coil configuration. The signal injection circuit includes a helical coil antenna 5414 and a lens 5418 disposed within or at one end or both ends of the antenna 5414. In some implementations, the dish receiver 5416 can be configured as a flat metal ground plane for an optohelical antenna in an axial mode configuration.

Figure 55:
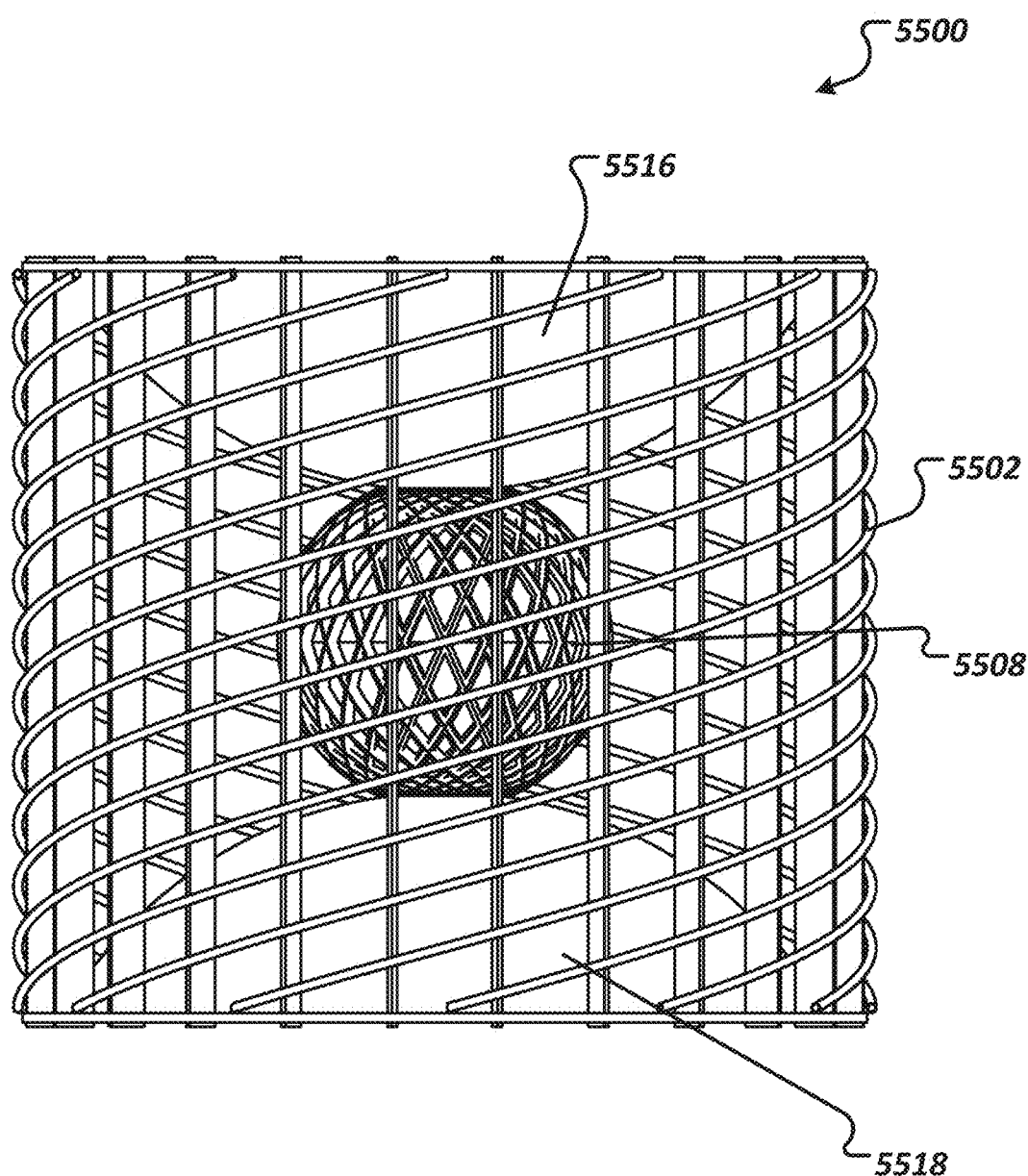
FIG. 55 illustrates components of an example communication system.

FIG. 55 is a side view of components of an example atomic resonance communication system 5500. The system 5500 is the side view of the system 5400, in which helical coils 5502 are in a cylindrical configuration, a central core 5508 is coupled to a signal injection circuit with a dish receiver 5516 and a signal detection circuit with a dish transmitter 5518. In some implementations, the dish receiver 5516 and/or the dish transmitter 5518 can be configured as a flat metal ground plane for an optohelical antenna in an axial mode configuration.

Figure 56:
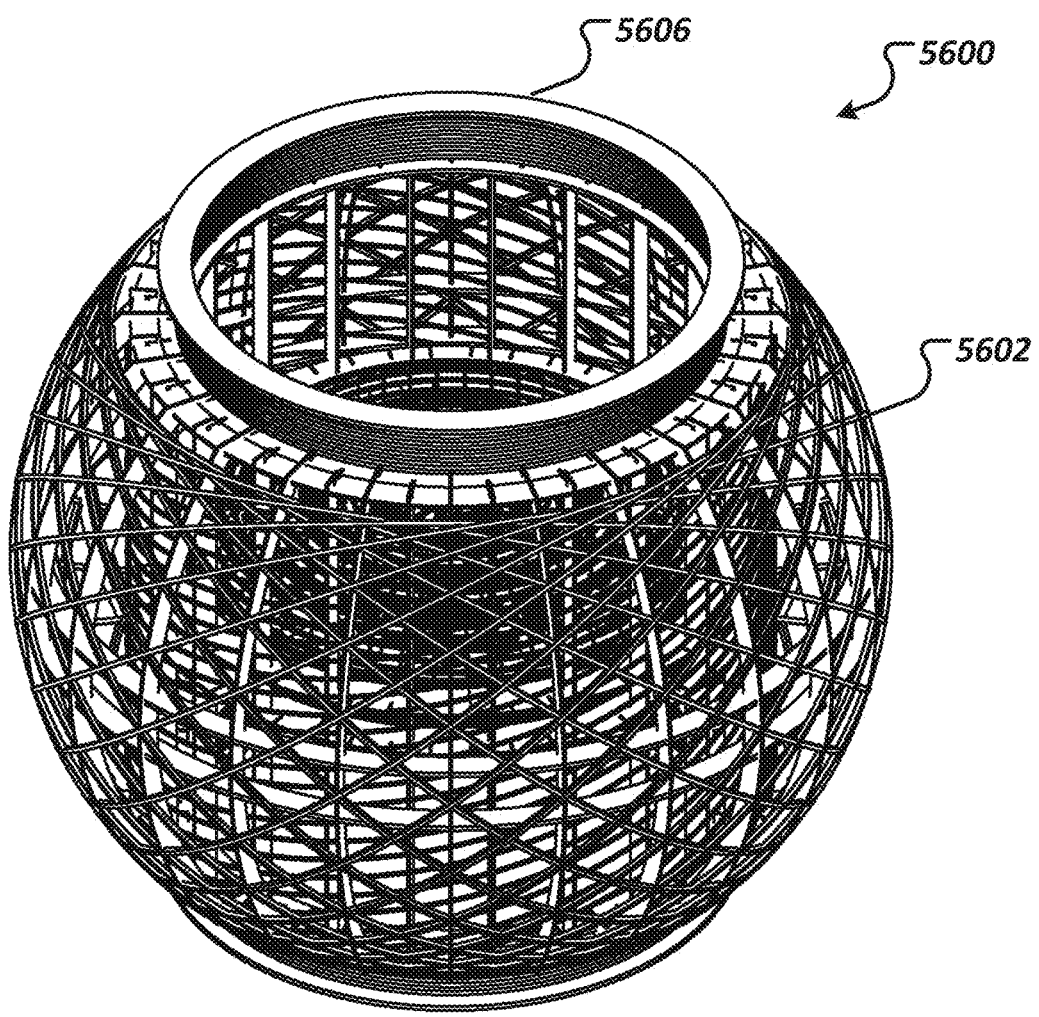
FIG. 56 illustrates components of an example communication system.

FIG. 56 is an isometric view of components of an example toroidal configuration of an atomic resonance system 5600 with primary coils 5602 and signal injection circuit 5606 implemented as a Helmholtz coil.

In the overall structure of the system 5600, various components can be included to assist operations. For example, a central core of the system 5600 is positioned inside the primary coils 5602 (also presented from a better viewing perspective as central core 5802 of FIG. 58) contributes considerably to operations.

Figure 57:
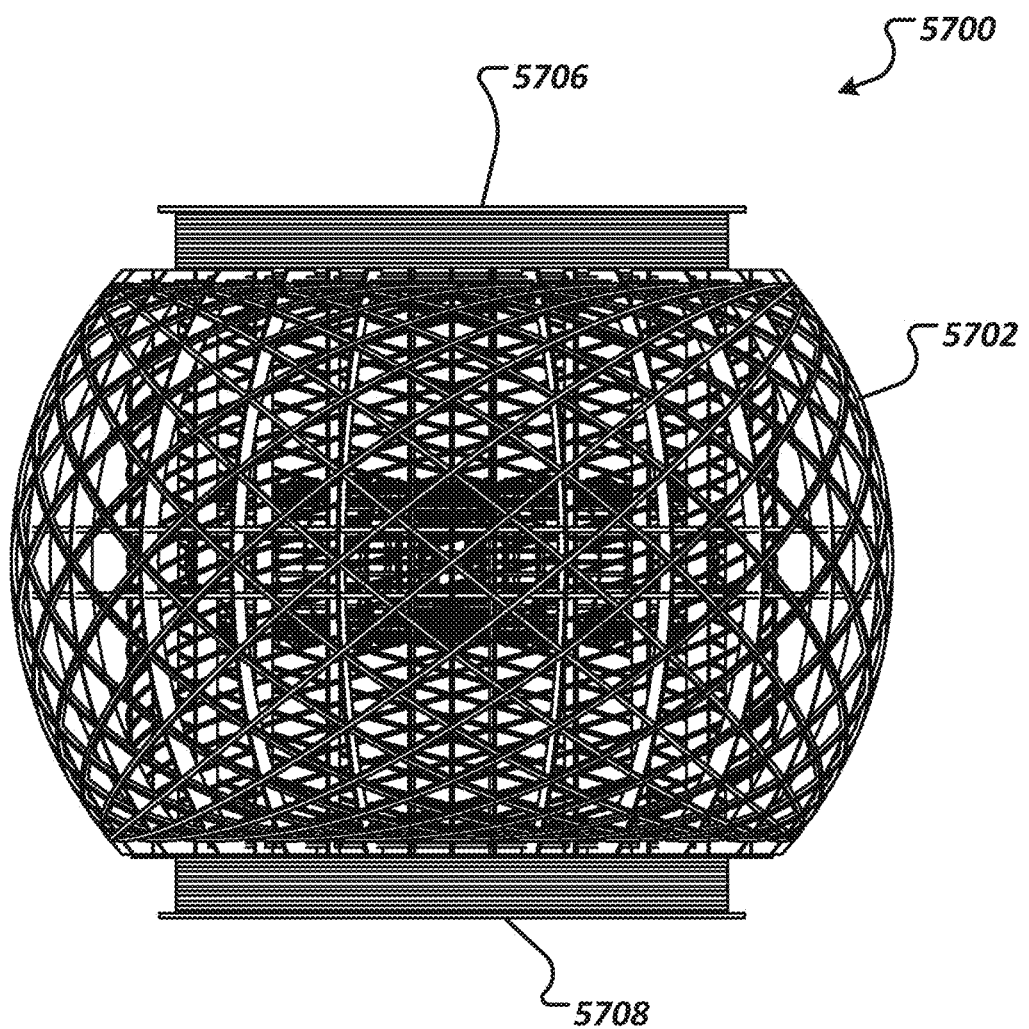
FIG. 57 illustrates components of an example communication system.

FIG. 57 is a side view of components of an example toroidal configuration of an atomic resonance communication system 5700 with primary coils 5702, signal injection circuit 5706, and signal detection circuit 5708. In some implementations, the signal injection circuit 5706 can be configured to detect a signal. Similarly, in some implementations, the signal detection circuit 5708 can be configured to inject a signal. The signal and detection circuits are implemented as Helmholtz coils. In some implementations, signal detection and/or injection circuits are implemented as fixed multiple axis orthogonal coils. Inductor coils, e.g., primary coils 5702, may be considered inductor or inductive coil sensors and may sense one or more magnetic fields.

In the overall structure of the system 5700, various components can be included to assist operations. For example, a central core of the system 5700 is positioned inside the primary coils 5702 (also presented from a better viewing perspective as central core 5802 of FIG. 58) contributes considerably to operations.

Figure 58:
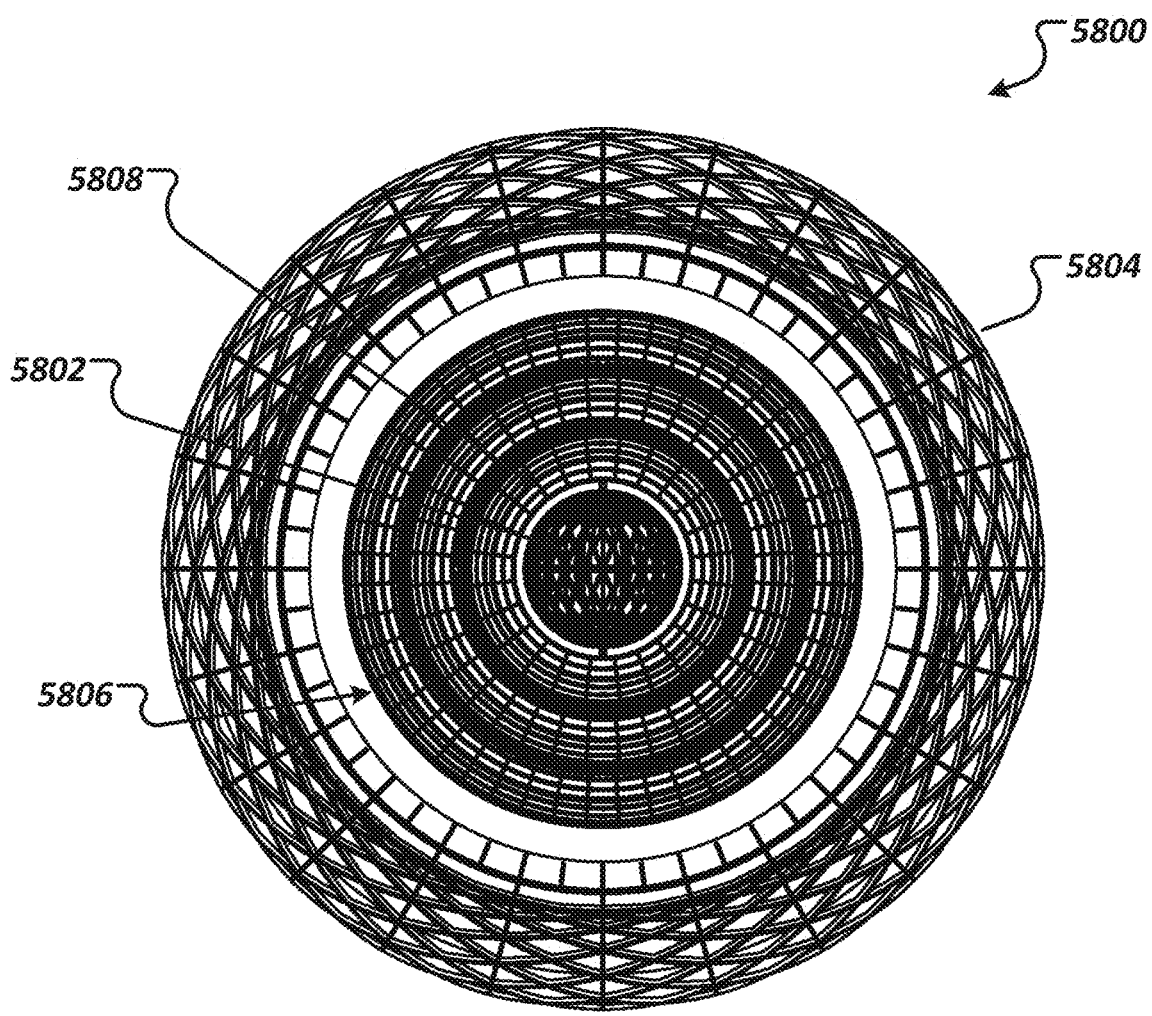
FIG. 58 illustrates a top view of components of an example communication system.

FIG. 58 is a top view of components of an example toroidal configuration of an atomic resonance communication system 5800. The top view shows a central core 5802, central core coils 5808, signal injection circuit 5806, and primary coils 5804.

Figure 59:
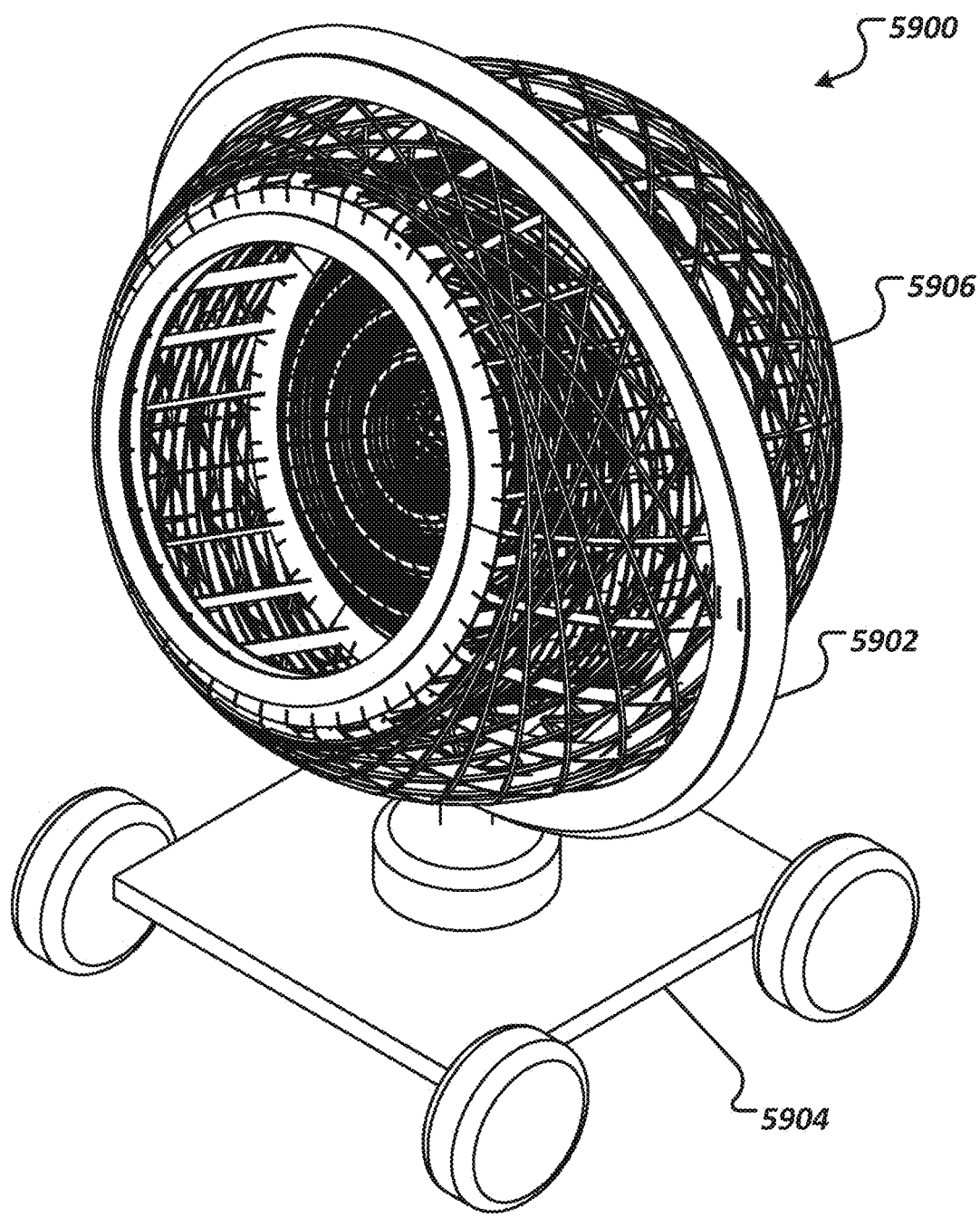
FIG. 59 illustrates components of an example communication system.

FIG. 59 is an isometric view of an example system 5900 that includes a wheeled base 5904, an example toroidal configuration of an atomic resonance communication system 5906, and an example external loop antenna 5902 that allows the system 5906 to rotate.

In the overall structure of the system 5900, various components can be included to assist operations. For example, primary coils and central core of the system 5906 (also presented from a better viewing perspective as central core 5802 of FIG. 58) contributes considerably to operations.

FIG. 60 is an isometric view of an example system 6000 that includes a wheeled base 6004, an example toroidal configuration of an atomic resonance communication system 6006, and an example support structure 6002 that allows the system 6006 to rotate.

In the overall structure of the system 6000, various components can be included to assist operations. For example, primary coils and central core of the system 6006 (also presented from a better viewing perspective as central core 5802 of FIG. 58) contributes considerably to operations.

Figure 61:
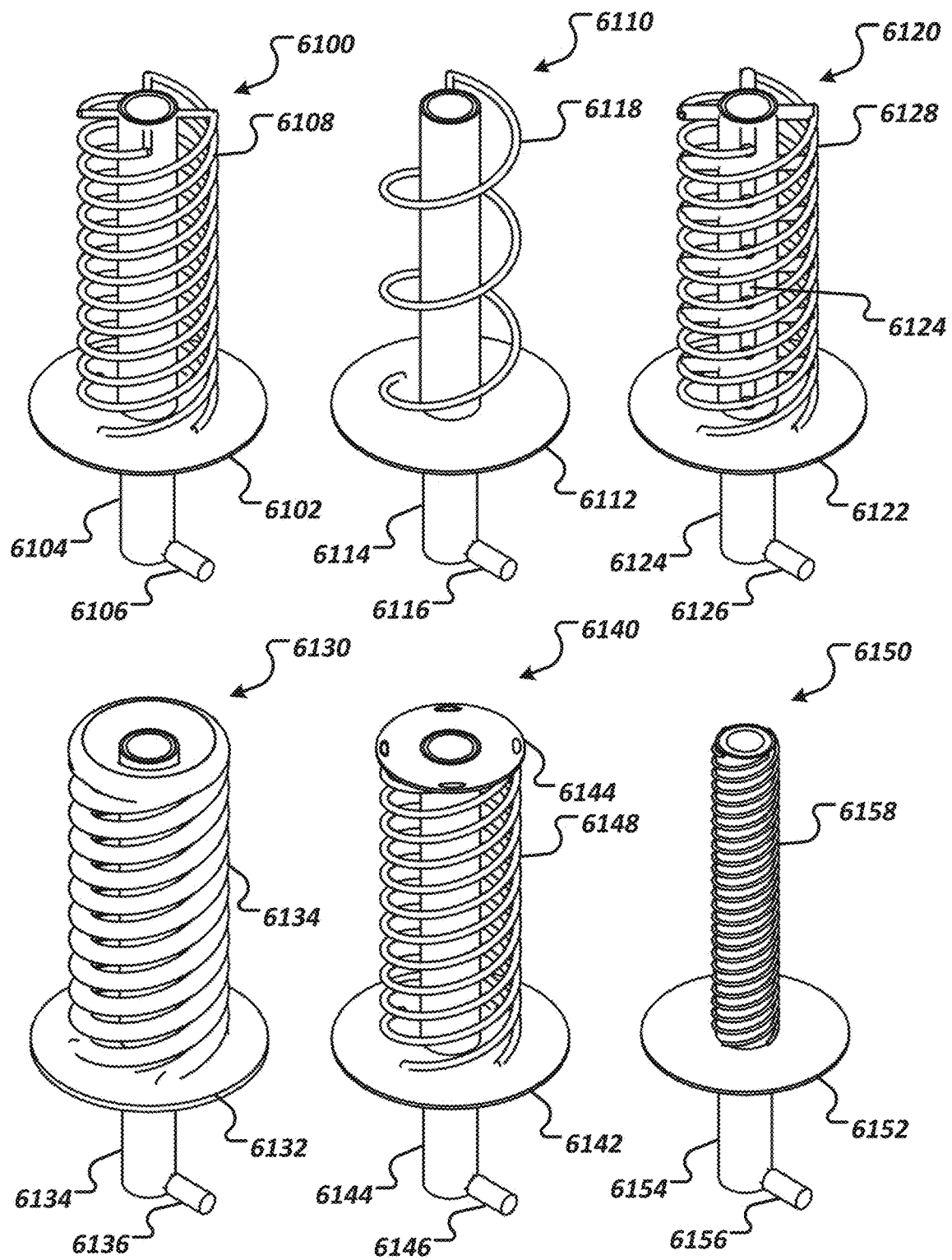
FIG. 61 illustrates multiple configurations of a component of a communication system.

FIG. 61 illustrates multiple configurations of an optohelical antenna. Each configuration includes an optical helical antenna configured in an axial mode that includes a cylindrical structure, e.g., an optical tube assembly, a ground plane, and an optical system attachment. The optical system attachment provides access for one or more optical sources, e.g., lasers, and/or optical detectors, e.g., photodetectors, and/or spectrometers.

A self-supported quadrifilar helical antenna 6100 is configured in an axial mode, e.g., an end-fire mode, with a ground plane 6102 around an optical tube assembly 6104. The antenna 6100 includes an optical system attachment 6106 that provides optical coupling between optical elements in the optical tube assembly 6104, e.g., mirrors, lenses, beam splitters, etc., and optical light sources, e.g., lasers, and optical detectors. The antenna 6100 includes four helical coil antennas, e.g., the helical coil antenna 6108 wrapped around the optical tube assembly 6104.

A self-supported helical antenna 6110 is configured in an axial mode, e.g., an end-fire mode, with a ground plane 6112 around an optical tube assembly 6114. The antenna 6110 includes an optical system attachment 6116, similar to the optical system attachment 6106. The antenna 6110 includes a single helical coil antenna 6118 wrapped around the optical tube assembly 6114.

A quadrifilar helical antenna 6120 supported by multiple standoffs, e.g., standoff 6124 along the length of the antenna axis, is configured in an axial mode, e.g., an end-fire mode. The antenna 6120 includes a ground plane 6122 around an optical tube assembly 6124. The antenna 6120 includes an optical system attachment 6126, similar to the optical system attachment 6106. The antenna includes four helical coil antennas, e.g., the helical coil antenna 6128 wrapped around the optical tube assembly 6124.

A helical antenna 6130 with a single helical coil is supported by a helical support structure 6314. The helical antenna 6130 is configured in an axial mode, e.g., an end-fire mode and includes a ground plane 6132 and an optical tube assembly 6134. The antenna 6130 includes an optical system attachment 6136, similar to the optical system attachment 6106.

A quadrifilar helical antenna 6140 supported by a flange/disk 6144 is configured in an axial mode, e.g., an end-fire mode. The antenna 6140 includes a ground plane 6142 around an optical tube assembly 6144. The antenna 6140 includes an optical system attachment 6146, similar to the optical system attachment 6106. The antenna 6140 includes four helical coil antennas, e.g., the helical coil antenna 6148 wrapped around the optical tube assembly 6144.

A quadrifilar helical antenna 6150 supported by a tube structure is configured in an axial mode, e.g., an end-fire mode. The antenna 6150 includes a ground plane 6152 around an optical tube assembly 6154. The antenna 6150 includes an optical system attachment 6156, similar to the optical system attachment 6106. The antenna 6150 includes four helical coil antennas, e.g., the helical coil antenna 6158 wrapped around the optical tube assembly 6144, which acts as the supporting tube structure.

Each illustrated helical coil antenna, e.g., the helical coil antennas 6100 and 6110, are example configurations, in which other configurations include different numbers of coils, coil sizes, coil pitch, orientation modes, e.g., axial mode, and polarizations, e.g., left/right hand coils. Each configuration can be adjusted for specific radiation and communication patterns.

Each helical coil antenna configuration includes a ground plane, e.g., the ground plane 6102. The use of a ground plane for an axial mode, e.g., end-fire mode, is an example configuration, in which the ground plane can include a metal/conductive surface of various shapes. The ground plane can be a reflector, e.g., a reflector with a parabolic dish and/or a waveguide with a cone and/or a horn structure. For example, for omnidirectional electromagnetic propagation from the helical antenna, the respective coils can be appropriately adjusted, and/or the ground plane and related components can be removed.

In some implementations, multiple antennas, e.g., the helical antenna 6100, can be arranged to form an array. In some implementations, the antennas can be positioned on mounts, stands, gimbals, robotic arms, and/or terrestrial as well as space-based systems.

In addition to the configurations illustrated in FIG. 61, other types of structures can support a helical antenna. For example, an antenna can include a support with multiple disks, similar to the flange/disk 6144 of antenna 6140. As another example configuration, an antenna can include a support structure without a ground plane.

Referring to FIG. 62, a flow chart illustrates an example process 6200 that includes selecting, by a control module, a transmit mode of a transceiver module (6202). Similarly, the control module can select a receive mode of the transceiver module. The control module and transceiver are communicatively coupled through direct electronic connection, wireless connection, or any other mode of communication. In some cases, the transceiver module converts a signal from a computing device to an electromagnetic signal or otherwise to be transmitted to one or more radiating devices.

The process 6200 includes generating, by a computing device, a signal indicative of a message to be transmitted by the transceiver module (6204). In some implementations, the message is sent from a particular communication system to a different communication system.

The process 6200 includes providing the signal from the computing device to the transceiver module (6206). In some implementations, the transceiver and computing device are communicatively coupled through direct electronic connection, wireless connection, or any other mode of communication.

The process 6200 includes providing the signal from the transceiver module to a signal injection circuit (6208), in which the signal injection circuit is electromagnetically, optically, or directly coupled to a radiating element. The radiating element, as described in various configurations in relation to FIGS. 4-60, includes a primary coil, a secondary coil positioned within the primary coil, one or more inductor coils positions within the secondary coil, a rotatable or fixed central core positioned within the one or more inductor coils, one or more central core coils positioned within the rotatable or fixed central core, and a central core cavity positioned within the one or more central core coils. In addition, the radiating element can include an optohelical antenna and one or more optical emitters.

What is claimed is:
1. A communication system comprising:
a computing device;
a signal injection circuit communicatively coupled to the computing device;
a signal detection circuit communicatively coupled to the computing device;
a radiating element, wherein the radiating element is electromagnetically, optically, or directly coupled to the signal injection circuit and the signal detection circuit, the radiating element comprising:
a primary coil,
a secondary coil positioned within the primary coil,
one or more inductor coils being rotatable or fixed within the secondary coil,
a rotatable or fixed central core positioned within the one or more inductor coils,
one or more central core coils positioned within the rotatable or fixed central core, and
a central core cavity positioned within the one or more central core coils, wherein the central core cavity includes a plasma and/or a gain medium, the plasma and/or the gain medium exhibiting magnetic resonance, spontaneous emission, stimulated emission, and/or absorption; and
a control module communicatively coupled to the computing device, wherein the control module determines a mode of a transceiver module, wherein the mode of the transceiver module includes a transmit mode and a receive mode.

2. The communication system of claim 1, wherein the central core cavity contains an x-ray tube filament.

3. The communication system of claim 2, wherein a material inside the central core cavity comprises one or more of water, coolant, oil, noble gases, biologics, glass, graphite, metal, ceramic, ferromagnetic, paramagnetic atoms, diamagnetic atoms, alkali metals, hydrogen, one or more isotopes, or one or more magnetic materials.

4. The communication system of claim 1, wherein the one or more inductor coils are configured to receive and/or transmit a radio frequency signal.

5. The communication system of claim 1, wherein the one or more inductor coils comprise rotatable or fixed toroidal single wound antennas or rotatable or fixed toroidal contrawound antennas.

6. The communication system of claim 1, wherein the signal injection circuit includes one or more antennae that comprise one or more of a helical antenna, a spherical antenna, a toroidal antenna, gyroscopic radiating antenna, a helical antenna, an optohelical antenna, or a cylindrical antenna, wherein the control module determines one or more active antennae.

7. The communication system of claim 1, wherein the transceiver in a transmit mode converts electrical signals from the computing device into electromagnetic signals for transmission.

8. The communication system of claim 1, wherein the transceiver in a receive mode converts received electromagnetic signals into electrical signals for processing by the computing device.

9. The communication system of claim 1, wherein the radiating element further comprises:
a plurality of optical emitters, wherein each optical emitter comprise a light source, wherein each optical emitter is coupled to one or more optical lenses; and
a plurality of optical detectors.

10. The communication system of claim 9, wherein each optical emitter of the plurality of optical emitters emits an optical signal having a wavelength and each optical detector of the plurality of optical detectors detects an optical signal having the wavelength.

11. The communication system of claim 9, wherein an optical emitter is configured to emit an optical signal, the optical signal described by a particular radiation pattern, the radiation pattern determined based on an output of a machine learning model.

12. The communication system of claim 9, wherein the light source emits light according to a particular amplitude modulation pattern, the pattern comprising a pulsed pattern or a continuous wave pattern.

13. The communication system of claim 1, wherein the signal injection circuit is communicatively coupled to the computing device by a link that includes a direct electrical connection, a direct fiber optic connection, a free-space optical link, a radio frequency link, a laser, or a particle accelerator.

14. The communication system of claim 1, wherein the computing device is communicatively coupled to a security hub, wherein the security hub collects and stores information about a user, the security hub comprising one or more of a modem, a gateway, an operating system, and a user interface.

15. The communication system of claim 1, wherein the rotatable or fixed central core rotates about one or more axis, the one or more axis extending through the center of the communication system.

16. The communication system of claim 1 further comprising a nonlinear optical device comprising a laser that optically couples the nonlinear optical device to the computing device, wherein the nonlinear optical device converts one or more photons of the laser into one or more pairs of entangled photons.

17. The communication system of claim 16, wherein the nonlinear optical device comprises a non-linear crystal exhibiting spontaneous parametric down conversion, wherein the non-linear crystal is phase matched to generate entangled photon pairs from one or more input photons of the input laser, the input laser controlled by the computing device.

18. The communication system of claim 1, wherein the control module determines (i) one or more active electromagnetic, acoustic, or optical communication channels, (ii) a power distribution to one or more components of the communication system, and (iii) functionality of one or more load devices.

19. The communication system of claim 1, further comprising a power system comprising a power supply and a power storage system, wherein the power supply comprises one or more of a battery, a solar panel, a nuclear power source, an electrodynamic tether, a mechanical power generation system, and an electrical main.

20. The communication system of claim 1, wherein the system is coupled to a spacecraft.

21. The communication system of claim 1, wherein the computing device accesses one or more external software resources through an application programming interface.

22. The communication system of claim 1, wherein the computing device comprises one or more processors, the one or more processors performing computations related to data communication, data storage, machine learning, network operations, security protocols, analog signal processing, and digital signal processing.

23. The communication system of claim 1, wherein the radiating element further comprises one or more antennas, wherein the one or more antennas are simple antennas or composite antennas.

24. The communication system of claim 1, wherein the transceiver is configured to communicate a drive signal to at least one circuit element of the signal injection circuit.

25. The communication system of claim 1, wherein the mode of the transceiver module is determined based on an output of a machine learning model.

26. The communication system of claim 1, further comprising an optical channel coupled to the central core cavity, the optical channel comprising a free space optical channel or a fiber optic channel.

27. A method for transmitting a message with a communication system, the method comprising:
selecting, by a control module, a transmit mode of a transceiver module;
generating, by a computing device, a signal indicative of a message to be transmitted by the transceiver module in transmit mode to one or more components of a radiating element;
providing the signal from the computing device to the transceiver module; and providing the signal from the transceiver module to a signal injection circuit, wherein the signal injection circuit is electromagnetically, optically, or directly coupled to a radiating element, the radiating element comprises:
a primary coil,
a secondary coil positioned within the primary coil,
one or more inductor coils that are free to rotate positioned within the secondary coil,
a rotatable or fixed central core positioned within the one or more inductor coils,
one or more central core coils positioned within the rotatable or fixed central core, and
a central core cavity positioned within the one or more central core coils, wherein the central core cavity includes a plasma and/or a gain medium, the plasma and/or the gain medium exhibiting magnetic resonance, spontaneous emission, stimulated emission, and/or absorption.

28. The method of claim 27, wherein the one or more inductor coils are configured to receive and/or transmit a signal from the computing device or another device, wherein the one or more inductor coils are configured to tune the reception and transmission of the radio frequency signal.

29. The method of claim 27, wherein the computing device is communicatively coupled to a security hub that collects and stores user information.

30. The method of claim 27, wherein the control module determines active electromagnetic, acoustic, or optical communication channels.

* * * * *